(12) United States Patent
Benitez et al.

(10) Patent No.: US 7,460,985 B2
(45) Date of Patent: Dec. 2, 2008

(54) THREE-DIMENSIONAL SIMULTANEOUS MULTIPLE-SURFACE METHOD AND FREE-FORM ILLUMINATION-OPTICS DESIGNED THEREFROM

(75) Inventors: Pablo Benitez, Madrid (ES); Juan Carlos Minano, Madrid (ES); Jose Blen Flores, Madrid (ES); Maikel Hernandez, Madrid (ES); Ruben Mohedano Arroyo, Madrid (ES); Julio Cesar Chaves, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 447 days.

(21) Appl. No.: 10/901,919

(22) Filed: Jul. 28, 2004

(65) Prior Publication Data

US 2005/0086032 A1    Apr. 21, 2005

Related U.S. Application Data

(60) Provisional application No. 60/490,769, filed on Jul. 28, 2003.

(51) Int. Cl.
*G06F 7/60* (2006.01)
*G06G 7/48* (2006.01)

(52) U.S. Cl. ............................................. 703/2; 703/6
(58) Field of Classification Search .................... 703/2, 703/6
See application file for complete search history.

(56) References Cited

U.S. PATENT DOCUMENTS

| 1,399,973 A | 12/1921 | Limpert |
| 1,977,689 A | 10/1934 | Muller |
| 2,254,961 A | 9/1941 | Harris |
| 2,362,176 A | 11/1944 | Swanson |
| 2,908,197 A | 10/1959 | Wells et al. |

(Continued)

FOREIGN PATENT DOCUMENTS

EP    0 450 560 A2    10/1991

(Continued)

OTHER PUBLICATIONS

International Search Report. PCT/US03/38024, Nov. 10, 2004.

(Continued)

*Primary Examiner*—Hugh Jones
(74) *Attorney, Agent, or Firm*—Thomas F. Lebens; Sinsheimer Juhnke Lebens & McIvor, LLP

(57) ABSTRACT

The embodiments provide methods for use in designing and/or manufacturing optical systems. Some embodiments further provide for the optical systems generated utilizing the methods for use in designing and/or manufacturing. In some embodiments, a method simultaneously generates first and second sets of span points defining first and second surfaces, respectively, where sets of span points are interdependent. The method curve fits through the first and second sets of span points defining initial first and second spines, smoothes the curve fittings such that tangent vectors are perpendicular to normal vectors, and defines patches of the first and second surfaces relative to the first and second spines. Some embodiments simultaneously generate the first and second sets of span points by alternatively determining the points of the sets based on propagation of input wavefronts and associated output wavefronts relative to previously determined points.

34 Claims, 37 Drawing Sheets

U.S. PATENT DOCUMENTS

| | | |
|---|---|---|
| 3,760,237 A | 9/1973 | Jaffe |
| 3,774,021 A | 11/1973 | Johnson |
| 3,938,177 A | 2/1976 | Hansen et al. |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |
| 4,342,908 A | 8/1982 | Henningsen et al. |
| 4,384,769 A | 5/1983 | Brei et al. |
| 4,388,673 A | 6/1983 | Maglica |
| 4,464,707 A | 8/1984 | Forrest |
| 4,638,343 A | 1/1987 | Althaus et al. |
| 4,675,725 A | 6/1987 | Parkyn |
| 4,698,730 A | 10/1987 | Sakai et al. |
| 4,727,289 A | 2/1988 | Uchida |
| 4,727,457 A | 2/1988 | Thillays |
| 4,920,404 A | 4/1990 | Shrimali et al. |
| 5,055,892 A | 10/1991 | Gardner et al. |
| 5,140,220 A | 8/1992 | Hasegawa |
| 5,302,778 A | 4/1994 | Maurinus |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,438,453 A | 8/1995 | Kuga |
| 5,452,190 A | 9/1995 | Priesemuth |
| 5,453,877 A | 9/1995 | Gerbe et al. |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,655,830 A | 8/1997 | Ruskouski |
| 5,655,832 A | 8/1997 | Pelka et al. |
| 5,676,453 A | 10/1997 | Parkyn et al. |
| 5,699,186 A | 12/1997 | Richard |
| 5,757,557 A | 5/1998 | Medvedev et al. |
| 5,777,433 A | 7/1998 | Lester et al. |
| 5,806,955 A | 9/1998 | Parkyn, Jr. et al. |
| 5,813,743 A | 9/1998 | Naka |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,030,099 A | 2/2000 | McDermott |
| 6,044,196 A | 3/2000 | Winston et al. |
| 6,048,083 A | 4/2000 | McDermott |
| 6,097,549 A | 8/2000 | Jenkins et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev et al. |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn |
| 6,282,821 B1 | 9/2001 | Freier |
| 6,301,064 B1 | 10/2001 | Araki et al. |
| 6,350,041 B1 | 2/2002 | Tarsa et al. |
| 6,356,700 B1 | 3/2002 | Strobl |
| 6,361,190 B1 | 3/2002 | McDermott |
| 6,450,661 B1 | 9/2002 | Okumura |
| 6,473,554 B1 | 10/2002 | Pelka |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,536,923 B1 | 3/2003 | Merz |
| 6,547,400 B1 | 4/2003 | Yokoyama |
| 6,547,423 B2 | 4/2003 | Marshall et al. |
| 6,554,455 B2 | 4/2003 | Perlo et al. |
| 6,560,038 B1 | 5/2003 | Parkyn et al. |
| 6,578,989 B2 | 6/2003 | Osumi et al. |
| 6,580,228 B1 | 6/2003 | Chen et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,674,096 B2 | 1/2004 | Sommers |
| 6,679,621 B2 | 1/2004 | West |
| 6,688,758 B2 | 2/2004 | Thibault |
| 6,692,136 B2 | 2/2004 | Marshall et al. |
| 6,729,746 B2 | 5/2004 | Suehiro et al. |
| 6,769,772 B2 | 8/2004 | Roddy et al. |
| 6,783,269 B2 | 8/2004 | Pashley |
| 6,786,625 B2 | 9/2004 | Wesson |
| 6,796,698 B2 | 9/2004 | Sommers et al. |
| 6,803,607 B1 | 10/2004 | Chan et al. |
| 6,811,277 B2 | 11/2004 | Amano |
| 6,830,359 B2 | 12/2004 | Fleury |
| 6,848,820 B2 | 2/2005 | Natsume |
| 6,863,402 B2 | 3/2005 | Roddy et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,997,587 B2 | 2/2006 | Albou |
| 2002/0034012 A1 | 3/2002 | Santoro et al. |
| 2002/0080623 A1 | 6/2002 | Pashley |
| 2003/0076034 A1 | 4/2003 | Marshall |
| 2004/0070855 A1 | 4/2004 | Benitez |
| 2004/0105171 A1 | 6/2004 | Minano |
| 2004/0125614 A1 | 7/2004 | Ishida et al. |
| 2004/0189933 A1 | 9/2004 | Sun |
| 2004/0190304 A1 | 9/2004 | Sugimoto et al. |
| 2004/0228131 A1 | 11/2004 | Minano |
| 2004/0246606 A1 | 12/2004 | Benitez et al. |
| 2004/0252390 A1 | 12/2004 | Benitez |
| 2005/0024744 A1 | 2/2005 | Falicoff |
| 2005/0088758 A1 | 4/2005 | Minano et al. |
| 2005/0117125 A1 | 6/2005 | Minano et al. |
| 2005/0129358 A1 | 6/2005 | Minano et al. |
| 2005/0135095 A1 | 6/2005 | Geissler |
| 2005/0200812 A1 | 9/2005 | Sakata et al. |
| 2005/0219464 A1 | 10/2005 | Yamasaki et al. |

FOREIGN PATENT DOCUMENTS

| | | |
|---|---|---|
| ES | 2142752 | 12/2000 |
| SU | 1282051 A1 | 1/1987 |
| WO | WO 99/09349 | 2/1999 |
| WO | WO 99/13266 | 3/1999 |
| WO | WO 01/07828 A1 | 2/2001 |
| WO | WO 03/066374 A2 | 8/2003 |

| | | | |
|---|---|---|---|
| WO | WO 03/066374 A3 | 8/2003 | |
| WO | WO 2004/007241 A2 | 1/2004 | |

OTHER PUBLICATIONS

International Search Report. PCT/US04/14938, Mar. 1, 2005.
International Search Report, PCT/US04/16313, mailed Mar. 21, 2005.
International Search Report, PCT/US04/24450, mailed Aug. 3, 2004.
International Search Report, PCT/US04/38584, mailed Jul. 18, 2005.
U.S. Appl. No. 10/461,557, filed Jun. 12, 2003, Minano.
U.S. Appl. No. 10/772,088, filed Feb. 3, 2004, Minano.
U.S. Appl. No. 10/779,259, filed Feb. 13, 2004, Benitez.
U.S. Appl. No. 10/903,925, filed Jul. 29, 2004, Falicoff.
U.S. Appl. No. 10/816,228, filed Mar. 31, 2004, Chaves, et al.
U.S. Appl. No. 10/880,386, filed Jun. 28, 2004, Benitez.
Remillard, Everson and Weber, "Loss Mechanisms Optical Light Pipes" *Applied Optics* vol. 31 #34 pp. 7232-7241 Dec. 1992.
Parkyn et al. The Black Hole™: Cuspated waveguide-injectors and illuminators for LEDs; Part of the SPIE Conference on Nonimaging Optics: Maximum Efficiency Light Transfer V, Denver, CO, Jul. 1999.
HyperARGUS®LED, Hyper-Bright, 3mm (T1) LED, Non Diffused; Mar. 1, 2000; Infineon Technologies, pp. 1-9.
Spigulis, "Compact dielectric reflective elements, Half-sphere concentrators of radially emitted light" *Applied Optics* vol. 33, No. 25, Sep. 1994.
International Search Report, PCT/US03/32076.
Benitez, P. "Chapter 6: The SMS design method in three dimensions", from *Conceptos evanzados de óptica anidólica: diseño y fabricación*, PhD dissertation, UPM, (1998).
Benitez, P.; Mohedano, R.; Minano, J. "Design in 3D geometry with the Simultaneous Multiple Surface design method of Nonimaging Optics" Instituto de Engergia Solar, E.T.S.I. Telecommunicacion, Universidad Politecnica, 28040. Madrid, Spain. (Jul. 1999).
International Search Report. PCT/US03/38240, Jul. 26, 2004.
International Search Report and Written Opinion, PCT/US2004/038162, mailed Nov. 30, 2005.
Georg Glaeser, et al., "Reflections on Refraction" AMS, Sep. 5, 2001, pp. 1-18.
Benitez P, Elliptic Ray Bundles In Three Dimensional Geometry For Nonimaging optics: A New Approach, Journal Optical Society of America, pp. 2245-2252, 1999.
PCT Search Report and Written Opinion, mail date Jun. 27, 2006, PCT/US04/24330.

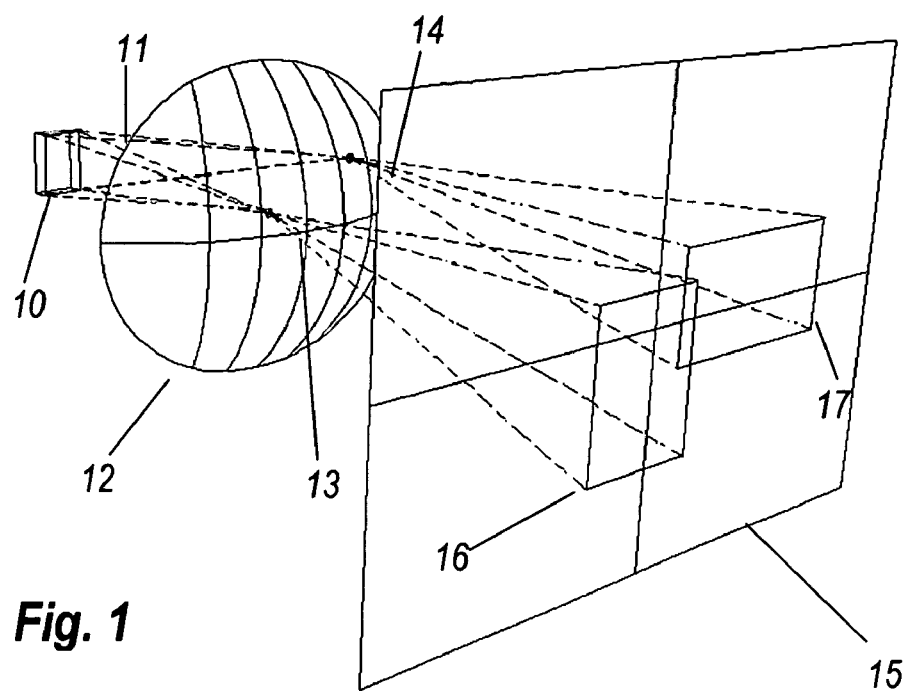
*Fig. 1*
*Fig. 2A*
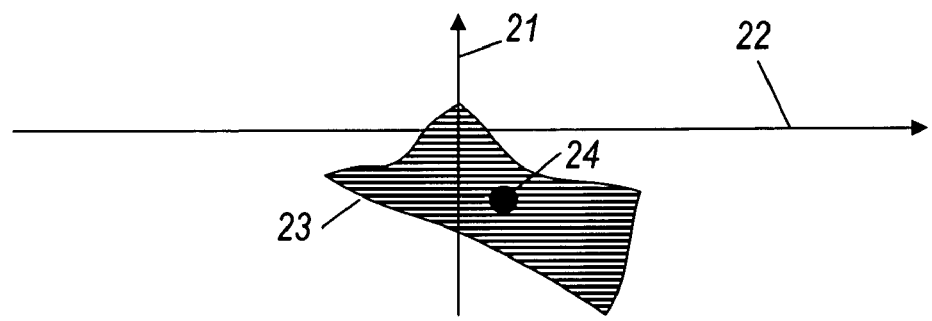
*Fig. 2B*
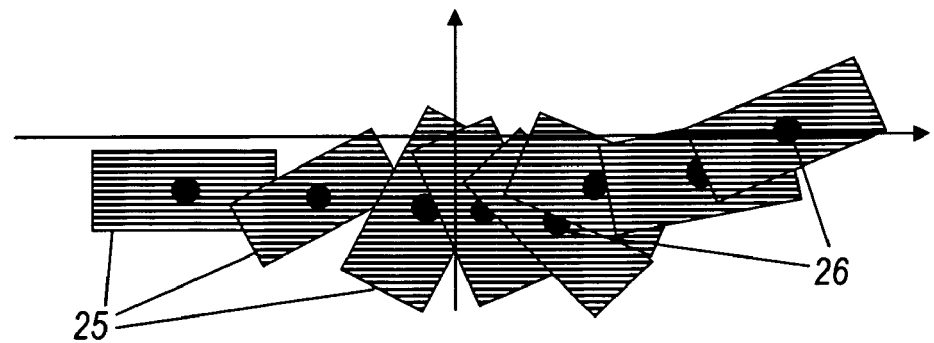

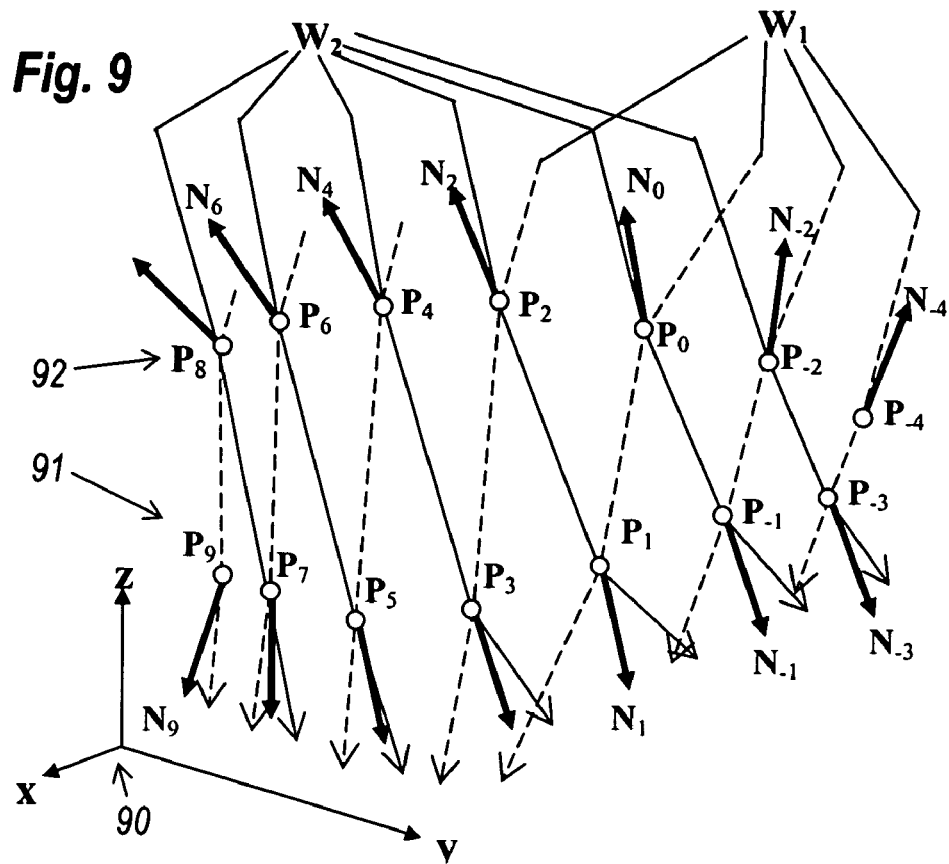

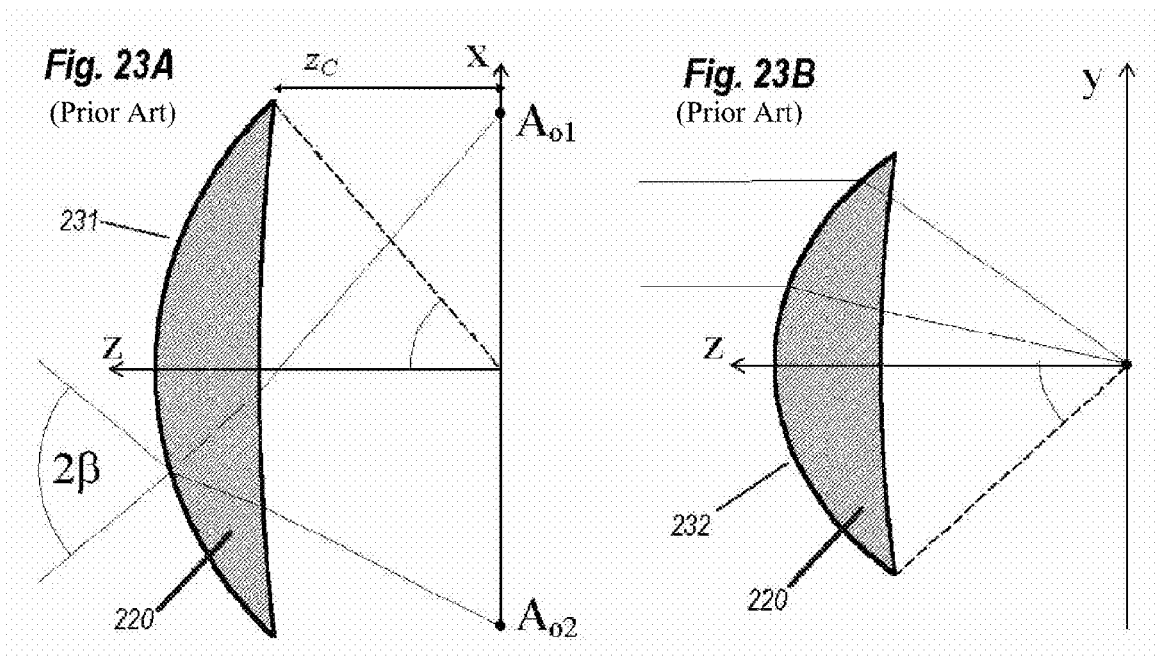
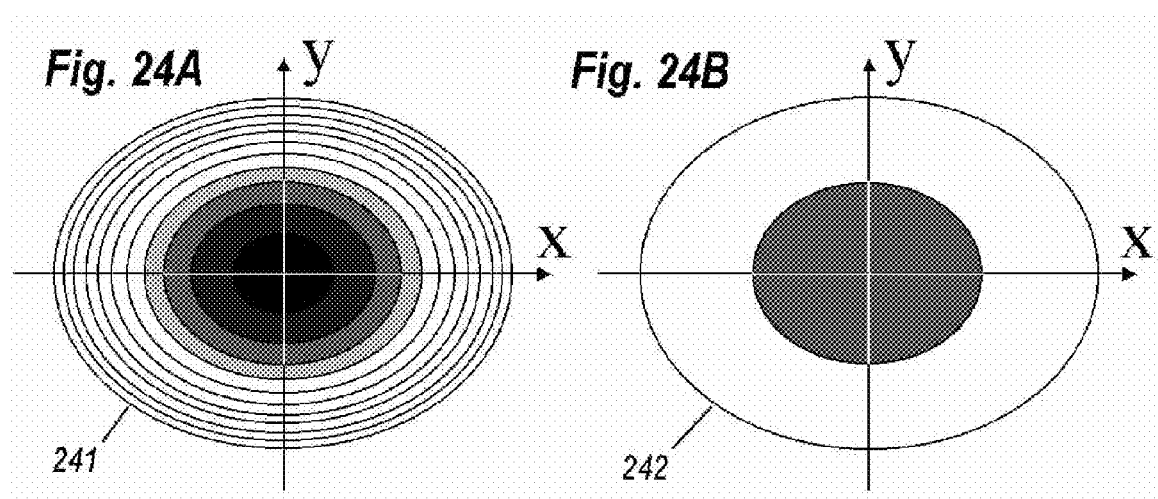

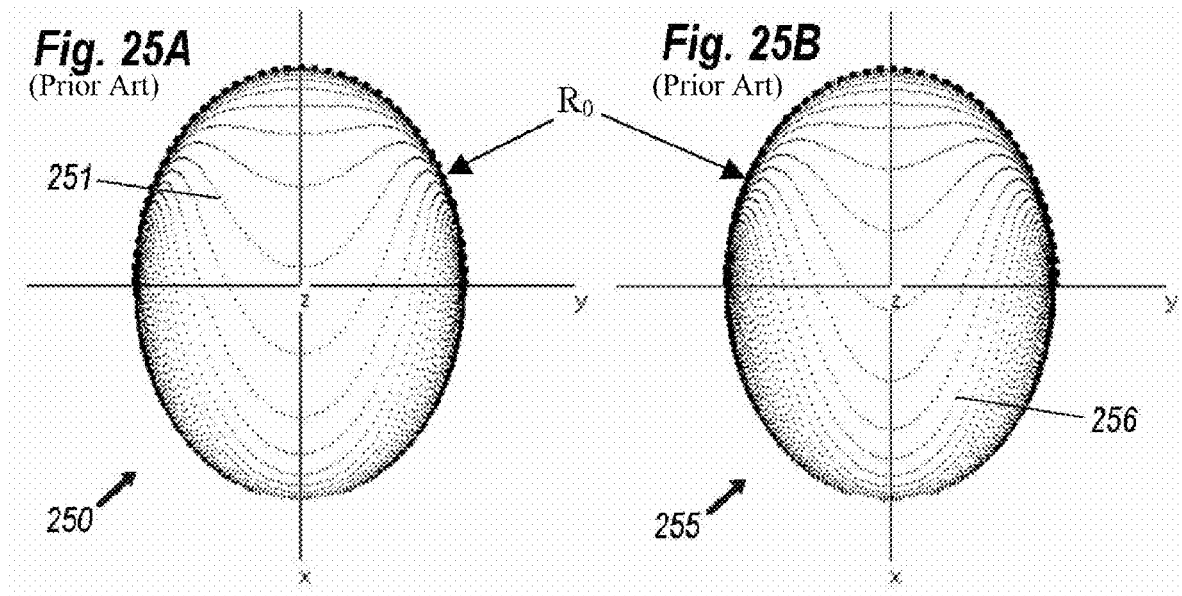
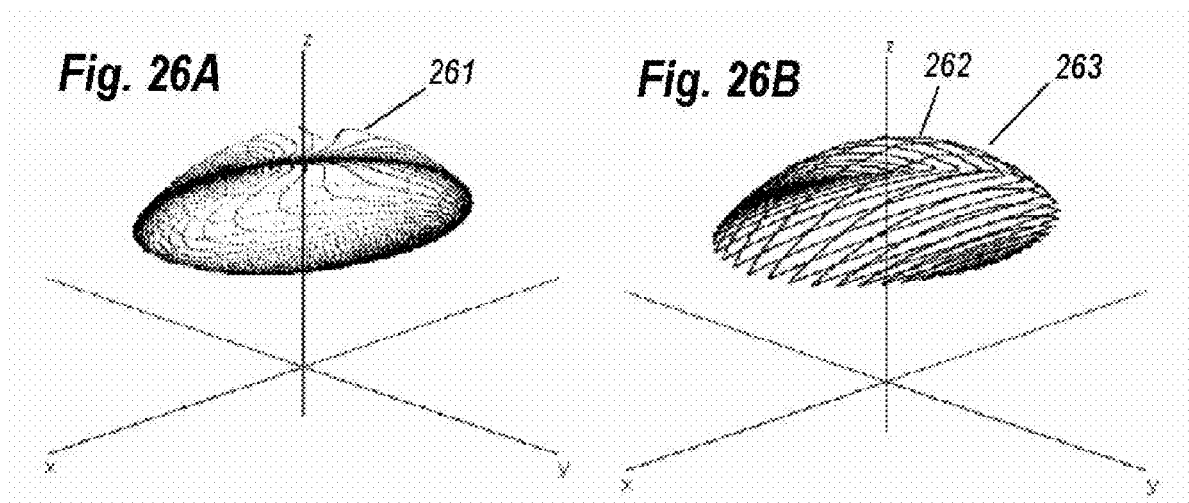

US 7,460,985 B2

THREE-DIMENSIONAL SIMULTANEOUS MULTIPLE-SURFACE METHOD AND FREE-FORM ILLUMINATION-OPTICS DESIGNED THEREFROM

PRIORITY CLAIM

This application claims the benefit of U.S. Provisional Application No. 60/490,769, filed Jul. 28, 2003, which is incorporated herein by reference in its entirety.

BACKGROUND OF THE INVENTION

The field of endeavor of the present embodiments is generally illumination optics, and more specifically the design of lenses and other luminaires that are generally not rotationally symmetric Some optical problems are stated in two-dimensional (2D) geometry and solved with particular line profiles by which solution-surfaces can be generated by means of a circular or linear sweep. Deviations from circular symmetry are generally treated as troublesome aberrations, as for example astigmatism of a tilted input wavefront.

Optical free-form surfaces are figures of burgeoning interest, because of both theoretical advances in their mathematical description and technological advances in their cost-effective manufacture. With the advent of injection molding of plastic optics, mass-replication of free-form surfaces becomes possible. The development of electrical-discharge machining (EDM) has provided means for fabricating optical-quality freeform surfaces in the metal of the mold. EDM in turn depends upon five-axis and six-axis machining to produce the desired free-form surface as a carbon electrode of identical dimensions as the part to be produced. This electrode is used to electrically burn into metal a concavity matching its own shape, thereby providing a mold cavity that imparts the desired shape to molten plastic. Beyond the replicative methods of injection molding, free-form surfaces can be produced directly in some optical materials, such as acrylic, with multi-axis machining techniques, albeit at greater per-part expense than injection molding and thus typically employed for prototypes.

Two important applications of free-form optical surfaces for illumination are conformal optics and asymmetric output. Conformal optics refers to systems with an arbitrary shape that is dictated by aerodynamics, hydrodynamics, and/or other such non-optical criteria, e.g. shapes that must conform to that of a vehicle's exterior surface. Asymmetric output arises when a system's illumination requirements are not rotationally symmetric, so that the traditional rotational symmetry of some illumination optics are generally inadequate. The additional degree of freedom of non-symmetry calls for an expanded, more general method of surface synthesis than the generation of a planar profile for sweeping into a surface.

SUMMARY OF THE INVENTION

The present embodiments advantageously address the needs above as well as other needs by providing methods of designing and/or manufacturing optical devices, and more specifically luminaires that impart a desired beam upon the luminous output of a compact wide-angle light source, particularly a light-emitting diode (LED).

In some embodiments, a method for use in generating an optical system is provided that simultaneously generates a first set and a second set of span points, where each point has an associated normal vector, such that the first and second sets of span points form interdependent first and second chains of corresponding points, respectively; curve-fits through the first set of span points defining an initial first spine; curve-fits through the second set of span points defining an initial second spine; generating first and second sets of ribs extending from said first and second spines, respectively, such that tangent vectors of said ribs are perpendicular to said normal vectors of said spines; and defines patches of a first surface that is bounded by said first set of ribs of said first spine, and defining patches of a second surfaces that is bounded by said second set of ribs of said second spine.

Some embodiments additionally and/or alternatively provide methods of use in designing an optical system. These methods define first input and output wavefronts and a first optical path length between said first input and output wavefronts; define second input and output wavefronts and a second optical path length between said second input and output wavefronts; and define a deflection type of said first surface and a deflection type of said second surface.

In some embodiments, a method for use in generating an optical system is provided that simultaneously generates a first set and a second set of span points defining a first surface and second surface, respectively, such that the first and second set of span points are interdependent; curve fits through the first set of span points defining an initial first spine; curve fits through the second set of span points defining an initial second spine; smoothes the first and second spines through the first and second set of span points such that tangent vectors are perpendicular to normal vectors of the first and second sets of span points; and defines patches of the first and second surfaces relative to smoothed first and second spines.

Some embodiments additionally and/or alternatively provide methods of use in designing an optical system. These methods define first input and output wavefronts and a first optical path length between the first input and output wavefronts; define second input and output wavefronts and a second optical path length between the second input and output wavefronts; define a nature of an optical first surface and a nature of an optical second surface; and calculate a seed rib on at least one of the first and second surfaces.

Alternative embodiments provide optical systems that include a first surface receiving at least a first optical input wavefront and a second optical input wavefront; and a second surface separated from the first surface and emitting at least a first optical output wavefront and a second optical output wavefront; wherein the first and second surfaces are respectively defined at least in part according to interdependent first and second sets of span points, and first and second surfaces are further defined according to patches dictated by the first and second sets of span points, respectively.

BRIEF DESCRIPTION OF THE DRAWINGS

The above and other aspects, features and advantages of the present embodiments will be more apparent from the following more particular description thereof, presented in conjunction with the following drawings wherein:

FIG. 1 depicts a far-field intensity pattern constituted by infinitesimal source-images from exit-aperture pinholes.

FIGS. 2A and 2B show uncontrolled source-images typically resulting from conventional beam-formers.

FIG. 9 shows a full SMS chain.

FIG. 10 shows space curves fit to the SMS chain.

FIGS. 23A and 23B show z-x and z-y cross-sectional views, respectively, of the transverse RR lens of FIG. 22.

FIGS. 24A and 24B show facial contours of input and output surfaces, respectively, of the transverse RR lens of FIG. 22.

FIG. 25A and 25B show seed ribs of input and output surfaces, respectively, of the transverse RR lens of FIG. 22.

FIG. 26A and 26B show perspective views of the seed ribs and spines, respectively, of the transverse RR lens of FIG. 22.

Corresponding reference characters indicate corresponding components throughout the several views of the drawings.

Figure 3A:
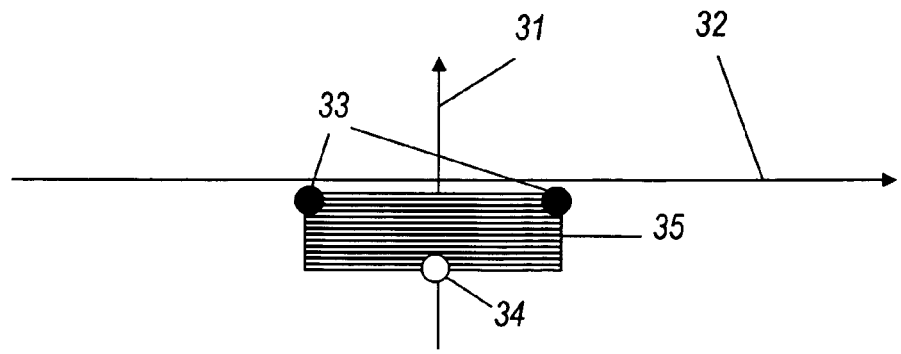
FIGS. 3A and 3B show source-images controlled according to present embodiments.

A better understanding of the features and advantages of the present invention will be obtained by reference to the following detailed description of the invention and accompanying drawings, which set forth illustrative embodiments in which the principles of the invention are utilized.

The following description of the presently contemplated best mode of practicing the invention is not to be taken in a limiting sense, but is made merely for the purpose of describing the general principles of the invention. The scope of the invention should be determined with reference to the claims.

DETAILED DESCRIPTION OF THE INVENTION

The optical design methods of the present embodiments are three-dimensional (3D) in both the posing of and the solution of geometrical-optical problems. Some embodiments provide three-dimensional simultaneous multiple surface (SMS-3D) methods for use in generating free-form surfaces in conjoint pairs, utilizing pre-specified pairs of input and output wavefronts. These conjoint sets of three-dimensional shapes are in general not rotationally symmetric, and typically cannot be reduced to two-dimensional profiles, hence their being named three-dimensional.

The three dimensional simultaneous multiple surface method, hereinafter designated SMS-3D, is shown below as useful for the design of lens and mirror shapes for many applications and implementations, such as advanced vehicular illumination systems and other systems and application. The present embodiments provide systems that can combine large sales volume with challenging optical goals for LED light sources. The SMS-3D methods according to some embodiments are particularly apt at generating free-form optical surfaces that meet at least twin goals of power minimization and conformal optics. Power minimization dictates that luminaire output conforms closely to the device's desired prescription. Such a prescription can combine legal test standards with manufacturer preferences, such as reduced glare.

The present embodiments further provide methods for use in generating free-form optical surfaces for illumination. At least part of the design goals are specified, in some implementations, in terms of a pair of input wavefronts and a pair of output wavefronts into which they are to be transformed. In some embodiments, these methods generate two solution surfaces that carry out this transformation, in a multiple-step process of wavefront definition, SMS chain generation and smoothing, seed-rib generation, and seed-patch generation and smoothing. Also disclosed are preferred embodiments of such surfaces.

Embodiments are described below utilizing the following symbols:

| Variable | Definition |
| --- | --- |
| $C_i$ | Curve. Special types of curves that are the spines. These are smooth curves linking the points of a chain and consistent with the normals of the chain |
| L | Optical path length function of an orthotomic ray congruence |
| $N_j$ | Unit vector normal to a given surface |
| $P_j$ | Position vector giving the coordinates of a point |
| $(P_j, N_j)$ | Link. It is formed by a point and a unit vector normal to the SMS surface |
| $\{(P_j, N_j)\}$ | Chain. Set of links generated from an initial link using the SMS method |
| p | x component of the vector v |
| q | y component of the vector v |
| r | z component of the vector v |
| $ray_1$ | Ray named 1 |
| $R_0$ | SMS seed rib. |
| $R_i$ | SMS rib. It is formed by a curve and a set of unit vectors (one per point of the curve) which are normal to the SMS surface on which the rib is lying. |
| S | SMS surface formed by the SMS skinning of the ribs |
| $\Sigma_0$ | SMS seed patch |
| $\Sigma_j$ | SMS patch. It is a surface patch generated from the seed patch $\Sigma_0$ using the SMS method. |
| t | Unit vector tangent to a spine at some point |
| τ | Unit vector tangent to a rib at some point |
| v | Unit vector tangent to a ray. |
| W | Surface defining a wavefront or set of rays normal to this surface |

Some optical systems described herein are designated by a letter sequence in accordance with the types of deflection performed by each of the surfaces that light encounters in its passage into the system from the outside world: 'R' for refraction, 'X' for mirror-reflection, such as by a metallic coating, and 'I' for internal reflection. When light comes from an emitter and passes through the system to the outside world, the sequence of the designation is opposite to that of the light's direction. This is because this system began with solar concentrators, where light does come from outside. For the sake of generalized comparisons, the outside-to-inside order is kept even for systems comprising light sources. Thus a conventional lens with two refractive surfaces is 'RR' and a two-mirror system is 'XX', while 'RXI' denotes a preferred embodiment of some present implementations as disclosed herein.

The embodiments provide design methods for use in designing illumination optics. These design methods additionally optimize designs of lenses and other luminaires that generally are not rotationally symmetric, which is an underdeveloped category of optical design. This is because of the much greater degree of design freedom and information content when compared to conventional two-dimensional (2D) designs, as measured by the greater number of rays to be controlled by the design. In some implementations, the present embodiments provide methods for use in numerically specifying optical surfaces that are precise and preferably exact mathematical solutions transforming two specific input wavefronts into a corresponding pair of specific output wavefronts.

An imaging design strives for the perfect imaging of all the points of the object plane into the corresponding points of the image plane. This condition typically cannot be completely achieved.

In non-imaging optics, there are problems that cannot be solved with optical devices having linear or rotational symmetry. For instance, linear symmetric concentrators typically cannot achieve isotropic illumination of a linear receiver surrounded by an optically dense medium (n>1) (as described at least generally in J. C. Miñano, "Application of the conservation of the étendue theorem for 2D-subdomains of the phase space in nonimaging optics". Appl. Opt. 23, pp. 2021-2025, (1984), incorporated herein by reference), and rotational concentrators typically cannot achieve maximum concentration on a spherical receiver (as described by H. Ries, N. E. Shatz, J. C. Bortz, "Consequences of skewness conservation for rotationally symmetric nonimaging devices", Nonimaging Optics: Maximum Efficiency Light Transfer IV, Roland Winston, Ed., Proc. SPIE Vol. 3139, pp. 47-58, (1997), incorporated herein by reference). In these cases, even if the selection of control rays in the 2D design were perfect, it is not possible to solve the problem by generating a rotational or linear device from a 2D design. Designing in 3D is more difficult than in 2D, due to the greater number of rays to be controlled. The edges rays in a 2D nonimaging-optics problem constitute a 1-parameter family of rays. In 3D, however, the edge rays are 3-parameter (as described by J. C. Miñano, "Design of three-dimensional nonimaging concentrators with inhomogeneous media", J. Opt. Soc. Am. A 3 (9), pp. 1345-1353, (1986), incorporated herein by reference), because their dimensionality increases by one in both spatial and angular coordinates.

There are two main groups of design problems in Nonimaging Optics. Although both groups have been usually treated separately in the nonimaging literature, photovoltaic concentrators constitute an example of a nonimaging design that belongs to both groups.

a) In the first group of design problems, which hereinafter are referred to as "bundle-coupling", the design problem consists in coupling two ray bundles $M_i$ and $M_o$, called the input and the output bundles. In general these bundles are 4-parameter bundles. The objective of the design process is an optical device that couples the two bundles, i.e., making $M_i = M_o$. This means that any ray entering into the optical device as a ray of $M_i$ exits it as a ray of $M_o$, and vice versa, both bundles are formed by the same rays, i.e., they are the same bundle $M_c$: $M_c$ is in general $M_c = M_i \cap M_o$. A common case occurs when $M_o$ is formed by all the rays intercepting a given surface (called the receiver). This design problem is stated, for instance, in solar thermal concentration or in point-to-point wireless infrared data-links (for both emitter and receiver sets).

Previous 3D design methods were developed in the past to solve the bundle-coupling problem in 3D geometry. This is the case of the Poisson bracket method (further described for example by J. C. Miñano, "Design of three-dimensional nonimaging concentrators with inhomogeneous media", J. Opt. Soc. Am. A 3 (9), pp. 1345-1353, (1986), incorporated herein by reference) and the Flow-Line method (described more fully by R. Winston, W. T. Welford, "Geometrical vector flux and some new nonimaging concentrators", J. Opt. Soc. Am. 69 (4), pp. 532-536, (1979), and M. Gutiérrez, J. C. Miñano, C. Vega, P. Benítez. "Application of Lorentz geometry to Nonimaging Optics: New 3D ideal concentrators", J. Opt. Soc. Am. A, 13, pp. 532-540, (1996), both incorporated herein by reference), which are both extensions of 2D methods. It is remarkable that one device obtained with the Poisson bracket method in 3D proved the existence of theoretically exact solutions for coupling a 3D bundle of constant acceptance angle α with the maximum concentration bundle (β=90°) on a flat receiver of arbitrary contour. These methods, however, have yet to lead to practical devices: some of them require a medium with an inhomogeneous refractive index, and generally all of them use flow-line type metallic mirrors.

b) For the second group of design problems, called the "prescribed-irradiance" type, it is typically only specified that one bundle be included in the other, for example, $M_i$ in $M_o$ (so that $M_i$ and $M_c$ will coincide), with the additional condition that the bundle $M_c$ produces a particular prescribed irradiance distribution on one target surface at the output side. As $M_c$ is not fully specified, this problem is less restrictive than the bundle-coupling one. These designs are useful in, for example, automotive lighting, the light source being a light bulb or an LED and the target surface is the far-field, representing a prescribed intensity distribution. For wide-angle ceiling infrared (IR) receivers in indoor wireless communications, the receiver sensitivity is prescribed to compensate for the different link distances from multiple emitters on the desks (in this case, $M_o$ is included in $M_i$, and the irradiance distribution is prescribed at the input side, at the plane of the desks).

One design method to solve these problems consist in the 3D design of a single free-form refractive or reflective surface, to solve a prescribed-irradiance problem based on the approximation that the light source is small compared to the lens. Some examples of these single surface design methods are described in S. A. Kochengin, V. I. Oliker, O. von Tempski, "On the design of reflectors with prespecified distribution of virtual sources and intensities", Inverse problems 14, pp. 661-678, (1998); H. Ries, J. A. Muschaweck, "Tailoring freeform lenses for illuminations", in Novel Optical Systems Design and Optimization IV, Proc. SPIE 4442, pp. 43-50, (2001); and W. Cassarly, "Nonimaging Optics: Concentration and Illumination", in Handbook of Optics, 2nd ed., pp 2.23-2.42, (McGraw-Hill, New York, 2001), each incorporated herein by reference.

This strategy (referred to as point-to-point mapping in W. B. Elmer, The Optical Design of Reflectors, 2nd ed., Wiley, New York, 1980 (Chap. 4.4), incorporated herein by reference) is generally well known for rotationally symmetric optics, where its solution simply involves the integration of a non-linear ordinary differential equation (for example, as described by R. K. Luneburg, Mathematical Theory of Optics (University of California, Berkeley and Los Angeles 1964), incorporated herein by reference). For the more general 3D design of a single free-form surface, point-to-point mapping involves numerically solving a non-linear partial differential equation of the Monge-Ampere type.

With single surface methods, the control of the output bundle associated with a real finite-source is very limited, and insufficient for some applications. An example is low-beam headlight design for LEDs, in which the far-field intensity is prescribed. Also, as small as possible a luminaire aperture is desired. Current LED luminance levels have yet to attain those of incandescent sources. For example, the Luxeon III high-power LED currently available from the Lumileds Corporation attains the highest luminance commercially available, yet that level is four times lower than that of incandescent filaments. This lower luminance makes it necessary that the image of the source everywhere on the exit aperture be correspondingly larger in solid angle than the filament image of incandescent headlamps, if exit aperture area is not enlarged.

A more detailed examination of this quite practical LED-headlamp example begins with the abovementioned concept of the projection of source images into the far-field pattern, a customary approach to headlamp design. FIG. 1 depicts the concept of a source-image. Source 10 projects edge rays 11 into optical system 12. Exemplary points or pinholes 13 and 14 define tiny differential areas on the exit aperture or surface of the optical system 12. Projected on screen 15 are the corresponding infinitesimal intensity distributions 16 and 17 from points 13 and 14, respectively.

The far-field intensity pattern is constituted as a superposition of these images, and the optical system's suitability is judged thereby. This definition of source image applies even when these infinitesimal intensity distributions typically have no literal resemblance to an actual view of the luminous source. FIG. 2A shows far-field angular space with vertical axis 21 and horizontal axis 22. Source-image 23 is centered on direction 24, which is generally the only controllable variable in a single-surface design. The actual shape of source-image 23 is uncontrolled. This is shown more concretely in FIG. 2B, depicting source-images 25 centered on controlled directions 26, which are the result of a free-form single-reflector luminaire. Source-images 25 can be seen to have varying orientations, an inevitable result of a single-surface design.

Figure 3B:
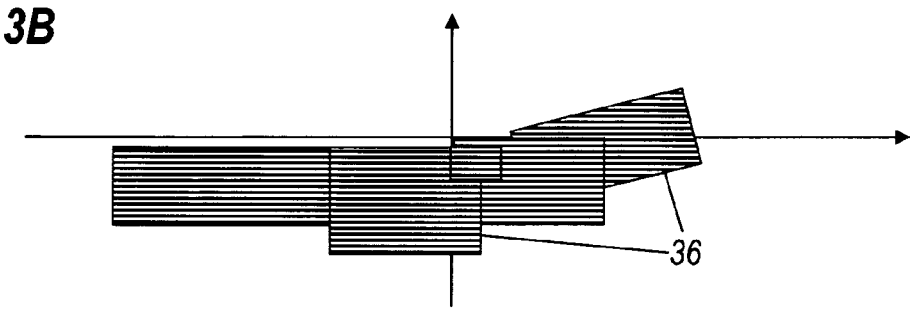

In contrast, the design methods disclosed according to present embodiments has a much more practical degree of control. FIG. 3A shows far-field vertical axis 31 and horizontal axis 32, with two controllable directions 33 and auxiliary controllable direction 34, defining source-image 35. FIG. 3B shows multiple source-images 36, having a controlled summation similar to the sum of uncontrolled images of FIG. 2B.

The three-dimensional simultaneous multiple surface (SMS-3D) methods according to present embodiments are procedures for designing two optical surfaces such that two given normal congruencies $W_{i1}$, $W_{i2}$ are transformed (by a combination of refractions and/or reflections at these surfaces) into another two given normal congruencies $W_{o1}$ and $W_{o2}$.

Figure 4:
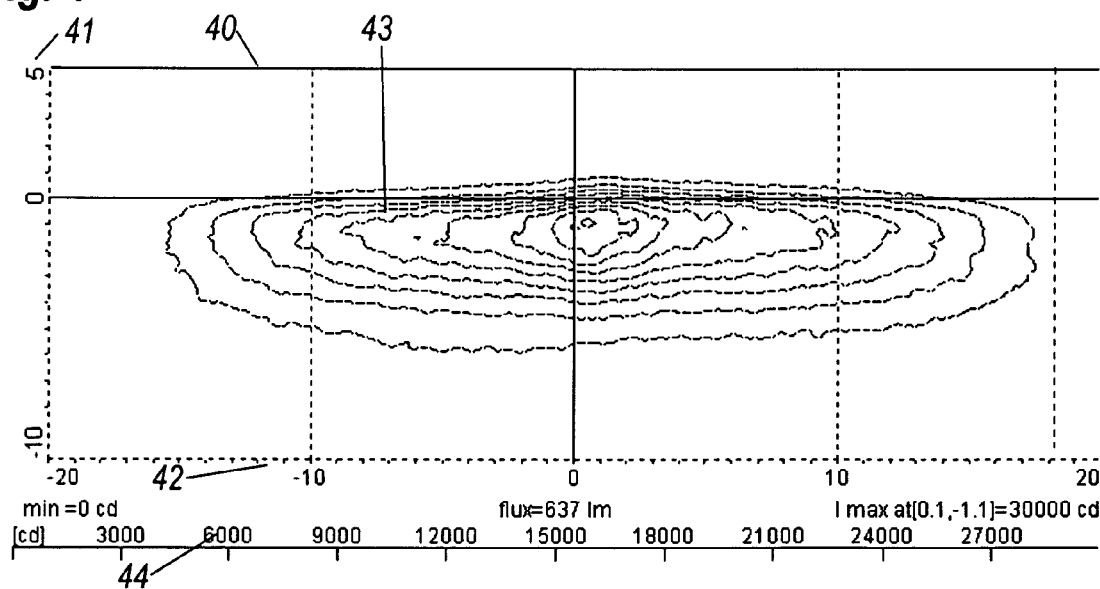
FIG. 4 shows an exemplary far-field pattern of a preferred embodiment, an automotive headlamp.

Accordingly, it becomes possible to so tightly control the resultant superposition of source-images as to fulfill a well-defined prescription. FIG. 4 shows far-field intensity space 40 with vertical axis 41 and horizontal axis 42, both graduated in degrees. Intensity contours 43 are in accordance with scale 44.

Photometricly, far-field intensity is the product of emitter luminance and luminaire area. Thus to achieve a given intensity, the relatively lower luminance levels of LEDs typically necessitate relatively larger projected images of an LED source. This image-size factor is the result of fundamental limits of energy conservation, so that attempts to reduce image size generally result in a proportionate reduction in overall output flux, unless aperture size is increased instead.

Enlarging either aperture-size or source-image size, however, is often undesirable, for example, because the aperture size goal may have already been fixed by engineering, cost, and/or styling reasons. The alternative reduction of source-image size (which typically reduces overall output and luminous efficiency) is often undesirable because of the currently high per-lumen costs of high-power LEDs as compared to those of incandescent lamps. Thus a low-efficiency LED headlamp is not commercially feasible now.

When projected images are large, control of their shape and position becomes quite difficult, because small directional changes of these images can lead to dramatic changes in the overall intensity pattern, as shown in FIG. 2. This control of image shape and position is achieved according to some embodiments by prescribing the exit trajectories of the rays coming from the perimeters or corners of the source, such as an LED chip where the corners produce the chip's edge rays. As FIG. 3 shows, the present SMS-3D methods achieve, and consequently also enable relative maximum reduction of exit aperture-size generally without efficiency losses. In contrast, other based on small-source approximation fail to control these images. For instance, the image size of a chip on the exit-aperture of a device designed in accordance with L. A. Cafarelli, V. I. Oliker, "Weak solutions of one inverse problem in geometrical optics", Preprint, (1994) referenced in L. A. Cafarelli, S. A. Kochengin, V. I. Oliker "On the numerical solution of the problem of reflector design with given far-field scattering data", Contemporary Mathematics, Vol. 226 (1999), 13-32, incorporated herein by reference, approximately achieves a desired solid angle but its shape is completely uncontrolled. When the small source approximation is applicable, this image distortion affects only a small set of far-field directions, but when a relatively large source image is implemented a large set of far-field directions are affected, so that far-field intensity goes out of control and the desired prescriptions are unsatisfied.

The SMS-3D methods conceptually begin according to some present embodiments with the idea that a causal series of time-successive optical wavefronts is a one-parameter family of surfaces, such that the parameter is a function of the time at which the propagating wavefront had the very shape given by that particular parameter value. That is, each distinct value of the parameter specifies a single two-dimensional surface extending laterally through three-dimensional space, with nearby parameter values specifying the time-successive surfaces that are adjacent in a direction generally orthogonal to the lay of the surfaces. A material example of such an extended surface is the curved roof of a domed stadium. A mathematical specification of its shape would be cast in parametric form so that a small change in the parameter forms an imaginary surface just above it that is similar but not identical in shape.

Figure 5:
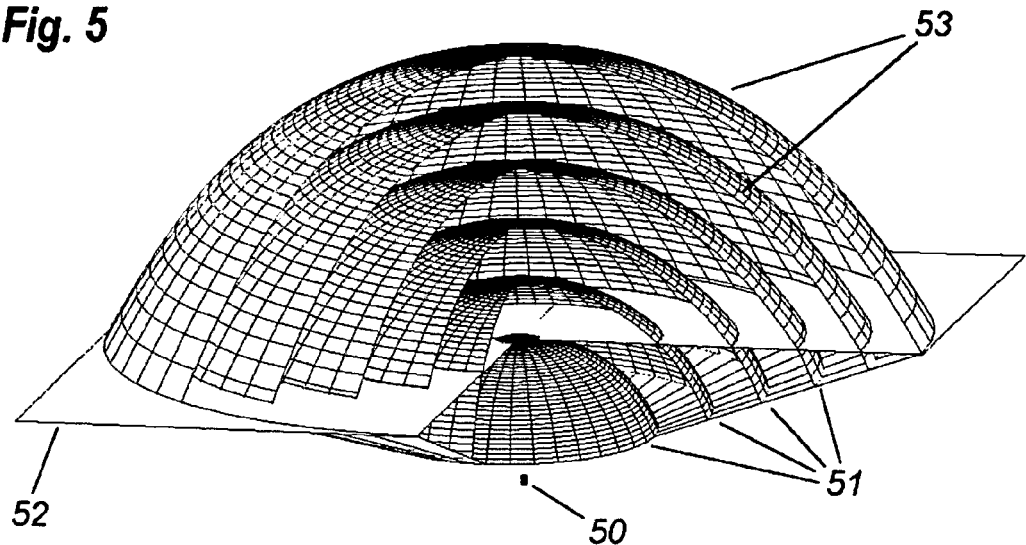
FIG. 5 shows a succession of propagating wavefronts, refracting through a planar interface.

A series of such mathematical shapes would depict the one-parameter family. Their succession is determined by Maxwell's equations of electromagnetic propagation. FIG. 5 shows a view of such a succession of concentric hemispherical wavefronts issuing from radiant point-source 50, emitting hemispherical wavefronts 51. A refracting surface 52 is also depicted in FIG. 5 establishing an interface between air below and a substance or medium above have a defined example, refractive index n, for example, n=1.5. Refracted wavefronts 53, shown with a cutaway view for clarity, represent, for example, light refracting inside a denser medium above interface 52.

An inhomogeneous medium is one with spatially varying refractive index, which desirably is known at every point in order to more accurately calculate such a wavefront succession across space as that shown for the homogeneous case of FIG. 5. An everyday example of an inhomogeneous medium is air itself exemplified on a hot day, when looking at distant objects through a telescope and seeing the objects distorted by waves of differential temperature rising up from the hot ground.

With homogeneous media, however, the same functional formula generates each successive surface, save for the different values of the parameter. In describing the propagation of light, each such surface is a solution of the wave equation as it acts upon the prior wavefront. The simplest example is a series of concentric spheres, parameterized by radius. These are the time-successive positions of a wavefront from a point source, as it propagates into a medium with homogeneous refractive index. In such a medium, all the successive wavefronts of any such time-series are deterministic consequences of an initial wavefront, as expressed by the one-parameter family of surfaces all having the same mathematical formula, that of a sphere, just a different parameter value, or radius.

Any such series of wavefronts, in satisfying the laws of electromagnetic propagation in a transparent medium, define a normal ray congruence, which is any set of rays with trajectories normal to any one of the wavefronts, and hence to all of them in succession. A ray is defined as a space-curve that is in accordance with Fermat's principle, that of being an extremal in optical path length. Because the rays of a normal congruence cut their wavefronts at right angles, they form an 'orthotomic' system of rays, each one of which is known as an orthotomal ray of that wavefront. The shape-complexity of a wavefront can be expressed by the minimum number of orthotomal rays that totally sample its phase space and thus enable the recovery of an explicit representation of a surface:

$$z = f(x,y) = W_j(x,y) \qquad \text{Eq. (1)}$$

This minimum set of orthotomal rays forms a normal congruence, one that is a complete representation of its wavefront.

Propagating plane waves are perpendicular to an orthotomic system of parallel rays from infinity. There should be enough orthotomal rays to define a finite beam. Such a system of parallel rays can be refractively transformed to a system with a point source, in two ways: an ellipsoid when the source is in the medium of higher refractive index or a hyperboloid if lower. Both of these are surfaces of revolution with eccentricity a function of the index of refraction. Both are examples of a more general type of fourth-order curve called the Cartesian oval, which transforms rays from one point to those from another point, with parallel rays the result of a point at infinity.

More general instances of refractive or reflective surfaces can be characterized by such transformation-pairs of orthotomic systems of rays. The direction of propagation can actually be either way along such rays, because electromagnetic propagation is time-reversible. More pertinent to the present embodiments is the fact that Snell's law of refraction and the law of reflection assure that a pair of normal congruences can uniquely determine a surface that transforms one into the other.

A Cartesian-oval procedure is a method for designing an optical surface (refractive or reflexive) such that a given normal congruence $W_i$ is transformed (by refraction or by reflection) into another given normal congruence $W_o$. These optical surfaces are called Cartesian ovals (see for example, M. Born, E. Wolf, Principles of Optics, (Pergamon, Oxford, 1975), p.134, incorporated herein by reference). Strictly speaking, Cartesian ovals are only the surfaces obtained by this procedure when both congruences $W_i$ and $W_o$ are spheres (including the case of spheres of infinite radius, i.e., planes). Below the name Cartesian oval is used in the broader meaning admitting non-spherical congruences $W_i$ and $W_o$.

Figure 6:
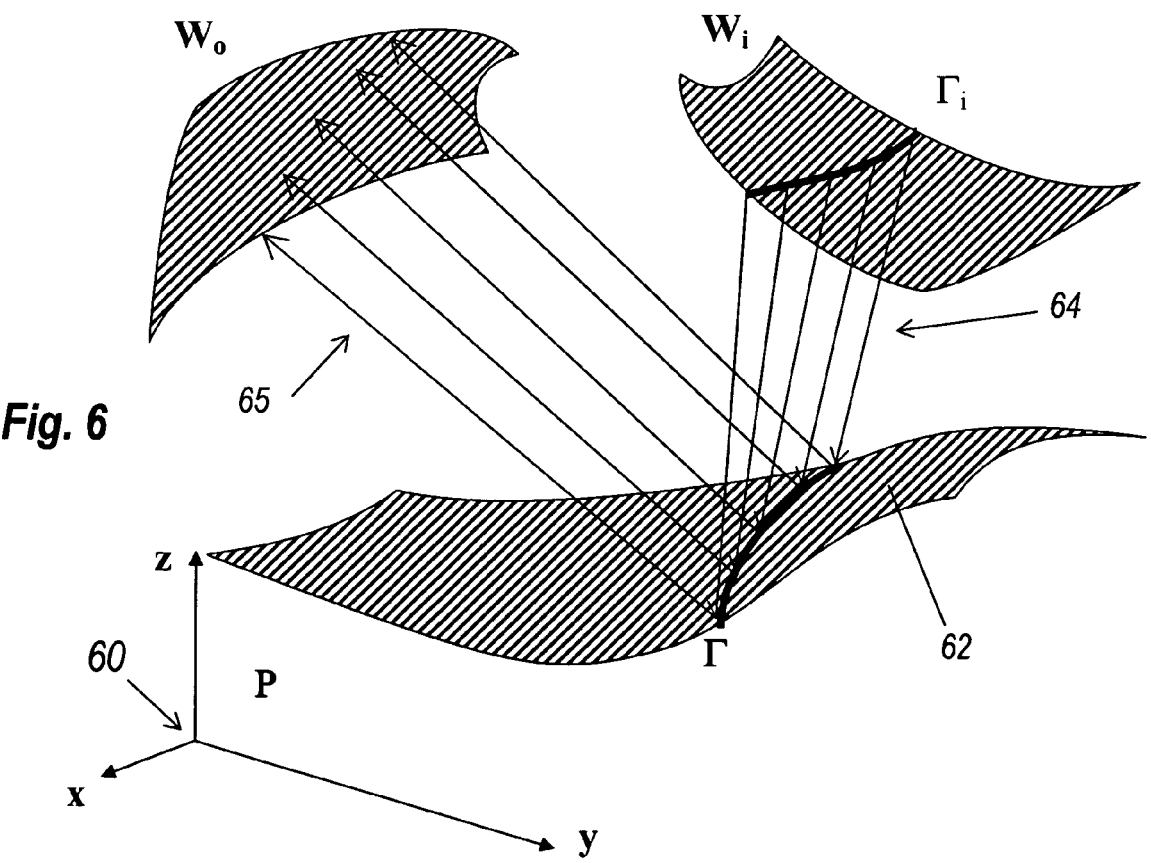
FIG. 6 shows a Cartesian-oval reflector.

An optical length to a wavefront can be defined at any of the points crossed by the rays of the congruence (this optical length to the wavefront can be positive or negative depending on the direction of ray advance). FIG. 6 depicts region $\mathcal{R}$ of space, with x-y-z coordinate axes 60, wherein the optical lengths to wavefronts $W_i$ and $W_o$, respectively, are defined for all its points, i.e., the functions $L_i(x,y,z)$ and $L_o(x,y,z)$ are defined for any point (x,y,z) belonging to $\mathcal{R}$. The generalized Cartesian oval problem is that of finding optical surface 62 that deflects the rays of $W_i$ into the rays of $W_o$, and vice versa in accordance with the reversibility of light paths. Cartesian ovals are defined, for example, in M. Born, E. Wolf, Principles of Optics, (Pergamon, Oxford, 1975), p.134, such that:

$$L_i(x,y,z) - L_o(x,y,z) = \text{const.} \qquad \text{Eq. (2)}$$

At each point of a Cartesian oval the surface normal can be calculated in either of two mutually consistent ways:
1. For a Cartesian oval surface that is parameterized with parameters u and v (P(u,v)), the surface normal is parallel to $P_u \times P_v$, which is the cross product of the surface's partial-derivative vectors.
2. Using the deflection law and the directions of the incoming and outgoing rays.

Assume that only a one-parameter set of input rays of the $1^{st}$ have front $W_i$ is known, in particular rays 64 of FIG. 6 shown passing through curve $\Gamma_i$ lying on first wavefront $W_i$. The curve $\Gamma_i$, as well as the unit normal vectors of first wavefront $W_i$, are known at the points of $\Gamma_i$, as well as the direction in which those rays advance, downward for rays 64 in FIG. 6. They reflect off of Cartesian oval surface 62 to become up-going rays 65, part of $2^{nd}$ or output wavefront $W_o$.

Just as a pair of wavefronts can specify a particular surface, so can two pairs of such wavefronts uniquely specify the two surfaces that act jointly to transform each pair of wavefronts into the other pair. Both independent orthotomic systems of input rays will be perfectly transformed by two surfaces into two systems of output rays. Within limits set by real materials, the joint action of these two surfaces generates both of these transformations. The mathematical validity of these two surfaces depends on there being only one ray per input orthotomic system at all the optically active points of each surface. Caustics occurring near either solution-surface could possibly cause a violation of this uniqueness condition, implying that the input wavefronts should be well behaved.

The SMS-3D method in some embodiments utilizes two input orthotomic systems $W_{i1}$ and $W_{i2}$ of rays, and two respective output systems $W_{o1}$ and $W_{o2}$. First surface $S_i$ and second surface $S_o$ can be refractive, reflective, or internally reflecting, respectively designated by R, X, and I in characteristic acronyms. For example, a completely transmissive free-form lens would be an RR-3D (a three-dimensional refractive, refractive lens).

Because they are causally coupled by the joint action of first surface $S_i$ and second surface $S_o$, the combined sets of rays $W_{i1}$ and $W_{o1}$ can be designated as first normal congruence $W_1$, and the combination of $W_{i2}$ and $W_{o2}$ designated as second normal congruence $W_2$.

Maxwell's equations of electromagnetism have a simplified form, when well away from a light source, i.e., at a large number of wavelengths from the source. For any wavefront, a scalar function l(r), the optical path-length or 'eikonal', is defined everywhere that the wavefront can go in space. This function determines the behavior of the light ray completely independently of the amplitude of the electric or magnetic vectors. This means that the rays from a dim source will behave exactly the same as those from a bright one.

These abstract light rays propagate in such a fashion as to satisfy the single differential equation (known as the eikonal equation):

$$(\text{grad } l)^2 (l/x)^2 + (l/y)^2 + (l/z)^2 = n^2(x,y,z) \qquad \text{Eq. (3)}$$

The function n(x,y,z) describes a spatially varying refractive index (the above-described inhomogeneous medium) with an explicit dependence upon position, as expressed by spatial coordinates. In a homogeneous medium n=constant, so that the rays are straight lines. In this case the optical path length from any one wavefront to a later one is the same along any orthotomic ray, which accordingly can all be said to be 'optically parallel'.

The solutions to the eikonal equation are the geometrical wavefronts l(r)=constant. Because of the eikonal equation, (grad l)/n is an orthotomal unit vector s, aligned with the average Poynting vector S and thus normal to the geometrical wavefront, corresponding to constant electromagnetic phase. Aligning the unit vectors of successive wavefronts gives a geometrical light ray, an oriented space curve that is a member of the orthotomic system for this set of wavefronts.

A refraction or specular reflection will transform the wavefront and redirect the associated orthotomal rays into another set of orthotomal rays. This is known as the Malus-Dupin theorem, and is a factor in implementing some embodiments of the SMS-3D methods.

Because they are parallel to the direction of energy transport, adjacent rays of an orthotomic system will, when forming a tube, enclose a constant amount of luminous flux. It is important to note that the eikonal equation is independent of intensity on the wavefront, so that illumination engineering involves further considerations than wavefront engineering. Some embodiments radiometrically define the flux distribution across a wavefront at least in part for illumination considerations. This is because a ray itself is not a line but an elemental solid angle dω, directed along unit vector R, and associated with an oriented elemental surface dA on the wavefront. Inside the solid angle dω is an image or partial image of the ray's source, having luminance L, such that a tube of rays spatially enclosing dA and angularly enclosing dω have an associated flux L*dA*dω. Due to the inverse square law, spherical wavefronts at a large distance r from a source of semi-width s can be characterized by $$d\omega = \pi (s/r)^2 \qquad \text{Eq. (4)}$$

according to the small-angle approximation. When examining rays that are close to an extended source, numerous separate rays would be established as coming from separate wavelength-sized patches on the source.

Huyghens' principle states that the wave equation is equivalent to every point on the wavefront being an emitter of spherical wavelets, so that later wavefronts are the envelope of the entire set of wavelets from an earlier wavefront. When wavefronts begin on the surface of an emitting source, such a decomposition will preserve all the directional-emission characteristics of the source's surface, as a flux distribution on the succeeding wavefronts.

Variable flux-density on a wavefront can be represented as the varying areal density of a statistically significant set of rays, each of constant flux. This is an important key to engineering large gradients in intensity in the far field of a luminaire, used in defining bounded illumination with sharp cutoffs, such as for automobile headlamps.

The SMS-3D methods are applied according to some implementations to the design of imaging and nonimaging optical systems substituting (with advantage) Cartesian Oval procedures when there are enough degrees of freedom, e.g., when there is more than one surface to design.

The present embodiments provide methods for use in simultaneously specifying a pair of surfaces that accomplish at least both of the desired transformations, and secondly includes numerous practical illumination embodiments derived therefrom.

Some preferred embodiments described herein provide for a two-surface refractive lens that is to be tailored by the SMS-3D method for two normal congruences, designated $W_1$ and $W_2$. As previously mentioned, these entities include the specified input wavefronts $W_{i1}$ and $W_{i2}$ and output wavefronts $W_{o1}$ and $W_{o2}$, respectively, as transformed by the lens, which consists of input surface $S_i$ and output surface $S_o$. These surfaces are to be designed for this transformation task, and remaining surfaces in the system are typically prescribed beforehand. This means that any ray of the first input wavefront $W_{i1}$ entering in the optical system exits it as a ray of the first output wavefront $W_{o1}$ (the same holds for $W_{i2}$ and $W_{o2}$). The rays are normal to wavefront $W_{i1}$ (or $W_{i2}$) before the deflection at surface $S_i$ and are normal to wavefront $W_{o1}$ (or $W_{o2}$) after the deflection at surface $S_o$.

Since the optical system couples input wavefronts $W_{i1}$ and $W_{i2}$, the normal congruences $W_{i1}$ and $W_{o1}$ will be causally the same, and either of the two wavefronts $W_{i1}$ or $W_{o1}$ can characterize this normal congruence, which will be called $W_1$. Similarly $W_2$ is the normal congruence having $W_{i2}$ and $W_{o2}$ as wavefronts.

Let $P_0$ be a known initial point on input surface $S_i$.

$N_0$ be a known normal unit vector of the surface $S_i$ at $P_0$.

$L_1$ be a known optical path length from the wavefront $W_{i1}$ to the wavefront $W_{o1}$ (for the rays of the normal congruence $W_1$).

$L_2$ be a known optical path length from $W_{i2}$ to $W_{o2}$ (for the rays of the other normal congruence, $W_2$).

Thus $P_0$, $N_0$, $L_1$, $L_2$, $W_{i1}$, $W_{i2}$, $W_{o1}$, and $W_{o2}$ are given as initial conditions, starting points of the design. The SMS-3D method according to some implementations calculates therefrom a set of points on the input and output surfaces $S_i$ and $S_o$, as well as the unit vectors normal to the surfaces at these points. This set of points and unit vectors is referred to as an SMS chain of $P_0$, $N_0$, $L_1$, $L_2$.

Figure 7:
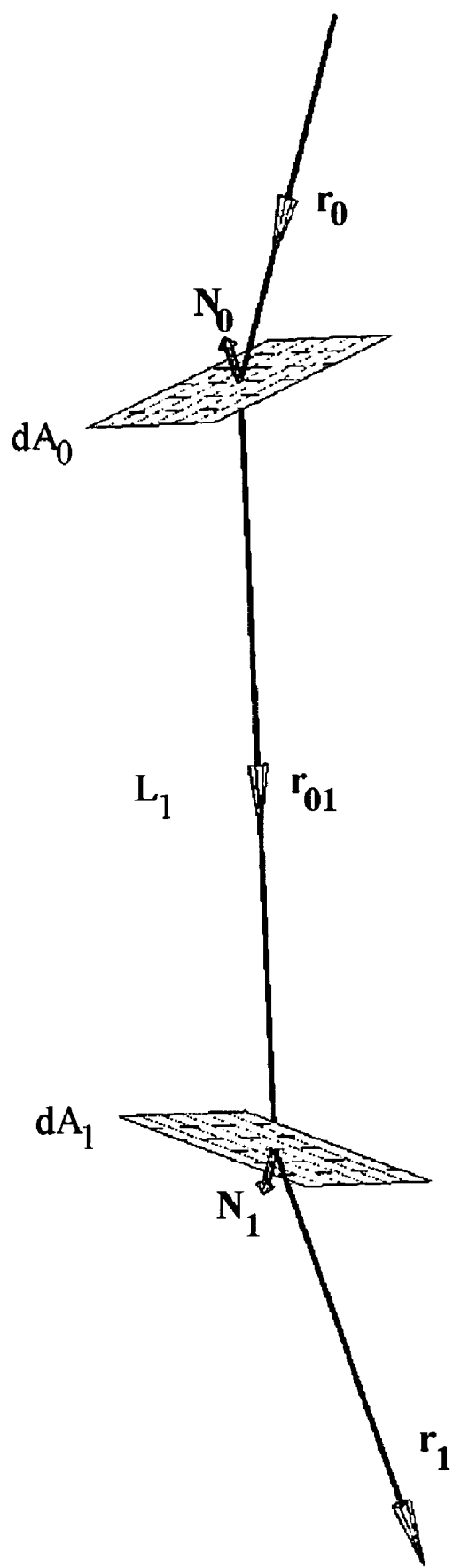
FIG. 7 depicts a step in an SMS-3D method according to some embodiments, whereby an initial edge-point on an outer surface generates a corresponding initial edge-point on an inner surface.

As depicted in FIG. 7, the SMS-3D method begins at a pre-specified initial point $P_0$, at the center of elemental area $dA_0$, that is the start of making the input surface. It can be preferably positioned at the center of the lens, at a thinnest portion of the lens, alternatively and/or additionally at an edge, as for example on an integral mounting flange and/or at other positions of a lens. From this initial point the lens shape is mathematically 'grown' by the SMS-3D method according to some embodiments.

A unique ray $r_0$ of a first congruence, known to past through this initial point, is refracted, by specified surface-normal unit vector $N_0$. The ray is refractively transformed into ray $r_{01}$, thence propagating a known distance $L_1$, so that a first point $P_1$ of an output surface is thereby determined. Distance $L_1$ may be specified, for example as the thickness of a mounting flange, the thickness at a center of the lens, or other thicknesses of the lens depending on the selection of location of initial point $P_0$. Refracted ray $r_{01}$ is traced for distance $L_1$ to point $P_1$ on surface element $dA_1$ located at the edge of surface $S_i$. Point $P_1$ is the source of ray $r_1$ of an output normal congruence $W_{o1}$ (not shown). Knowledge of unit-vectors $v_{o1}$ and $v_1$ enables the calculation of surface-normal unit vector $N_1$, according to the vector version of Snell's law:

$$N_1 \times n \, v_{o1} = N_1 \times v_1 \qquad \text{Eq. (5)}$$

An output surface $S_o$ is an interface between two optical media having the ratio n between their refractive indices. The orientation of surface element $dA_1$ is defined by surface normal $N_1$. This methodology would apply equally to a reflective surface.

Figure 8:
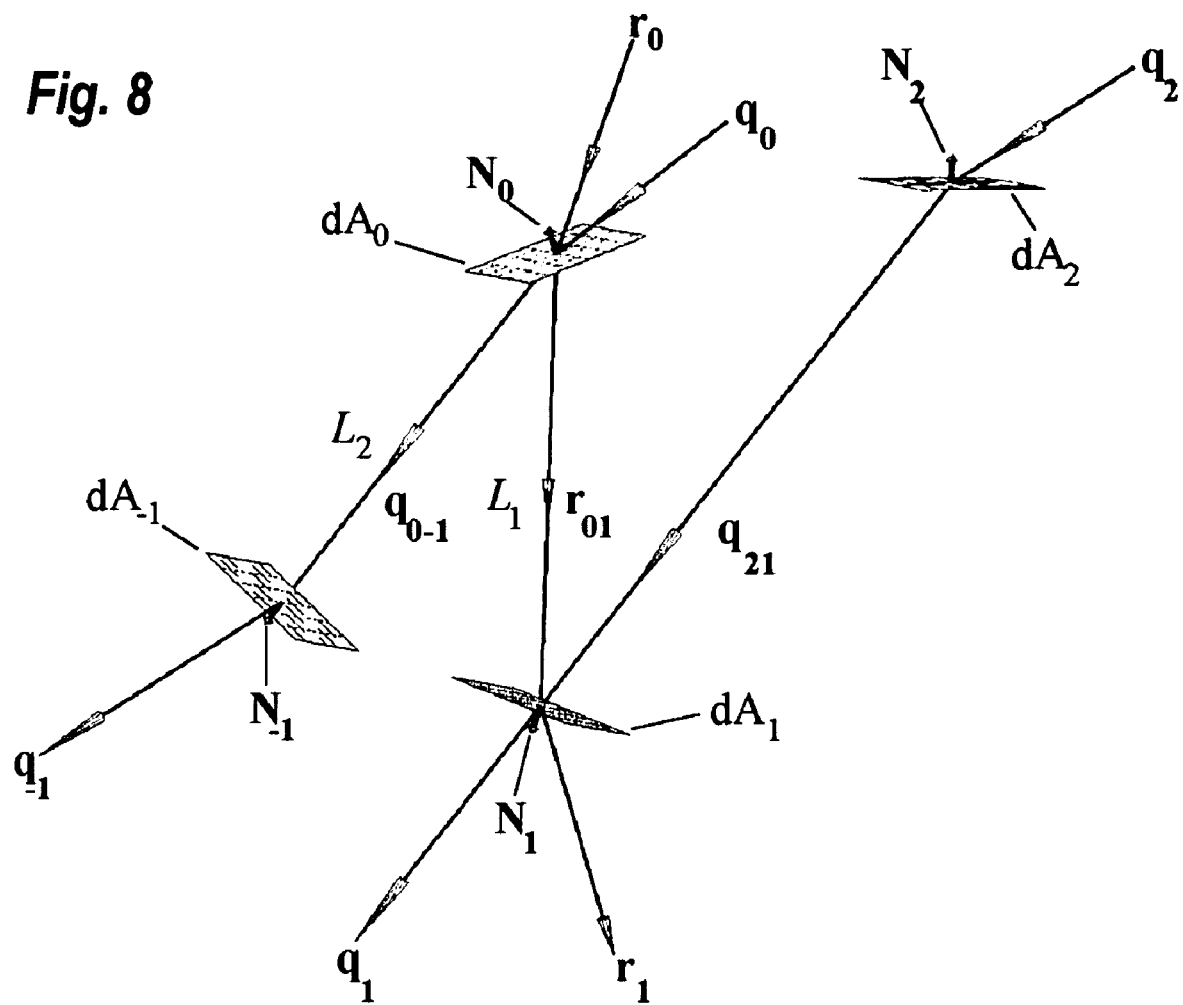
FIG. 8 shows initial steps of an initial alternating cycle chain of a full SMS chain.

FIG. 8 depicts how the second ray congruence $W_2$ with its unique ray $q_0$ through point $P_0$ is refracted by surface normal $N_0$ into internal ray $q_{0-1}$, which is propagated for the other specified distance $L_2$ to point $P_{-1}$ on output surface $S_1$ (portions of which are shown as surface elements $dA_1$ and $dA_{-1}$). The requisite surface normal $N_{-1}$ can be calculated from the previously calculated $q_{0-1}$ and the output ray $q_{-1}$ into which it must be transformed.

At output-surface point $P_1$, surface element $dA_1$ intercepts known ray $q_1$ of second wavefront $W_2$. Surface normal $N_1$ gives rise to internal ray $q_{21}$ that is backtracked to a second input-surface point $P_2$, which is where internal ray $q_{21}$ meets known input ray $q_2$. This association of output ray $q_1$ and input ray $q_2$ is part of the initial wavefront-knowledge. This derivation of point $P_2$ is one cycle in the SMS-3D chain method in some embodiments. A similar step in the opposite direction would begin at $P_{-1}$, in order to generate point a point $P_{-2}$ (not shown).

Figure 54:
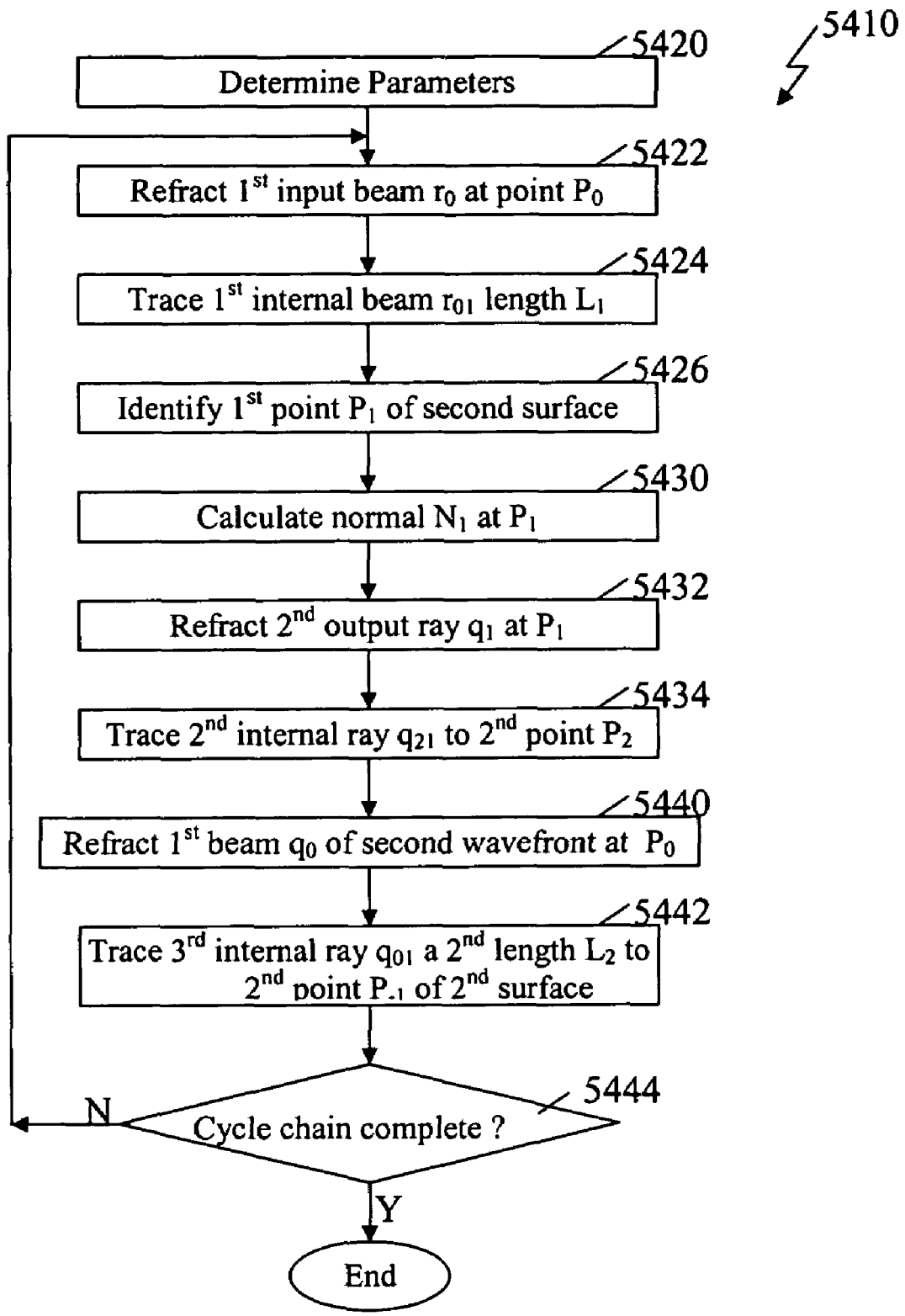
FIG. 54 depicts a simplified flow diagram of a process for implementing a cycle chain method in defining a plurality of span points for first and second surfaces.

FIG. 54 depicts a simplified flow diagram of a process 5410 according to some embodiments for implementing a cycle chain method for defining a plurality of span points for first and second surfaces. In step 5420, initial conditions are determined and/or specified. These initial conditions include, in some embodiments, first and second input wavefronts (e.g., defined by beams $r_0$ and $q_2$ of FIG. 8), first and second output wavefronts (e.g., defined by beams $r_1$ and $q_1$ of FIG. 8), an initial point $P_0$, a normal $N_0$ to the elemental area $dA_0$ at point $P_0$, and a first predefined distance $L_1$.

In step 5422, a first input beam $r_0$ is refracted by the elemental area $dA_0$ at the initial point $P_0$, producing a first transformed ray $r_{01}$. In step 5424, the transformed ray $r_{01}$ is propagated the predefined first length $L_1$. In step 5426, a first point $P_1$ of the second surface is identified at the point where the transformed ray $r_{01}$ reaches the defined first length $L_1$.

At the first point $P_1$ of the second surface, a normal $N_1$ is defined in step 5430 of an elemental area $dA_1$ at point $P_1$ of the second surface (e.g., see equation 5). In step 5432, a second output ray $q_1$ of the second output wavefront is refracted as it is traced back through point $P_1$ producing a second transformed ray $q_{21}$ through the second surface according to the defined normal $N_1$. In step 5434, the second internal transformed ray $q_{21}$ is traced back to a second input surface to define a second input point $P_2$, which is where internal ray $q_{21}$ intercepts a known second input ray $q_2$ of the known second input wave front.

In step 5440, a first input ray $q_0$ of the second wavefront is refracted at the first input point $P_0$ according to the known normal No generating a third transformed internal ray $q_{01}$. In step 5442, the third internal ray $q_{01}$ is propagated a second known distance or length $L_2$ to intercept a second point $P_{-1}$ of the second surface. In step 5444, the process determines whether the cycle chaining is complete. If not, the process returns to step 5422 to generate alternating additional points of the first and second surface from the perimeter points previously generated in the cycle (e.g., second input point $P_2$ and second output point $P_{-1}$).

FIG. 9 depicts the continuation of this process into one example of a full SMS chain of span points, graphed in xyz space 90. Even-numbered set of span points 92 are on an input side and odd numbered set of span points 91 ($P_1$, $P_{-1}$, $P_3$, $P_{-3}$, $P_5$, $P_7$, $P_9$) on an ($P_0$, $P_2$, $P_{-2}$, $P_4$, $P_{-4}$, $P_6$, $P_8$) output side. Each combination of a point $P_i$ and its associated normal $N_i$ is a link in this chain. Wavefronts $W_1$ and $W_2$ are known everywhere along this full chain, to derive this series of links.

Once $W_{i1}$, $W_{i2}$, $W_{o1}$ and $W_{o2}$ are given and/or selected, not all combinations of $P_0$, $N_0$, $L_1$, $L_2$, lead to a SMS chain. According to some embodiments:

1. Points $P_i$ are defined such that one ray and only one ray of $W_{i1}$ (and one ray and only one ray of $W_{i2}$) passes through each point of the chain on surface $S_i$ and, similarly, one ray and only one ray of $W_{o1}$ (and one ray and only one ray of $W_{o2}$) passes through the points of the chain on surface $S_o$. This condition excludes surface-points close to any caustics of the normal congruences. This is because a caustic is basically a breakdown of the ray-assignment to wavefronts (see for example, J. F. Nye, Natural Focusing and the Fine Structure of Light, Institute of Physics Publishing, Philadelphia, 1999, incorporated herein by reference).

2. The ranges of values of lengths $L_1$ and $L_2$ leading to a SMS chain are also limited. These ranges depend on the relative position of $P_0$ and the wavefronts $W_{i1}, W_{i2}, W_{o1}$ and $W_{o2}$.

In general, it is not possible to extend the chains indefinitely in both directions, i.e., the chain has a finite range of links (points and normals). Outside this range, the application of the SMS-3D procedure begins to break down and/or gives no solution. The range of points (and normals) of the chain will be called length of the chain. In principal, any point $P_i$ on the chain could be used to derive the rest of the chain, equally well as the actual initial point $P_0$.

FIG. 10 depicts the smoothing of SMS chains. Let $\{P_{2j}\}$ be the set of points of a SMS chain belonging to the input surface $S_i$ and let $\{P_{2j+1}\}$ be the set of points belonging to output surface $S_o$. FIG. 10 shows smooth curve $C_i$ passing through $\{P_{2j}\}$ and smooth curve $C_o$ passing through points $\{P_{2j+1}\}$. The minimum-order interpolation curve passing through all points, on one side, is called smooth, or at least one passing through five of the closest points to $P_0$. Tangent Unit vector $t_0$ (see FIG. 11) is tangent to curve $C_i$ at point $P_0$. A smooth SMS chain generated by $P_0$ is defined as that fulfilling the tangency condition $$t_0 \cdot N_0 = 0 \quad \text{Eq. (6)}$$

As long as any caustics of the wavefronts are far from $\{P_{2j}\}$ and $\{P_{2j+1}\}$, the approximation $$t_j \cdot N_j \approx 0 \text{ for } j \neq 0 \quad \text{Eq. (7)}$$

holds for unit vector $t_j$ tangent to the curve $C_i$ at point $P_j$, where $N_j$ is the normal of the link $(P_j, N_j)$. Such curves as $C_i$ and $C_o$ are hereinafter termed spines. Minor changes in the links can bring them exactly onto a suitable spine, resulting in a smooth SMS chain as described fully below through an iterative process.

In some embodiments at least one of two steps is used to calculate a smooth SMS chain (points and curve) from any SMS chain of points alone:

1. Adjust a length $L_2$ to fulfill the tangency condition (this can be done according to some implementations with an iterative method for finding the roots of an equation).
2. Rotate the normal vector $N_0$ around an axis normal to $N_0$ (the unit vector in the direction of this axis is called $\tau$ (rotational unit vector) until the tangency condition is obtained. For instance, a series of SMS chains can be generated in which the normal $N_{0,j}$ of the $j^{th}$ chain of the series is parallel to $t_{0,j-1} \times \tau$, where $t_{0,j-1}$ is the tangent (at the first point $P_0$) of the smooth curve interpolating the points of the previously calculated SMS chain (the first $t_0$ is arbitrary, provided $t_0 \times \tau \neq 0$). This procedure converges in general, to a smooth SMS chain. Note that in this procedure the final normal $N_0$ is perpendicular to the rotational unit vector $\tau$, which can be arbitrarily prescribed.

A smooth SMS chain depends on fewer parameters than an SMS chain of links. For instance, when $W_{i1}, W_{i2}, W_{o1}$, and $W_{o2}$ are given, an SMS chain depends on $P_0, N_0, L_1, L_2$, and a smooth SMS chain that is generated by adjusting $L_2$ depends only on $P_0, N_0$, and $L_1$.

Figure 11:
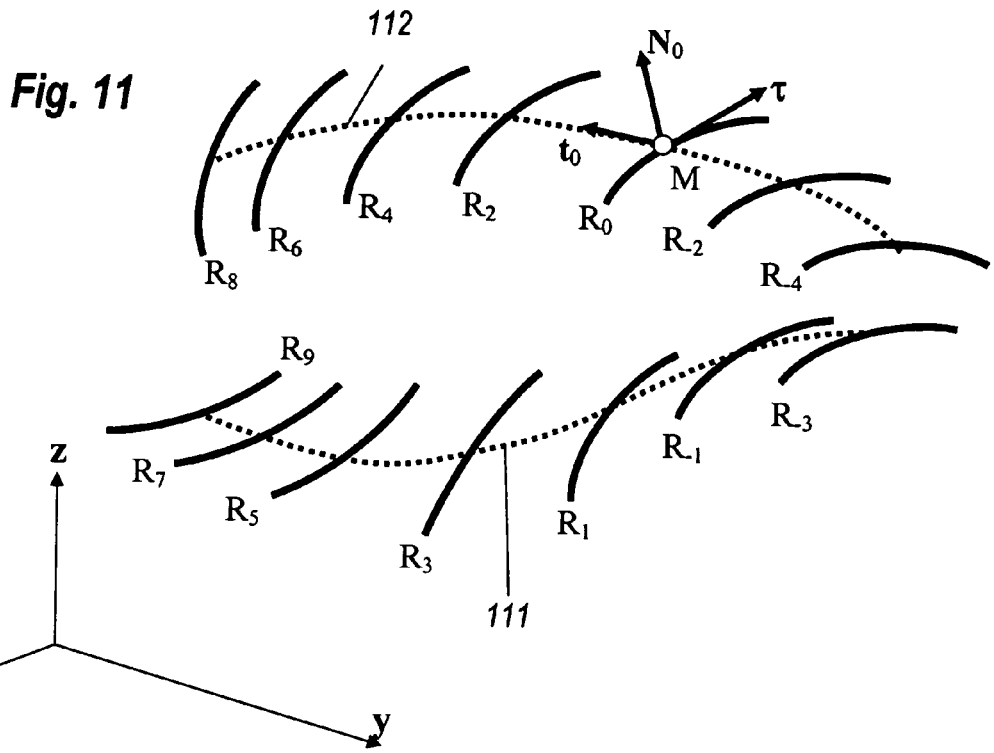
FIG. 11 shows the generation of seed ribs.

FIG. 11 shows a segment $R_0$ of an arbitrary differentiable curve (such as Spines $C_i$ and $C_o$. SMS smooth chain 112 was generated from point M of the segment curve $R_0$. Corresponding smooth chain 111 was simultaneously generated in accordance with the methods described above and shown in FIGS. 9 and 10. Rotational unit vector $\tau$ is tangent to segment $R_0$ at the point M, and tangent unit vector $t_0$ is tangent to smooth SMS chain 112. This provides that the resulting normals $N_0$ are substantially perpendicular to the curve segment $R_0$. A set of surface normals $N_0$ and their points of the curve $R_0$ are called the seed rib $R_0$. In accordance with the method depicted in FIG. 7, each of the points of curve $R_0$ gives rise to the corresponding points on curve $R_1$. Note that the calculation of the curve $R_1$ is that of a curve contained in a Cartesian oval surface when a one-parameter set of rays of one of the normal congruences is known, as shown in FIG. 10. This one-parameter set of rays is formed by the rays of $W_{i1}$ after deflection at the curve $R_0$. The normals $N_1$ (not shown) are perpendicular to the curve segment $R_1$. Similarly, further curves $R_{2i}$ and curves $R_{2i+1}$ are generated along each smooth SMS chain 112, 111, respectively. These curves $R_{2i}$ and $R_{2i+1}$ together with their surface normals will be hereinafter be called SMS ribs.

Figure 12:
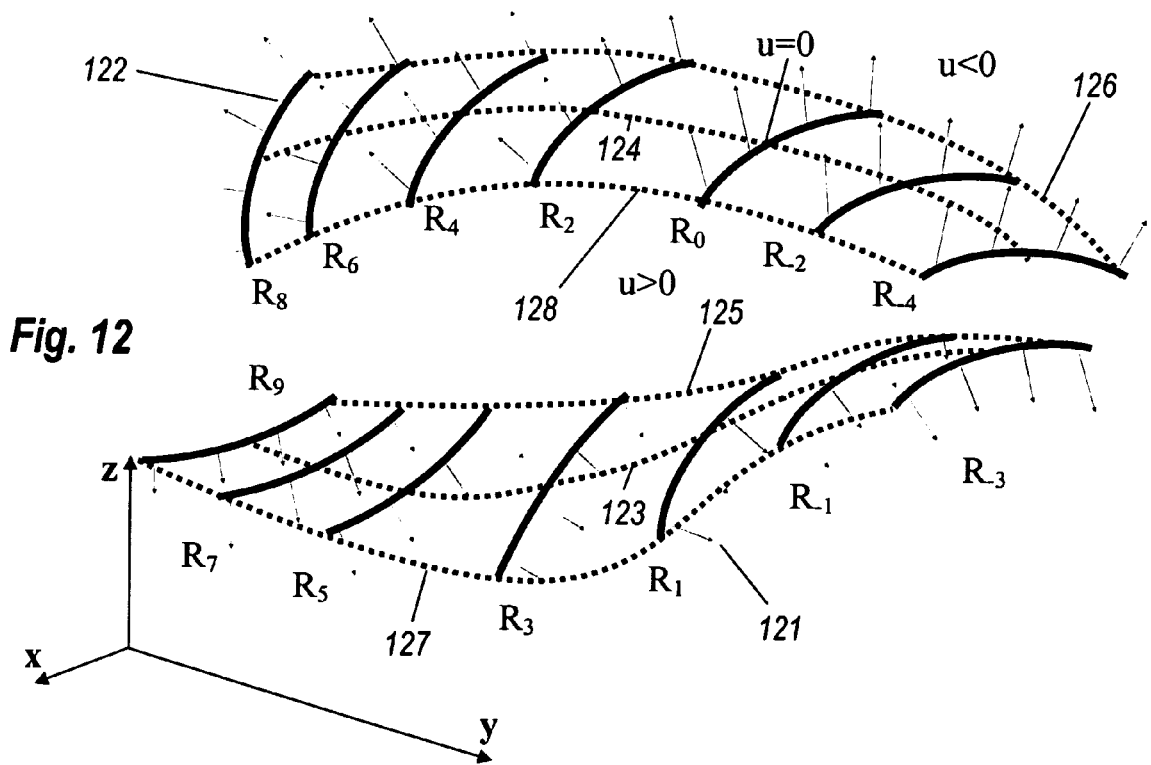
FIG. 12 shows the seed ribs with normal vectors.

FIG. 12 shows rib unit vectors 121 normal to ribs $R_{2i+1}$, which define and/or form an output surface $S_o$, and rib unit vector normals 122 to ribs $R_{2i}$, which define and/or form input surface $S_i$. The parameterization $$P = R_0(u) \quad \text{Eq. (8)}$$

in the initial seed rib R0 is also shown, with u increasing the same as coordinate x. This initial parameterization induces similar parameterizations $P = R_i(u)$ in the subsequent rib curves, so that points corresponding to the same u value are points that belong to the same SMS chain. This smooth SMS chain 124 on the input side, and simultaneously generated smooth SMS chain 123 on the output side, are defined by u=0. Each value of u defines an SMS chain, with a negative u-value defining, for example, corresponding chains 126 and 125 and positive u-value defining for example corresponding chains 128 and 127.

The selection of the seed rib $R_0$ is relatively arbitrary, although not completely so. For example, if the curve C is the one obtained as interpolation of the points of a smooth chain, then it will be unsuitable as a seed rib. In some embodiments the SMS method further generates surface patches to fit these calculated ribs and/or defined grid (similar to forming a hull of a ship over structural ribs). A process that is similar to processes of the present embodiments is known as 'skinning' in computer surface generation.

Figure 13:
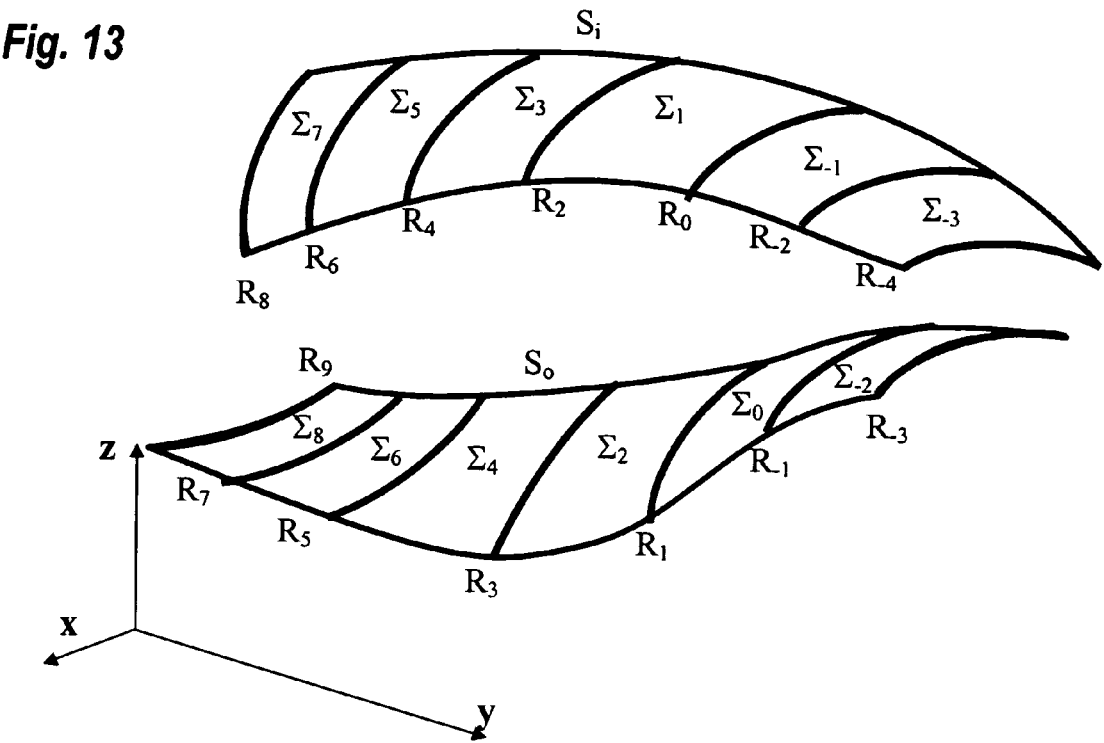
FIG. 13 shows the generation of seed patches between the seed ribs.

FIG. 13 shows seed-patch surfaces $\Sigma_m$ defined between two adjacent or consecutive ribs $R_m$ belonging to the same surface, i.e., between two consecutive even-numbered ribs ($R_{2j}$ and $R_{2(j+1)}$) for $\Sigma_m$ on input surface $S_i$ or between two consecutive odd ribs ($R_{2j-1}$ and $R_{2j+1}$) on output surface $S_o$. If i and i+2 are the indices of two ribs bounding a seed patch with index m, then m is the average value of the indices of these two ribs, i.e., m=i+1. Thus $\Sigma_m$ is such that it contains both ribs' curves and such that its normals coincide with the ribs' surface normals. In some embodiments, patch $\Sigma_m$ is calculated as a lofted surface between the ribs i and i+2 (with prescribed surface normals) (some examples of defining surfaces are introduced in L. Piegl, W. Tiller. The NURBS Book (Springer-Verlag, Berlin, 1997) 2nd ed., pp. 457; and G. Farin, J. Hoschek, M. Kim, Handbook of Computer Aided Geometric Design, Elsevier, Amsterdam, 2002, both incorporated herein by reference). Since the surface normal at every point of $\Sigma_m$ is known, the SMS chains generated by any point of $\Sigma_m$ can be calculated. In this way different patches $\Sigma_j$ can be calculated that are smoothly connected to form the input surface $S_i$ and output surface $S_o$. At each step of the SMS chain generation according to some preferred implementations, a new patch of the surface $S_i$ or $S_o$ is generated. Note that this patch calculation is a Cartesian oval calculation, such that the points and normal unit vectors are obtained consistently.

In some implementations the SMS methods induce a parameterization on the surfaces that is derived from the parameterization used in the seed patch. One of the parameters is the one induced from the seed rib, the abovementioned u. The curves with u=constant are the above-defined spines (for example, see spines Ci and C0 of FIG. 10).

Figure 14:
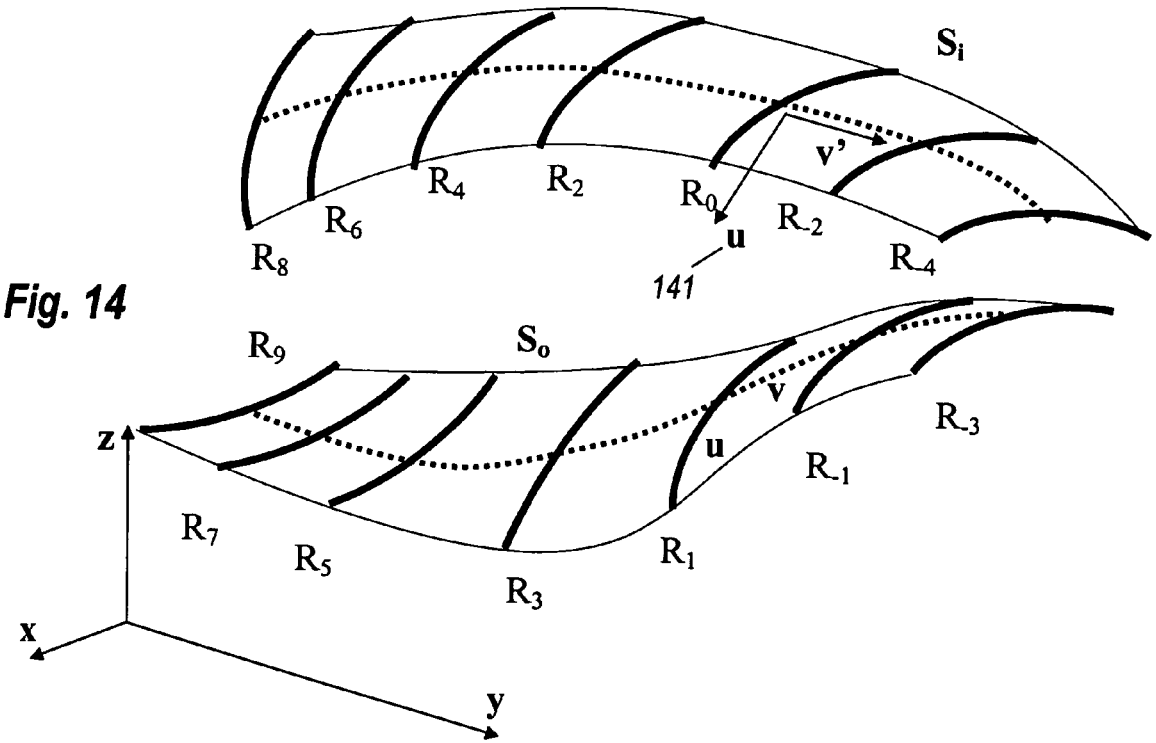
FIG. 14 shows the parameterization of the seed patches.

Referring to FIG. 14, assume that the equation of the seed patch $\Sigma_m$ is given in parametric form as $$P=\Sigma_m(u, v') \qquad \text{Eq. (9)}$$

where u is the parameter of the ribs' above-mentioned natural parameterization, with origin 141 of (u,v'). Since any point of the surfaces $S_i$ and $S_o$ can be generated from the seed patch (building up the chains derived from the points of the seed patch), there is an induced parameterization for the patches of those surfaces.

Assume that $P_m$ is a point of the seed patch $\Sigma_m$ whose normal is $N_m$. The smooth chain can be generated from the link ($P_m$, $N_m$), with the same parameters (u, v') assigned to all the points of the chain. With this parameterization, points of different patches having the same value of u and v are points that belong to the same SMS chain., i.e., each pair (u,v') defines a single SMS chain. The length of these chains is, in general, not the same. Assume that all the chains generated from the seed-patch points share a common range of links. Any of the patches $\Sigma_n$ included in this range could be used as seed patch and still generates the same surfaces $S_i$ and $S_o$. There is also a natural mapping between any pair of these patches, between points of different patches having the same parameters (u,v').

Assume now that the seed patch is built up by means of a lofted surface between the two adjacent ribs. In this case, the surfaces $S_i$ and $S_o$, at least in part, typically depend on the two starting ribs. In some preferred embodiments the two "closest" ribs, i.e., the two ribs that generate the smallest lofted surface are selected or chosen as starting ribs. This criterion gives the longest chains for points of the seed patch.

The parameter v' used in the parameterization of the patches is such that $0 \leq v' \leq 1$, where v'=0 corresponds to the rib with smaller sub-index and v'=1 corresponds to the other adjacent, longer sub-index rib. In some embodiments the surfaces $S_i$ and $S_o$ are additionally and/or alternatively can parameterized in a way derived from the initial parameterization of the seed rib, using the parameters u and v, where u is the same first parameter used in the natural parameterization of the patch. This new parameter v is defined according to v=j/2+v', (where is the index of the patch) if the surface is input $S_i$ with even patch-indices, and v=(j+1)/2+v' for output surface $S_o$. With this parameterization the equations of the surfaces can be written as $$P=S_i(u,v) \; P=S_o(u,v) \qquad \text{Eq. (10)}$$

The ribs are then the curves v=constant. The curves u=constant are the spines. Points belonging to the same chain have the same coordinate u and the same decimal part of v, with the integer part denoting the particular seed patch.

As yet, this parameterization is continuous but the derivative $P_v$ is not, in general. In order to prove this discontinuity note that the parameterization v' in the seed patch is generally arbitrary, provided that v'=0 and v'=1 corresponds to two contiguous ribs. Consequently, there is no relationship between $P_{v'}$ at v'=0 and $P_{v'}$ at v'=1. Assume for simplicity that the index of the seed patch is 0. Then the seed patch extends from v=0 to v=1 (more strictly $0 \leq v \leq 1$). Therefore $P_v$ at v=1 is in general different when it is calculated with the points belonging to the seed patch (v<1) than when it is calculated with the points of the next patch (v>1), i.e., there is a discontinuity of $P_v$ at v=1, which is induced in other patch borders.

Figure 15:
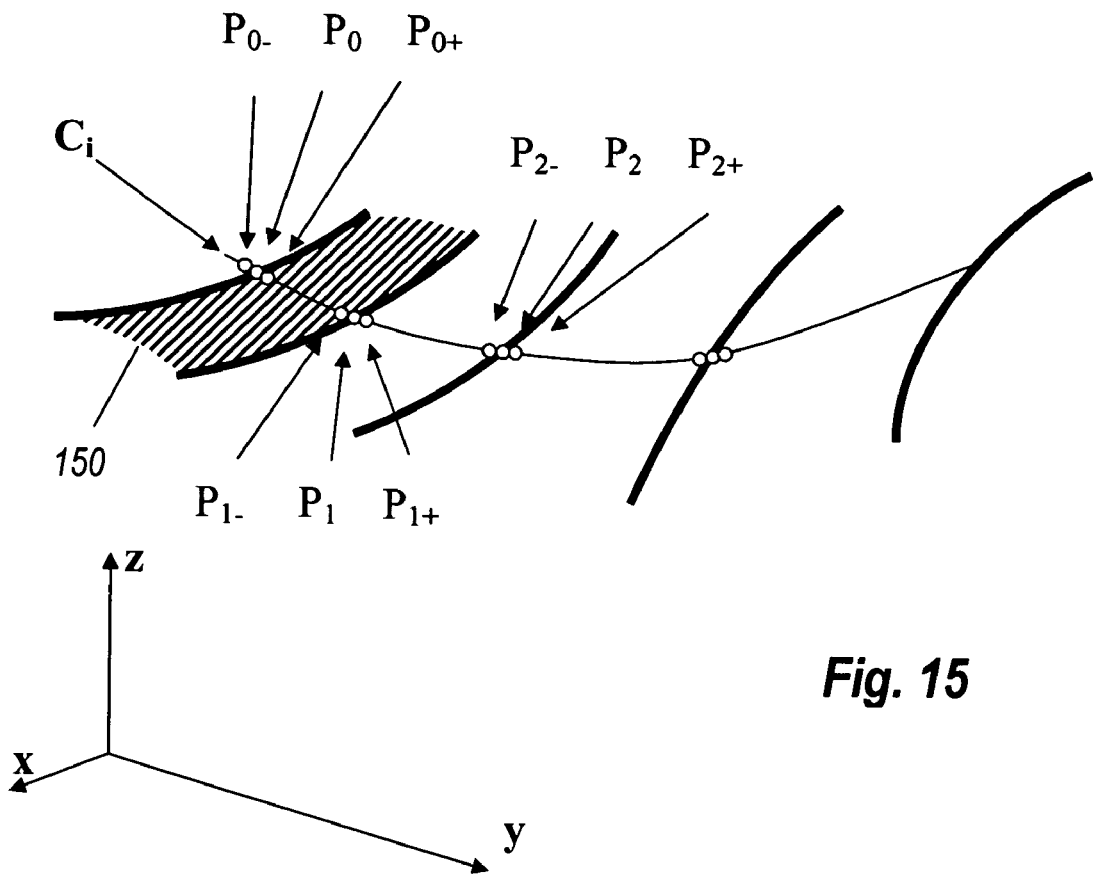
FIG. 15 shows the smoothing of a seed patch.

Referring to FIG. 15, to solve this problem the following rules are defined and utilized in some embodiments have proven to be useful to build up seed patch 150 and its (u, v') parameterization:

1. The u parameterization along the seed rib is differentiable as many times as needed. The derivative $P_u$ along the ribs can be calculated without difficulty.
2. Let $P_0$ be a point of one of the ribs demarcating the seed patch and let $N_0$ be the normal to the surface at $P_0$. Let $C_i$ be the "smooth" curve joining the points of the chain generated by the point $P_0$ on one of the surfaces. It is noted that this curve is obtained without taking care of the unit normal vectors $\{N_i\}$, i.e., the curve passes through the points of the smooth chain $\{P_i\}$ but it should not necessarily be exactly normal to the vectors $\{N_i\}$. The parameter v' along this curve is such that v' takes integer values for the points of the curve that belong to the chain and v'=0 for $P_0$.
3. Let P=P(v') be the parametric equation of the curve $C_i$. Let $\Delta_v$ be a positive number much smaller than 1 (for instance $10^{-4}$). Then the points $P(\Delta_v)$ and $P(-\Delta_v)$ are 2 points on the curve $C_i$ very close to $P_0$.

Let the points $P_{0+}$ and $P_{0-}$ be the projection of $P(\Delta_v)$ and $P(-\Delta_v)$ on a plane normal to $N_0$ and passing through $P_0$, i.e., $$P_{0+}=P(\Delta_v)-[(P(\Delta_v)-P_0)\cdot N_0]N_0$$

$$P_{0-}=P(-\Delta_v)-[(P(-\Delta_v)-P_0)\cdot N_0]N_0 \qquad \text{Eq. (11)}$$

4. Calculate the chains generated from the links ($P_{0+}$, $N_0$) and ($P_{0-}$, $N_0$).
5. At any link of these chains $(P_v)_j$ is calculated:

$$(P_v)_j = \frac{P_{j+} - P_{j-}}{2\Delta_v} \qquad \text{Eq. (12)}$$

Of particular interest are $(P_v)_0$ and $(P_v)_1$, where $P_0$ and $P_1$ are the two points of the chain located at the two ribs demarking the seed patch.

6. If $(P_v)_1$ is not normal to $N_1$, then calculate the projection of $(P_v)_1$ on a plane normal to $N_1$ and passing through $P_0$, and finally call this new vector $(P_v)_1$. This routine is unnecessary for $(P_v)_0$, since $(P_v)_0$ is necessarily normal to $N_0$.
7. Steps 1 to 6 should be done for any point of the ribs (i.e., for any value of u within the range of solutions)
8. Calculate a (u, v') parameterization such that u is the parameter along the ribs, v'=0 and v'=1 define the two ribs demarcating the seed patch and such that the derivatives with respect the parameter v' are those calculated in steps 5 and 6 above.

Figure 55:
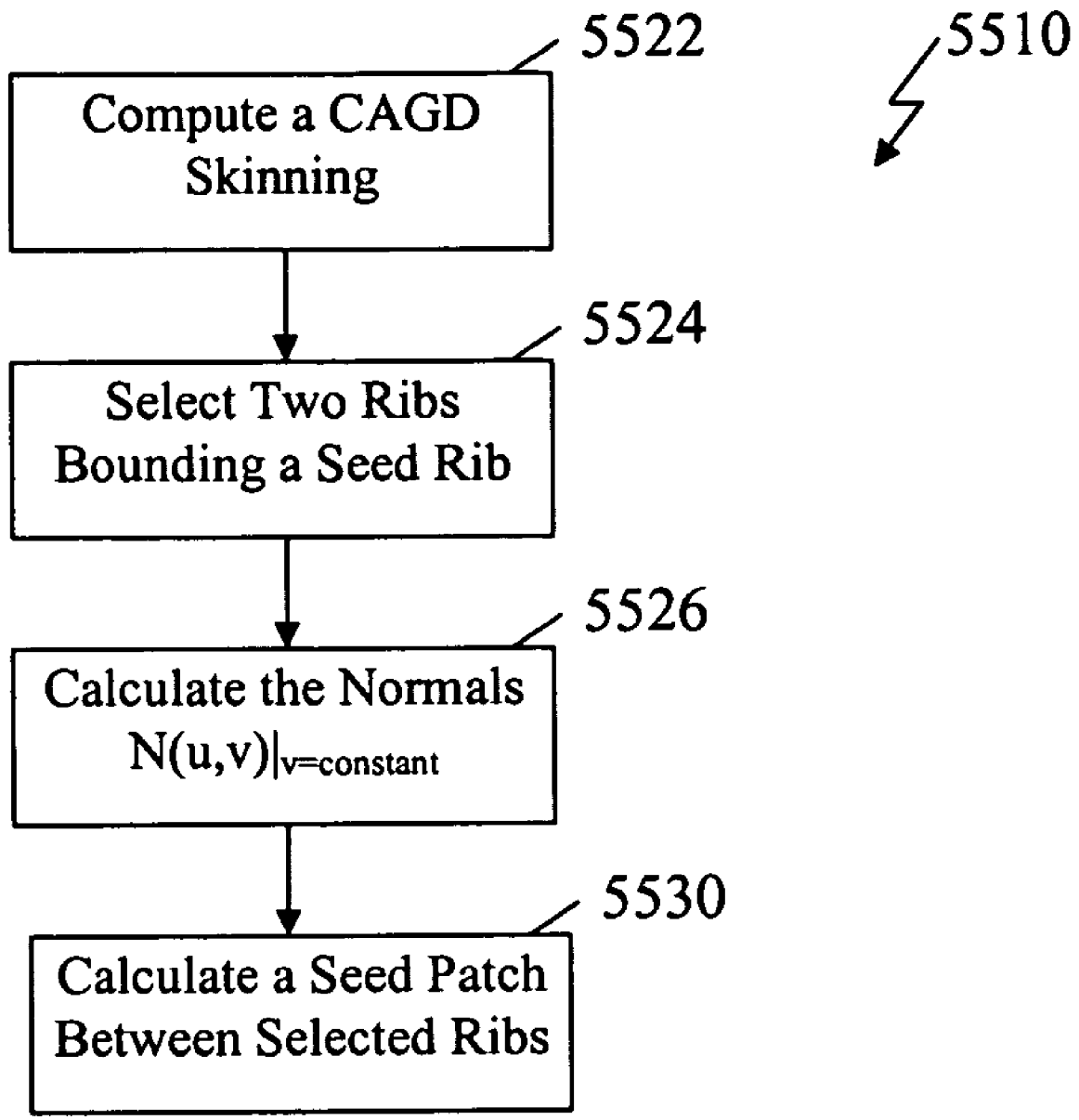
FIG. 55 depicts a flow diagram of a process that implements an algorithm for use in creating seed patches.

Different interpolating seed patches may lead to very different SMS surfaces. Similarly to a conventional skinning process, SMS skinning is simple to formulate and quite difficult to implement in a robust way. The interpolation in the spines direction determines strongly the surface obtained. An SMS skinned surface can exhibit undesirable self-intersections and wrinkles, even though the seed patch and the ribs form an apparently smooth surface. The seed patch typically determines the SMS surfaces. The constraints on the seed patch in some implementations are to contain the two limiting ribs and to fit with the surface normals at these ribs. Control of the interpolating seed patch and, in particular, control of the unit normal vectors of the seed patch in the interior points are critical for generating well-behaved SMS skinned surfaces. FIG. 55 depicts a flow diagram of a process 5510 that implements an algorithm for use in creating seed patches in a way that minimizes the possibility of self-intersections and wrinkles on the surfaces generated.

In step 5522, a CAGD (Computer Aided Geometrical Design) skinning is generated using available ribs, i.e., calculate two surfaces $S_i^{CAGD}$ and $S_o^{CAGD}$ that fit with the points and normals of the ribs. An example of Computer Aided Geometrical design is described by G. Farin, J. Hoschek, M. Kim, *Handbook of Computer Aided Geometric Design*, Elsevier, Amsterdam, 2002, incorporated herein by reference. The CAGD skinning calculation implemented in some embodiments is a surface interpolation preformed by commercially CAGD software packages. In some embodiments, the CAGD skinning not only interpolates a set of the points of the surface, $(S_i^{CAGD}(u_i,v_j)$ and/or $S_o^{CAGD}(u_i,v_j))$, but also the derivatives with respect to the parameters u and v at these points. In general, a lofted surface generated from the rib curves does not align with the rib normals and such lofting is not, in some implementations, the way these surfaces are calculated. It is assumed instead that the parameterization is such that the surface $S_i^{CAGD}(u,v)$ and $S_o^{CAGD}(u,v)$ coincide with the ribs for integer values of the parameter v (remembering that non-integer values lie between the ribs).

In step 5524, two ribs bounding a seed rib are selected. In some preferred embodiments, the ribs selected are those two ribs for which the area of the surface $S_i^{CAGD}$ (or $S_o^{CAGD}$) in between the two ribs is the smallest. It is assumed that v=0 and v=1 are the parametric equations of these ribs on the surface $S_i^{CAGD}$ (or $S_o^{CAGD}$) Let $P=\Sigma^{CAGD}(u,v)$ be the parametric equation of the patch of $S_i^{CAGD}$ (or $S_o^{CAGD}$) between these two ribs (v=0,1 also define the two ribs on $\Sigma^{CAGD}$).

In step 5526, normals $N(u,v)|_{v=constant}$ are calculated such that these normals together with the curves $\Sigma^{CAGD}(u,v)|_{v=constant}$ form seed ribs (for 0<v<1). In some embodiments, the normals $N(u,v)|_{v=constant}$ are calculated according to Step 2 described in relation to FIG. 10, τ being the tangent to the curve $\Sigma^{CAGD}(u,v)|_{v=constant}$. In general, these seed ribs normals will not coincide with the normals to the surface patch $\Sigma^{CAGD}(u,v)$ although they are perpendicular to the curves $\Sigma^{CAGD}(u,v)|_{v=constant}$, which are contained in the surface $\Sigma^{CAGD}(u,v)$.

In step 5530, the seed patch $\Sigma(u,v)$ are calculated according to:

$$\Sigma(u,v) = \sum^{CAGD}(u,v) - \left[ \int_0^v \left( \sum_v^{CAGD} \cdot N \right) dv - v \int_0^1 \left( \sum_v^{CAGD} \cdot N \right) dv \right] N(u,v) \quad \text{Eq. (13)}$$

This expression was determined by considering:

$$\Sigma(u,v) = \Sigma^{CAGD}(u,v) + \delta(u,v)N(u,v); \text{ and} \quad \text{Eq. (14)}$$

then calculating δ(u,v) for N(u,v), the normals to the surface Σ(u,v), i.e., $$\Sigma_u \cdot N = 0 \; \Sigma_v \cdot N = 0. \quad \text{Eq.(15)}$$

Taking into account that $\Sigma_u^{CAGD} \cdot N=0$ (note that the procedure explained in step 5526 substantially guarantees this equation), and that $N_u \cdot N = N_v \cdot N = 0$, so that $$\delta_u = 0 \; \delta_v = -\Sigma_v^{CAGD} \cdot N. \quad \text{Eq.(16)}$$

Thence the following is obtained:

$$\delta(v) = -\int_0^v \left( \sum_v^{CAGD} \cdot N \right) dv, \quad \text{Eq. (17)}$$

where the constant of integration is chosen to impose that Σ(u,v) contains the rib curve corresponding to v=0. Eq. (17) does not guarantee that Σ(u,v) contains the rib curve v=1. In order to ensure that this rib curve is also contained in Σ(u,v), the following δ function is employed:

$$\delta(v) = -\int_0^v \left( \sum_v^{CAGD} \cdot N \right) dv + v \int_0^1 \left( \sum_v^{CAGD} \cdot N \right) dv. \quad \text{Eq. (18)}$$

The seed patch can also be created using the following procedure, but it does not guarantee that the patch passes through a non-seed rib. According to the procedure 2 of FIG. 10, there is a finite number of normals N for axis τ leading to smooth SMS chains. Thus it seems that for any point (x,y,z) there is a one-parameter set of normals N leading to smooth SMS chains, which can be calculated by step 2 above, applied to all possible axes τ. Therefore, the equation of a surface z=φ(x,y) whose normals lead to smooth SMS chains is, in general, a non-linear first-order partial differential equation for a function of the two variables x, y $$\psi(x,y,z,\phi_x,\phi_y)=0 \quad \text{Eq. (19)}$$

which is related to the process described by F. John, *Partial Differential Equations*, (Springer-Verlag, New York 1980) 3rd ed, pp 19, incorporated herein by reference.

Equation 19 defines a cone of possible surface normals ($\phi_x$, $\phi_y$, −1) at the point (x,y,z). The problem of calculating a surface that passes through an arbitrary curve is called the Cauchy problem for this equation. This suggests another way to generate the SMS surfaces based on the calculations of the function $\Psi(x, y, z, \phi_x, \phi_y)=0$ for every point of the space (x,y,z), i.e., 1. For every point (x,y,z) (of the region of interest) calculate the surface normals according to Step 2 of FIG. 10, for any possible vector τ. In practice it is only necessary that τ rotate around a given axis, for instance the z-axis. For each unit normal vector, calculate the vector ($\phi_x$, $\phi_y$, −1) parallel to it. This creates the function $\Psi(x, y, z, \phi_x, \phi_y)=0$.
2. Use a numerical method to solve the partial differential equation (19).
3. The other SMS surface is now calculated as a Cartesian oval problem, since one of the SMS surfaces is already known. For this calculation a single input wavefront ($W_{i1}$ or $W_{i2}$) and its corresponding output wavefront ($W_{o1}$ or $W_{o2}$) are utilized. Since one of the SMS surfaces is already known, either the input or the output wavefront can be ray-traced through it to set up a Cartesian-oval problem.

The selection of the seed rib gives an important degree of freedom for the design. This degree of freedom can be utilized to obtain other properties of the optical system being designed. The following two examples show how to use this extra degree of freedom:

1. One of the surfaces is forced to have a prescribed boundary and use it as a seed rib.
2. A third set of input and output wavefronts $W_{i3}$ and $W_{o3}$ are considered. A smooth SMS chain is built up is built up using the wavefronts $(W_{i3}, W_{o3})$ and $(W_{i1}, W_{o1})$, and an initial point $P_0$ and the optical path lengths $L_1$ and $L_3$ are chosen. Let $R_0$ be a smooth interpolating curve passing through the points of the smooth SMS chain. Choose $R_0$ as the seed rib in the SMS surface generation procedure for the wavefronts $(W_{i1}, W_{o1})$ and $(W_{i2}, W_{o2})$ and choose the optical lengths $L_1$ and $L_2$. The resulting optical system couples the normal congruence $W_{i1}$ with $W_{o1}$ and couples $W_{i2}$ with $W_{o2}$. The surface unit normal vectors at the seed rib $R_0$ will not coincide, in general, with the unit normal vectors calculated in the generation of the smooth chain using the optical path lengths $L_1$ and $L_3$ and the wavefronts $W_{i1}, W_{o1}, W_{i3}$ and $W_{o3}$, excepting in some particular examples. When these normal vectors coincide, the optical system typically would couple not only $W_{i1}$ with $W_{o1}$ and $W_{i2}$ with $W_{o2}$, but also it would couple the rays of $W_{i3}$ and $W_{o3}$ passing through the curve $R_0$. In practice, there are many examples in which the normal vectors at the points of $R_0$ obtained from $W_{i1}$, $W_{o1}, W_{i3}$ and $W_{o3}$, (in the smooth SMS chain generation) and the normal vectors obtained from $W_{i1}, W_{o1}$, $W_{i2}$ and $W_{o2}$, (in the SMS surface generation) end up being quite close. In these cases, the optical system approximately couples the rays of $W_{i3}$ and $W_{o3}$ that pass through the curve $R_i$. The remaining rays of $W_{i3}$ and $W_{o3}$ are approximately coupled, i.e., an optical system can be obtained that perfectly couples $W_{i1}$ with $W_{o1}$ and $W_{i2}$ with $W_{o2}$, and $W_{i3}$ approximately with $W_{o3}$.

In some instances, when the initial conditions of the design have some symmetry, a solution that also has this symmetry may be determined. In general the solution will not have this symmetry exactly but may be relatively similar.

In some implementations, for example, it is assumed that the wavefronts $W_{i1}, W_{o1}$ are coincident with the wavefronts $W_{i2}, W_{o2}$ respectively, after a rotation of some angle around an axis, such as z. The degree of freedom provided by the selection of the seed rib is used to search for a solution that is rotationally symmetric around the z-axis. For this search, an arc of circumference is chosen normal to z and centered at the same axial point as the seed rib. In some embodiments, it is in general desirable to choose the biggest radius that the problem allows. Such systems are called quasi-rotational designs. In the same way, for a quasi-linear symmetric design, a candidate seed rib would be a straight line parallel to the desired axis of translational symmetry.

When $W_{i1}, W_{o1}$, are mirror images of $W_{i2}, W_{o2}$, a quasi-rotational design can be obtained with the following method: calculate a curve $C_0$ with the manifolds $W_{i1}, W_{o1}, W_{i2}$ and $W_{o2}$, such that $C_0$ is the smooth interpolating curve passing through the points of a smooth SMS chain and then rotate $C_0$ by 90° around the z-axis. Use this rotated curve as the seed rib.

In general a design is obtained that is nearly rotationally symmetric but not exactly. For example, consider the case in which $W_{i1}, W_{o1}, W_{i2}, W_{o2}$ are all from point sources. It has been proposed, for example by F. John, Partial Differential Equations, (Springer-Verlag, New York 1980) 3rd ed .pp 19, and W. T. Welford, R. Winston, "on the problem of ideal flux concentrators", J. Opt. Soc. Am. 68, p. 531-534, 1978, both incorporated herein by reference, that no rotational symmetric system with an finite number of optical surfaces can perfectly image more than one point. Since the exemplary SMS design images two points and consists of only two surfaces, then it typically cannot be rotational symmetric. Alternatively, it is known that rotational symmetric systems very nearly achieve perfect imaging for a region. As such, some embodiments provide some SMS solutions that are nearly rotationally symmetric. Thus, it is that the closer the point sources 1 $(W_{i1}, W_{o1})$ are to the respective point sources 2 $(W_{i2}, W_{o2})$, the closer is the resultant design to rotational symmetry, which condition can be called quasi-rotational symmetry.

A traditional design can attain substantially perfect imaging of a single point (stigmatic condition) and almost perfect for points near it (aplanatic design). This condition is obtained for a single wavelength (monochromatic design) and it is nearly obtained over a band of wavelengths (achromatic design). Reflectors, however, can achieve substantially a totally achromatic design for all wavelengths that are reflected.

An SMS design can obtain substantially perfect imaging in some embodiments of two points. As these two points draw closer, the quasi-rotational SMS design approaches a conventional rotationally symmetric design that is aplanatic. When the points are not close, the quasi-rotational SMS design has better image formation quality than its equivalent conventional design (see for example, P. Benítez, J. C. Miñano, "Ultra high numerical aperture imaging concentrator" J. Opt. Soc. Am. A; 14 (1997); pp. 1988-1997, incorporated herein by reference).

In summary, an SMS design is fully defined by giving:
1. The definition of the input and output wavefronts $W_{i1}$, $W_{o1}$, and the optical path length $L_1$ between them.
2. The definition of the input and output wavefronts $W_{i2}$, $W_{o2}$ and the optical path length $L_2$ between them.
3. The nature of the optical surfaces to design, i.e., the type of optical deflection of each surface.
4. The refractive indices of the media at each side of both surfaces.
5. A seed rib, $R_0$ and the surface it is to be lying on.

This set of parameters and curves is hereinafter termed an input data set. Generally, not every possible set of input data gives a solution, i.e., an operational SMS design, but when there is such solution, then it is typically unique.

Figure 16:
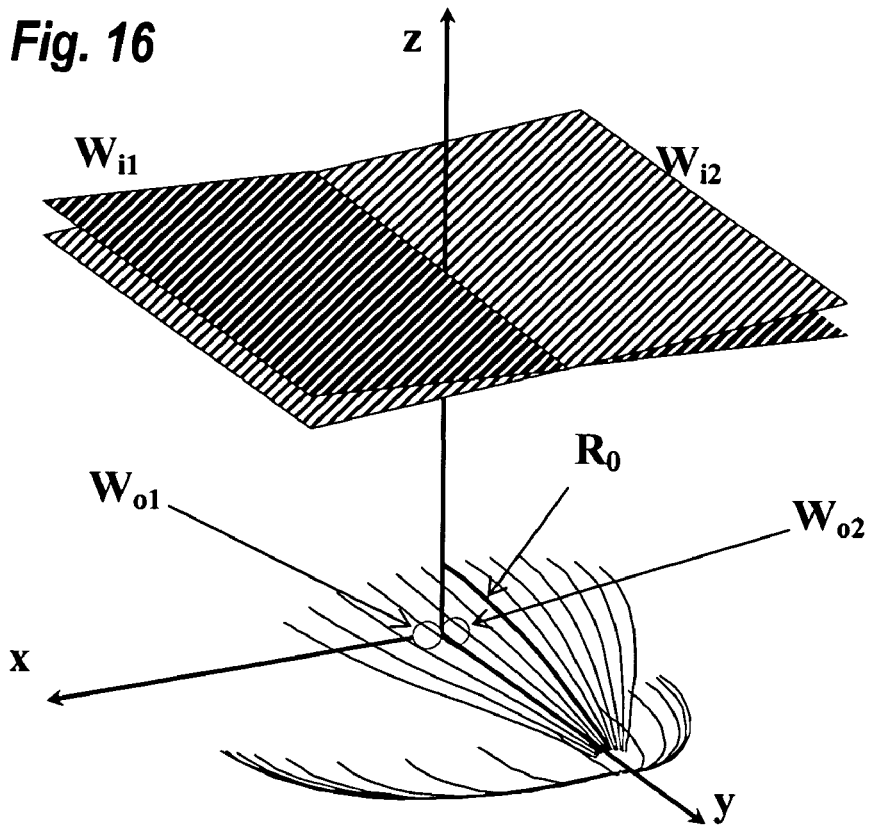
FIG. 16 shows the input data for an XX reflector.

An example of an implementation of the SMS-3D process according to some embodiments is described below with the following input data set:
1. The input and output wavefronts $W_{i1}$, $W_{o1}$, and the optical path length $L_1$ between them are defined. FIG. 16 shows the unit-radius sphere $W_{o1}$ as a wavefront centered at the point (1,0,0). $W_{i1}$ is a flat wavefront containing the point (0,0,25) and with normal vector contained in the x-z plane and forming an angle −3.43° with the z-axis. The optical path length $L_1$ is 51 mm.
2. The input and output wavefronts $W_{i2}$, $W_{o2}$ and the optical path length $L_2$ between them are similarly defined, still referring to FIG. 16. The unit-radius sphere $W_{o2}$ is a wavefront centered at the point (−1,0,0). $W_{i2}$ is a flat wavefront containing the point (0,0,25) and with normal vector also contained in the x-z plane and forming an angle of 3.43° with the z axis. In FIG. 16, the optical path lengths are equal, $L_2=L_1$.
3. The nature of the optical surfaces to design, i.e., the type of optical deflection of each surface: Both surfaces are reflective, so this type of design is called XX. In some embodiments, the shadowing between mirrors is not considered in the design procedure. Once the design is finished, this shadowing is evaluated to check whether the shadowing losses will be reasonable or not. The shadowing of one surface by the other is a practical aspect not considered in this example.

4. The refractive indices of the media at each side of both surfaces are defined. In this example, all media have n=1.

5. A seed rib, $R_0$ and the reference to which surface on which the rib is to lie is defined. The seed rib $R_0$ is shown in FIG. 16. The data in 1, 2, 3, 4 and 5 imply that the solution is symmetric with respect the x=0 plane. The seed rib in this example is an arc of circumference.

Figure 17:
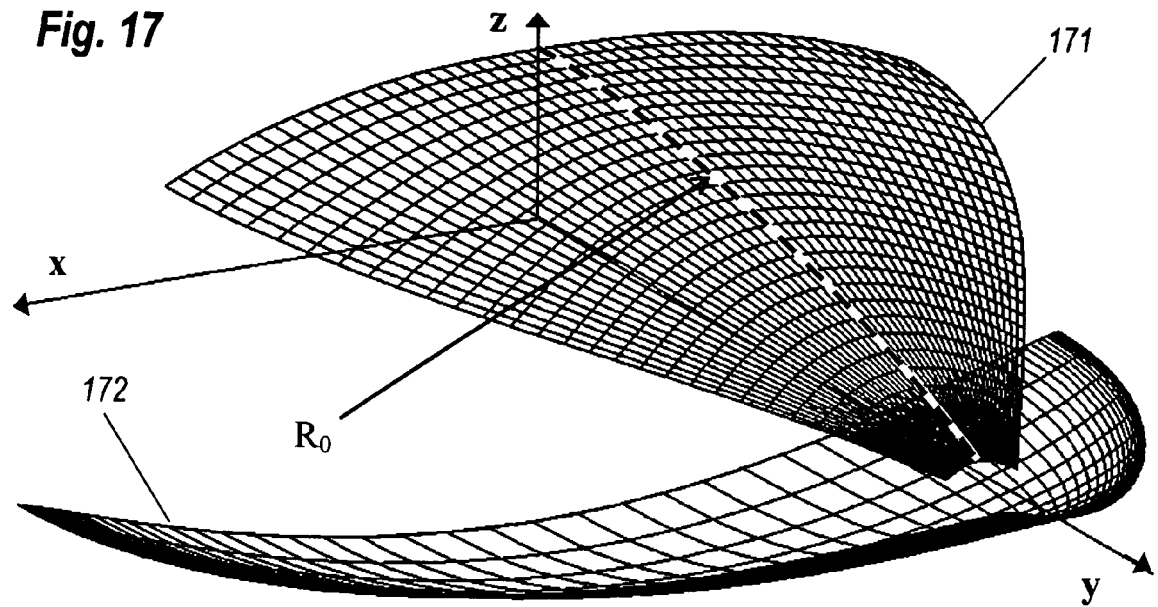
FIG. 17 shows an initial candidate for the XX reflector.

FIG. 17 shows the resulting ribs and spines of the XX surfaces designed in accordance with these input data, comprising upper reflector 171 and lower reflector 172. The seed rib $R_0$ is indicated in FIG. 17 with a dotted line.

Figure 18:
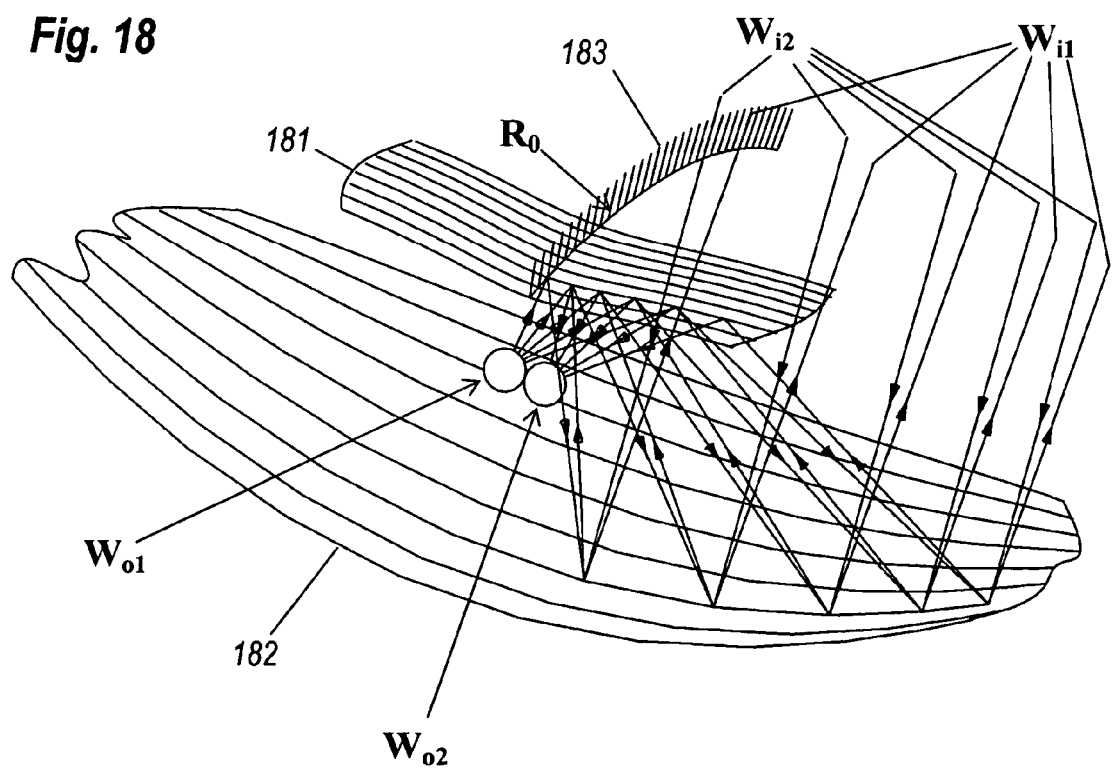
FIG. 18 shows the completed XX reflector.

FIG. 18 shows another example of a reflective-reflective XX design, comprising upper reflector 181 and lower reflector 182. Seed rib $R_0$ has normals 183. The input wavefronts $W_{i1}$ and $W_{i2}$ are shown as parallel rays. The output wavefronts $W_{o1}$ and $W_{o2}$ are spheres converging on separate focal points.

A special case occurs when the two SMS surfaces desirably intersect along a specified curve. The problematic feature here is the 'conflict of interest' posed by the rays that hit this intersection curve and which if either of the two deflections is to be utilized. For instance, consider the case of a lens (e.g., two refracting surfaces) with a "thin" edge, i.e., the two surfaces of the lens intersect at this edge.

Figure 19:
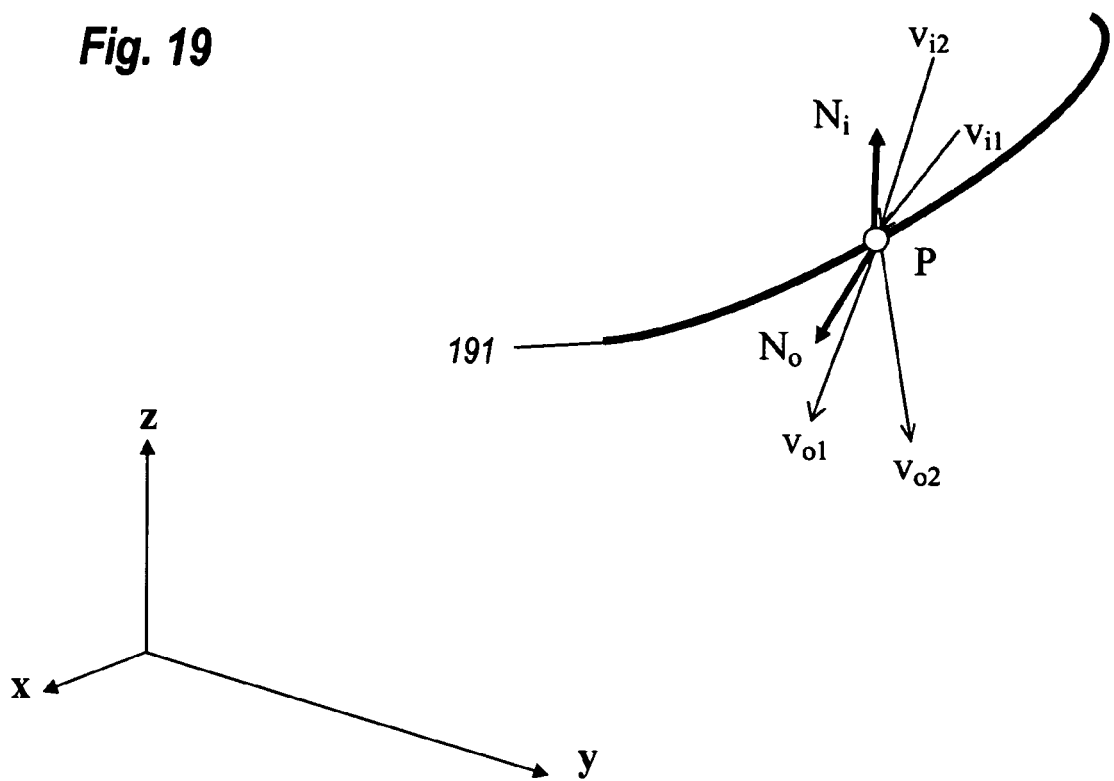
FIG. 19 shows the edge of an SMS lens.

Referring to FIG. 19, the equation of an intersection curve 191 can readily be calculated. Let P be a point of this curve. The ray of the normal congruence $W_{i1}$ (not shown) passing through P is deflected (with two consecutive deflections at the same point P) and exits P as a ray of $W_{o1}$ (not shown). A similar condition is to be fulfilled with respect to $W_{i2}$ and $W_{o2}$ (not shown). Let $L_{i1}(x,y,z)$ and $L_{o1}(x,y,z)$ be respectively the optical path length from the point given by the Cartesian coordinates (x,y,z) to the wavefronts $W_{i1}$ and $W_{o1}$, respectively. Let $L_{i2}(x,y,z)$ and $L_{o2}(x,y,z)$ be defined in a similar way with respect to the wavefronts $W_{i2}$ and $W_{o2}$, respectively. Since the SMS surfaces are transforming the congruence $W_{i1}$ into the congruence $W_{o1}$, and the congruence $W_{i2}$ into $W_{o2}$, the following equations in some preferred embodiments are fulfilled:

$$L_{i1}(x,y,z)-L_{o1}(x,y,z)=L_1$$

$$L_{i2}(x,y,z)-L_{o2}(x,y,z)=L_2 \quad \text{Eq. (20)}$$

These equations, in which $L_1$ and $L_2$ are two constants, define the intersection curve, i.e., the edge of the lens.

Let $v_{i1}, v_{i2}, v_{o1}, v_{o2}$, be, respectively, the ray vectors of $W_{i1}$, $W_{i2}, W_{o1}$, and $W_{o2}$ passing through a point P of the edge; and let $N_i, N_o$ be, respectively the normals to the surfaces $S_i$ and $S_o$ at P. Let $v_1$ be the ray vector of $W_{i1}$ after deflection at $S_i$ and before deflection at $S_o$ and let $v_2$ be the corresponding ray vector of $W_{i2}$. The two deflections establish four equations between $v_{i1}, v_{i2}, v_{o1}, v_{o2}, N_i, N_o, v_1$ and $v_2$. For example, for two refractions, these four equations are:

$$(v_{i1}-v_1) \times N_i = 0 \quad (v_{i2}-v_2) \times N_i = 0$$

$$(v_1-v_{o1}) \times N_o = 0 \quad (v_2-v_{o2}) \times N_o = 0 \quad \text{Eq. (21)}$$

Remember that the modulus (absolute value) of a ray vector is the local refractive index. Therefore when the lens of this example is surrounded by a medium of unit refractive index then the moduli of $v_{i1}, v_{i2}, v_{o1}, v_{o2}$, are all unity and the moduli of $v_1$ and $v_2$ are lens refractive index n.

These four equations are solved for the unit vectors $N_i, N_o$. Not every combination of vectors $v_{i1}, v_{i2}, v_{o1}, v_{o2}$ and deflections has a solution. For instance, if the two deflections are both mirror reflections, then there is typically only a solution for $N_i, N_o$ if the angle between $v_{i1}$ and $v_{i2}$, is the same as the angle between $v_{o1}$ and $v_{o2}$ and in this case there is no single solution for $N_i, N_o$.

When one of the deflections (or both) is a refraction, then the existence of a solution depends also on the value of the refractive index.

Figure 20:
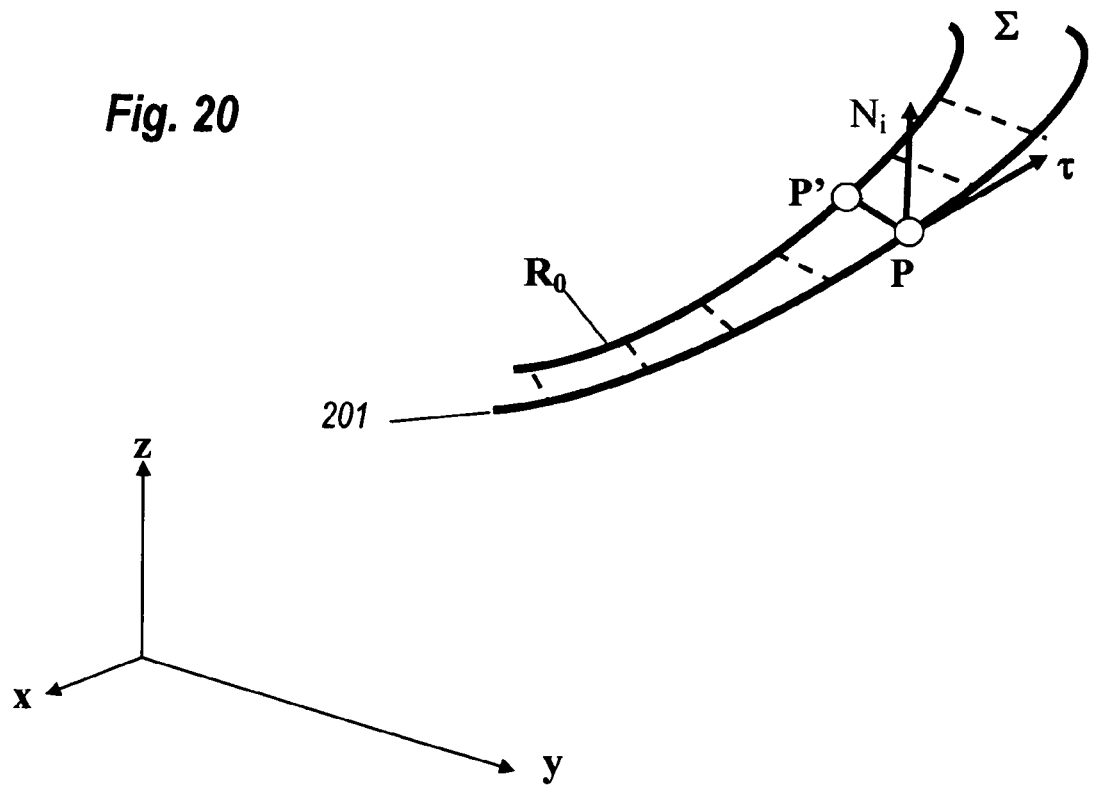
FIG. 20 shows a seed rib next to an edge.

It is assumed that there is a solution $N_i, N_o$ along a segment of the intersection curve, which is referred to as the edge. In some implementations of some embodiments, the edge cannot be used as a seed rib to generate the SMS ribs, because the next rib generated according to the procedure of FIG. 11 and FIG. 12 would be this very same edge. Thus, some embodiments start the procedure from a seed rib that is slightly separated from the edge. This seed rib can readily be calculated either in the surface $S_i$ or in the surface $S_o$, with the aid of the normals $N_i$ and $N_o$. FIG. 20 shows edge 201 and seed rib $R_0$ in $S_i$. Since the normals to $S_i$ are generally known at any point of the edge, any points of $S_i$ close to a point P of the edge can be calculated merely by moving from P to a point P' located in the direction of the vector $N_i \times \tau$, where $\tau$ is tangent to the edge. Note that $\tau$ is parallel to $N_i \times N_o$, i.e., $\tau \times (N_i \times N_o) = 0$.

Applying the procedure of FIG. 11 and FIG. 12 the normals to the surface $S_i$ are generated at the points (P') of the curve $R_0$. Because the procedure is consistent, the normals to the surface $S_i$ at the points of $R_0$ resulting from the seed-rib procedure are similar to the normals $N_i$ of the corresponding points (P) of edge 201, i.e., the difference between these two vectors goes to zero as P' approaches P. Since these two curves are close, the SMS skinning of FIG. 13 and FIG. 14 begin with a smooth surface $\Sigma$ lying in between $R_0$ and the edge 201.

In contrast to the XX systems of FIG. 17 and FIG. 18, the next example is an RR lens, comprising two refractive surfaces through which light passes sequentially, with a known refractive index, for example a refractive index of n=1.5.

Referring back to FIG. 16, where two plane wavefronts $W_{i1}$ and $W_{i2}$ are shown which can be characterized by the normal vectors $v_{i1}, v_{i2}$ (not shown). The expression of these vectors in Cartesian coordinates is $$v_{i1}=(\sin \beta, 0, -\cos \beta)$$

$$v_{i2}=(-\sin \beta, 0, -\cos \beta) \quad \text{Eq. (22)}$$

i.e., the rays of these wavefronts are contained in planes y=constant and form an angle $\beta=40°$ with the z-axis.

$W_{o1}$ $W_{o2}$ are two spherical wavefronts centered at the points $A_{o1}, A_{o2}$, respectively, the coordinates of which are $$A_{o1}=(1, 0, 0)$$

$$A_{o2}=(-1, 0, 0) \quad \text{Eq. (23)}$$

Figure 21:
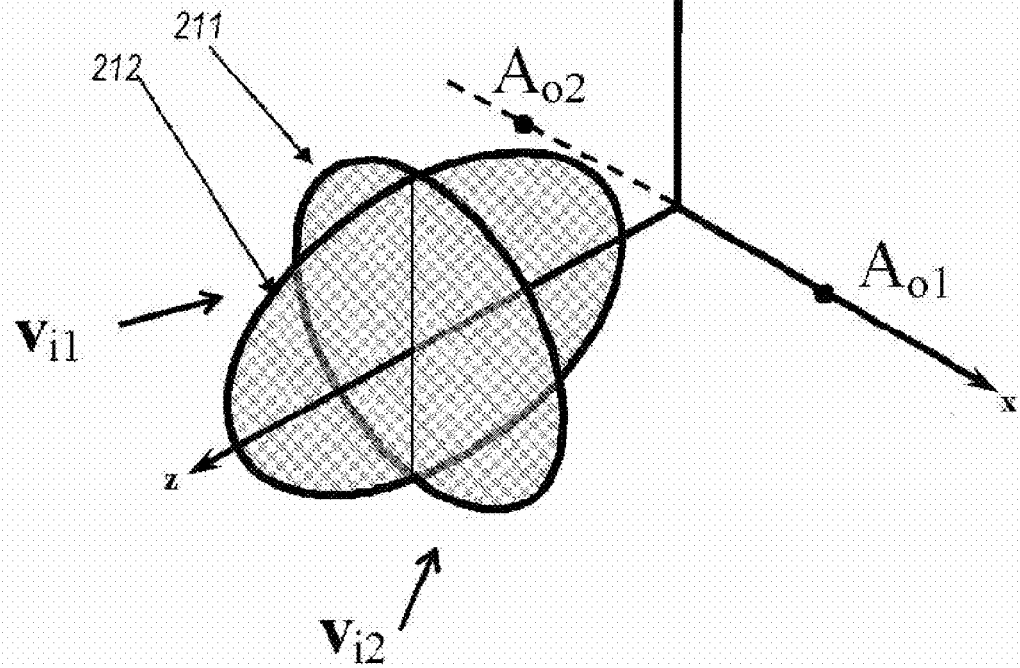
FIG. 21 shows input data and possible seed ribs for an RR lens.

Equations (20) above are solved for the case $L_1=L_2=L$. FIG. 21 shows two candidate lens-edges, ellipse 211 normal to the z-axis and ellipse 212 normal to the x-axis. Altering the value of L merely changes the z-axis coordinate of the centers of these ellipses, each of which typically generates a different lens. Consider the case of ellipse 211 normal to the z-axis. The seed rib is the x<0, or left, part of ellipse 211.

Figure 22:
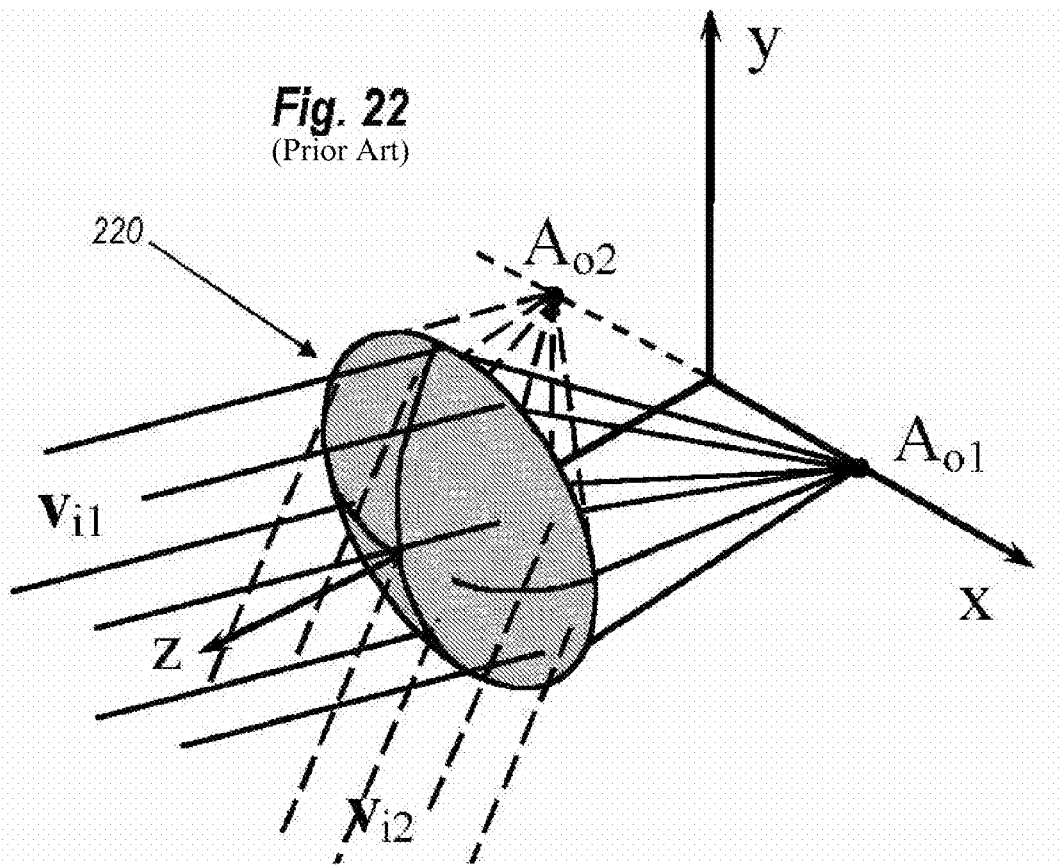
FIG. 22 shows a transverse RR lens.

FIG. 22 depicts RR lens 220, generated by the abovementioned lens-edge procedure.

For RR lens 220 of FIG. 22, FIG. 23A depicts z-x cross-section 231 and FIG. 23B shows z-y cross-section 232.

For RR lens 220 of FIG. 22, FIG. 24A shows z=constant contours 241, spaced 5% of the z-coordinate of the lens edge, on input surface $S_i$. FIG. 24B shows contours 242 of output surface $S_o$, of the same s-spacing (about 5%) but fewer in number than in FIG. 24A because of the shallower curvature of output surface $S_o$.

For RR lens 220 of FIG. 22, FIG. 25A shows plot 250 with intervals $\Delta x=0.0166$, showing contours 251 of input surface $S_i$. FIG. 25B is plot 255 with substantially identical intervals $\Delta x=0.0166$, showing contours 256 of output surface $S_o$. Seed rib $R_0$ is common to both plots.

For RR lens 220 of FIG. 22, FIG. 26A depicts seed ribs 261 and FIG. 26B shows spines 263 of lens 220 of FIG. 22. Note that maximum thickness occurs at off-center point 262.

Figure 27:
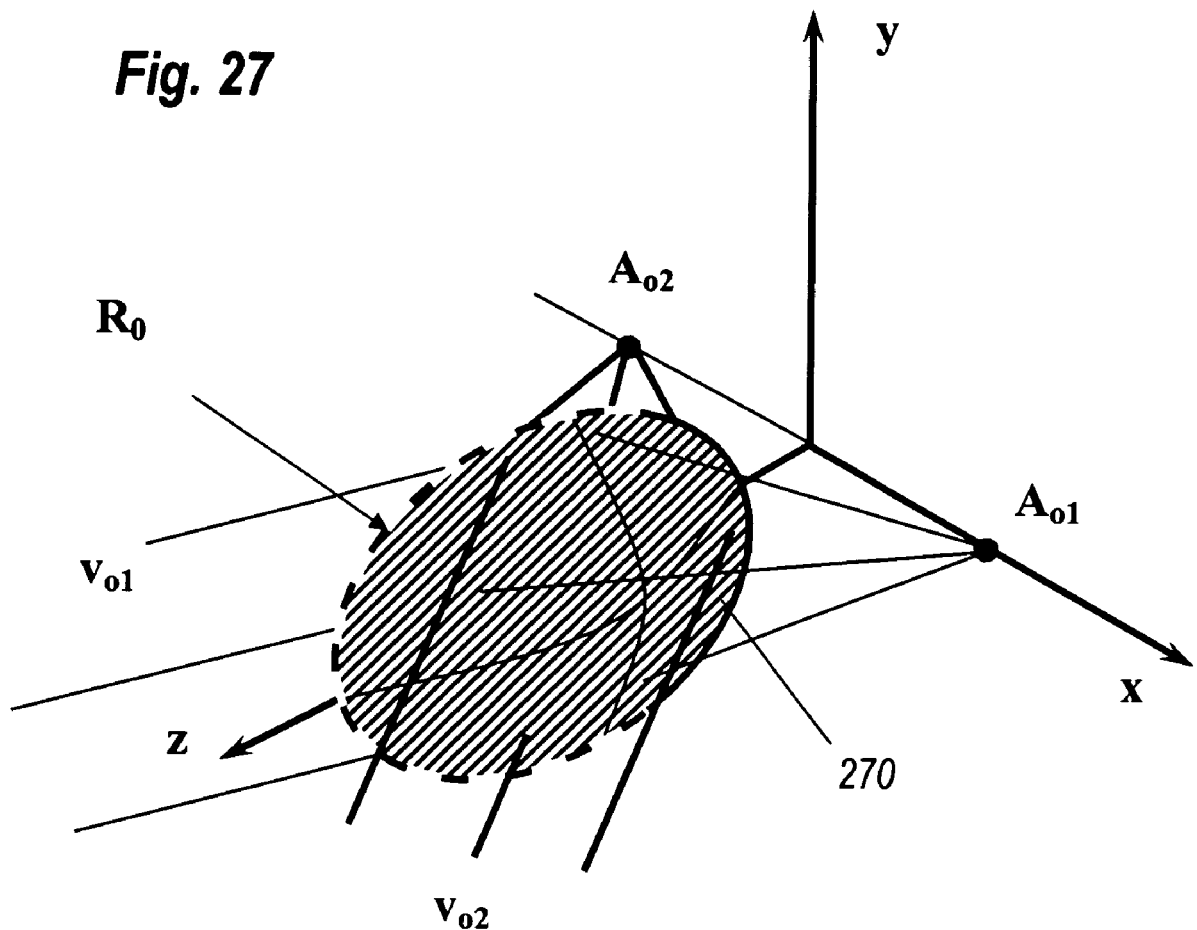
FIG. 27 the longitudinal RR lens.

FIG. 27 shows RR lens 270, generated for a refractive index of n=1.5 from seed rib $R_0$, which is substantially identical to contour 212 of FIG. 21 but on the profile perpendicular to the x-axis. Note that the two input ray sets $V_{O1}$ and $V_{O2}$ enter at $\beta=\pm 40°$ from opposite sides of lens 270 relative to the z-axis, proceeding therefrom to respective focal points $A_{O1}$ and $A_{O2}$ according to calculated SMS-3D input and output surfaces $S_i$, $S_0$.

Figure 28:
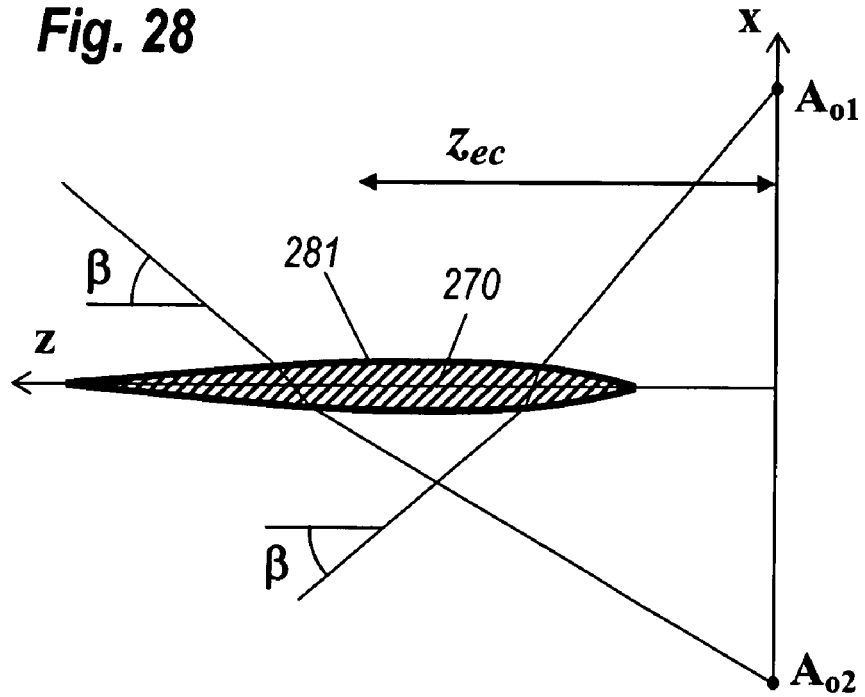
FIG. 28 is a cross-section of the longitudinal RR lens.

FIG. 28 shows central x-z cross-section 281 of lens 270 of FIG. 27, with lens center at $z_{ec}$, for example, $z_{ec}=1.4$.

Figure 29:
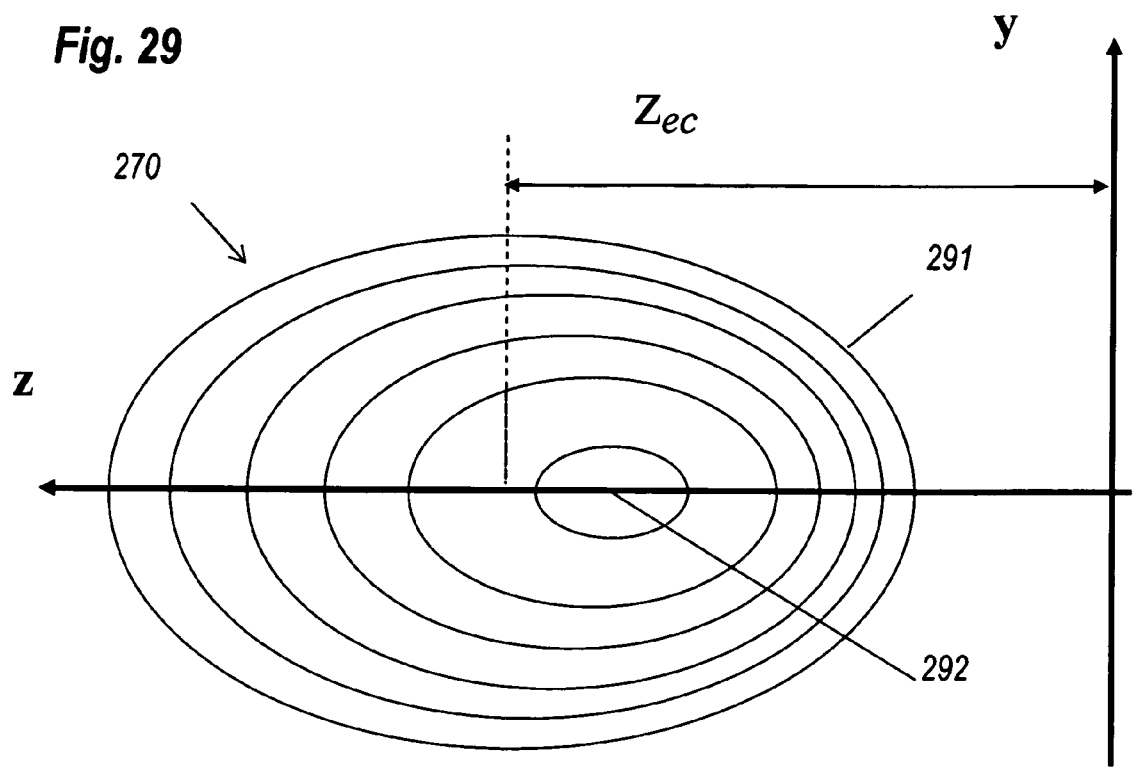
FIG. 29 shows the facial contours of the longitudinal RR lens.

FIG. 29 shows cross-sectional contours 291 of lens 270 of FIG. 27, with spacing $\Delta x=0.0166$. It is noted that the thickest point 292 is not at lens center $z_{ec}$.

Figure 30:
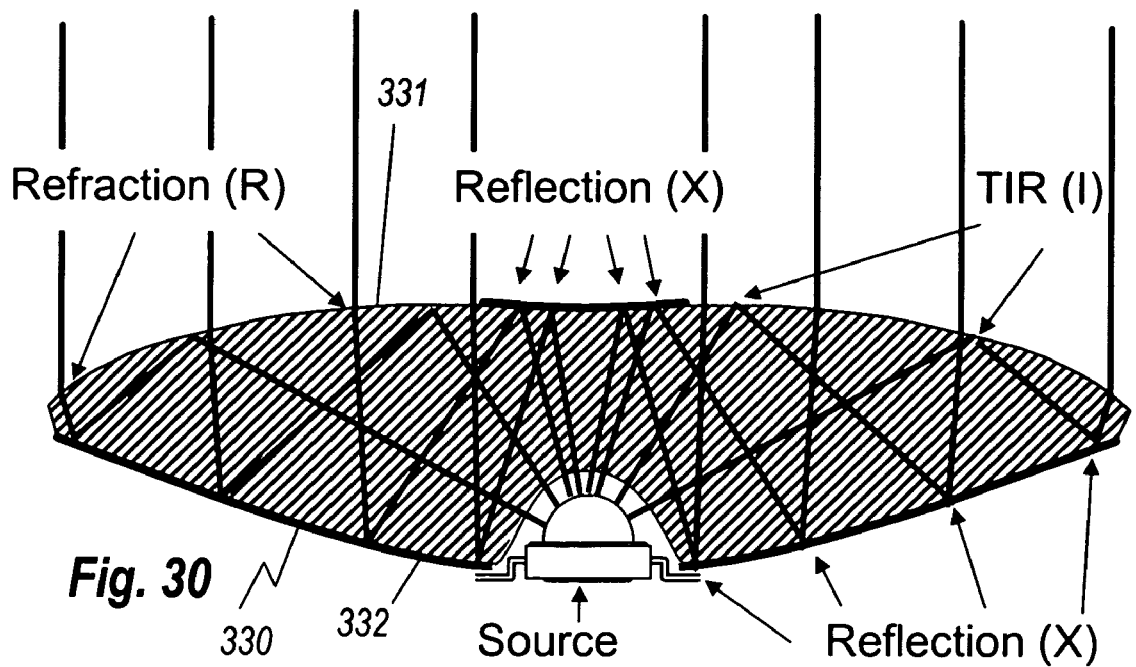
FIG. 30 is a cross-section of an RXI lens.

FIG. 30 is a schematic of a RXI lens 330, showing the above-mentioned acronym convention for a rotationally symmetric cross-section. The lower reflective (X) surface 332 is typically metalized and consequently has a single function. The upper surface 331 is used twice, as a refractor for exiting rays and as a reflector for internal rays from the source. In free-form 3D design, the RXI is more complex than in the previous RR and XX designs, where each surface is intercepted once and only once by the design-rays.

Unlike previous SMS-3D designs, the design of a free-form RXI in some embodiments is iterative, and can include in some implementations trial-and-error steps from an initial criteria converging to a working configuration. Functionally, in this example, there are three optical surfaces: the top, refractive surface ($S_i'$) and two reflective surfaces, top $S_i$ and bottom $S_o$. At each step of the iteration step three versions of these surfaces are calculated. If the initial conditions are adequate, the surfaces $S_i$ and $S_i'$ converge substantially to identity, so that when they are close enough the iteration procedure terminates.

Figure 31:
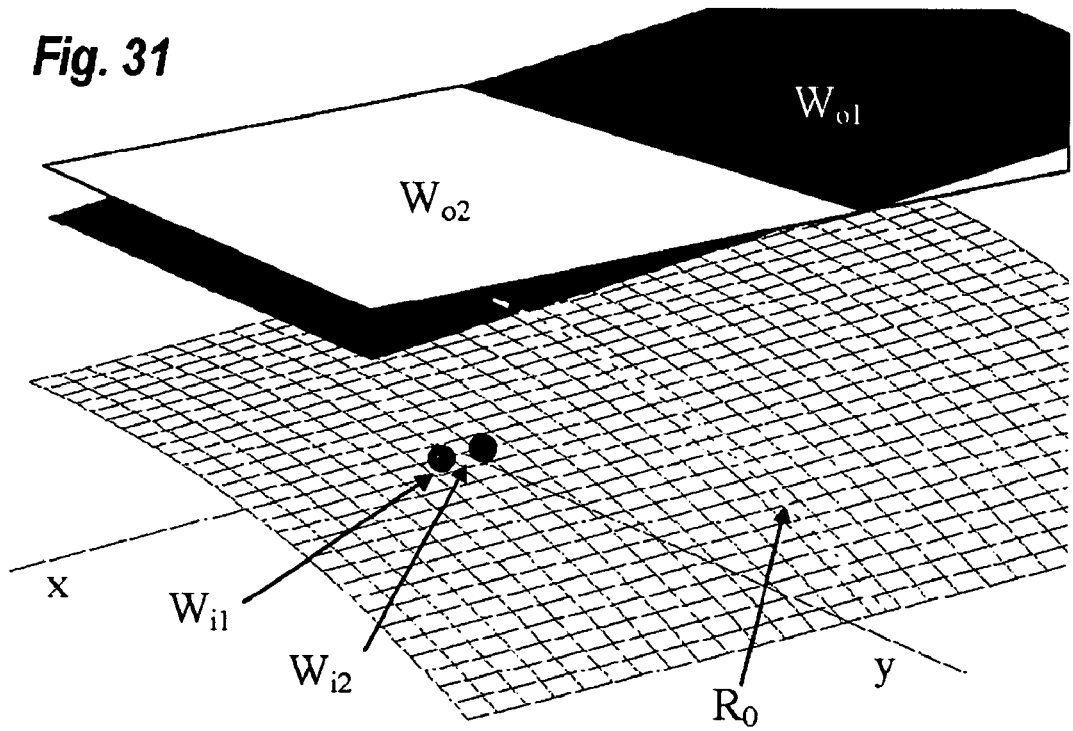
FIG. 31 shows the initial data for a free-form RXI lens.

FIG. 31 shows one example according to some embodiments with spherical input wavefronts $W_{i1}$ and $W_{i2}$ centered at $x=\pm 1$, $y=0$, $z=0$, representing compact sources. Plane output wavefronts $W_{o1}$ and $W_{o2}$ have unit normal vectors $(\sin \beta, 0, \cos \beta)$ and $(-\sin \beta, 0, \cos \beta)$, respectively, with $\beta=1.5°$. Seed rib $R_0$ is shown as a dotted line.

Figure 56:
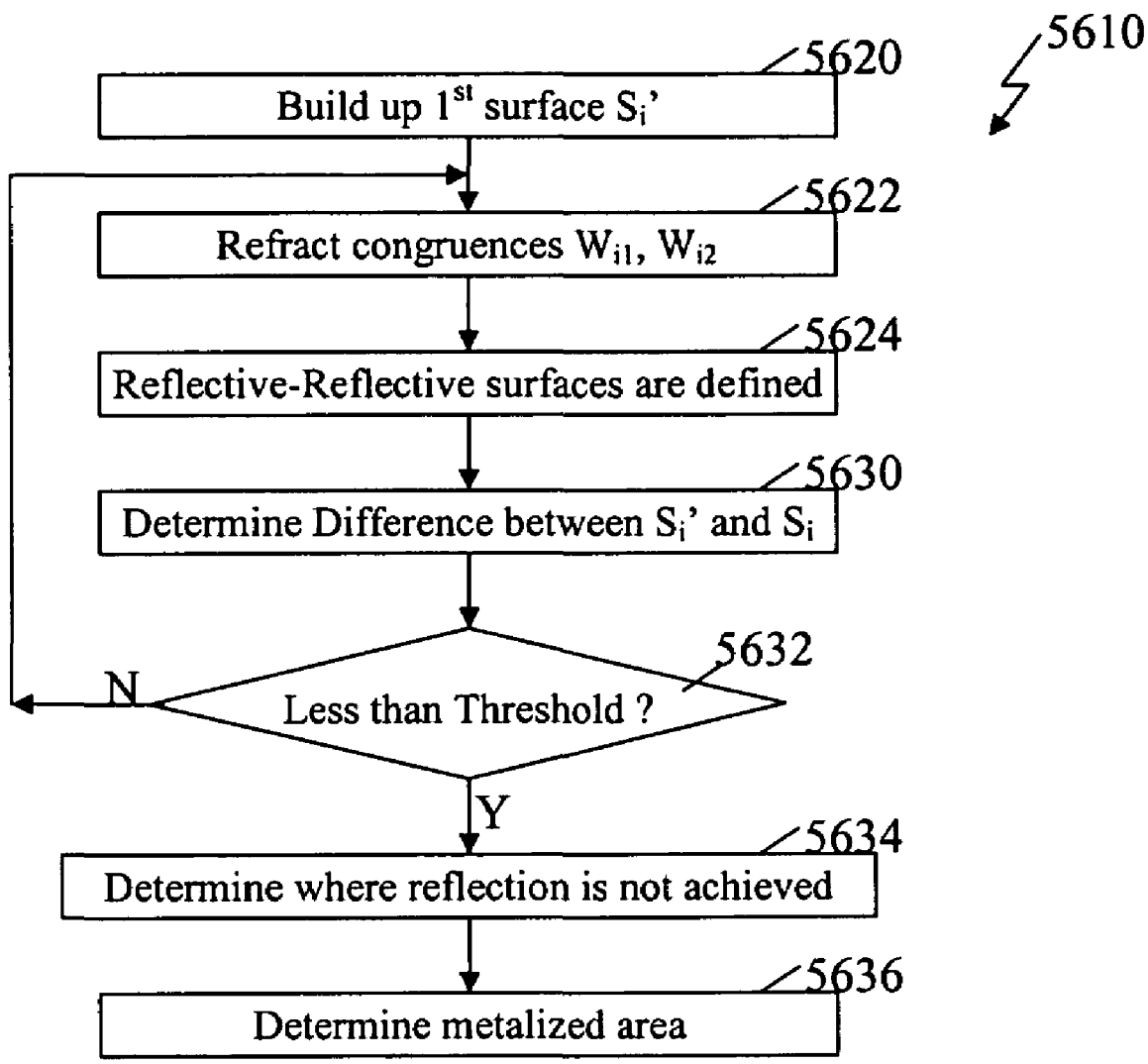
FIG. 56 depicts a flow diagram of a process for designing an RXI lens according to some embodiments.

FIG. 56 depicts a flow diagram of a process 5610 for designing an RXI lens according to some embodiments.

Referring to FIGS. 31 and 56, in step 5620, a first $S_i'$ surface is defined and/or built up such that it contains a curve $R_0$. A good choice of $S_i'$ reduces the convergence time, although this choice is typically not that critical. For example, an initial $S_i'$ surface can be linearly symmetric, if that is what is expected as a design goal.

In step 5622, the congruences $W_{i1}$, $W_{i2}$ are refracted through the surface $S_i'$. After reflection, the congruences become $W_{i1}'$ and $W_{i2}'$. If the surface $S_i'$ does not intersect all the rays of $W_{i1}$ and $W_{i2}$ then step 5620 is repeated with a different candidate surface $S_i'$.

Figure 32:
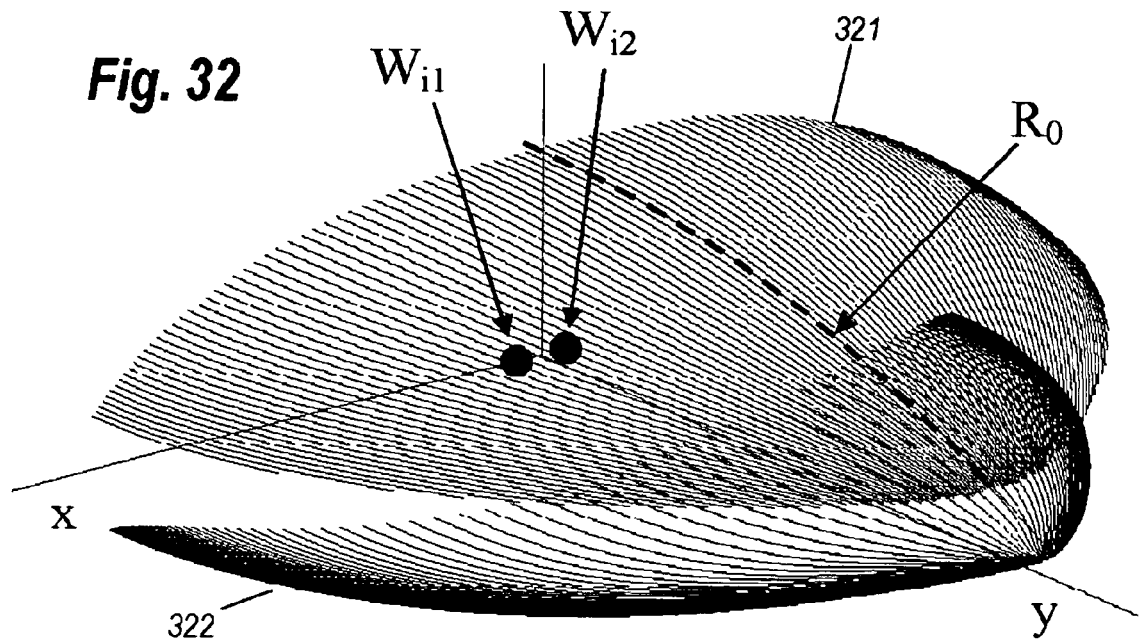
FIG. 32 shows the initial XX design steps for a free-form RXI lens.

In step 5624, reflection-reflection surfaces (XX) are designed using the congruencies $W_{i1}'$, $W_{i2}'$, $W_{o1}$ and $W_{o2}$ and the optical path lengths $L_1$ and $L_2$, as shown in FIG. 32. That is to say, the reflective aspect (X) of upper surface 321 is emphasized. In some embodiments, the XX design is implemented through the processes described above with reference to FIGS. 7-18, and/or cycle chain process 4310 of FIG. 43. The two XX reflector surfaces are called $S_i$ and $S_o$. Lack of success means returning to step 5620 and beginning again with a different candidate refractive upper-surface $S_i'$. Although upper surface 321 is to be internally reflecting, its critical angle is often not considered, and reflection is assumed to occur at all incidence angles.

Figure 33:
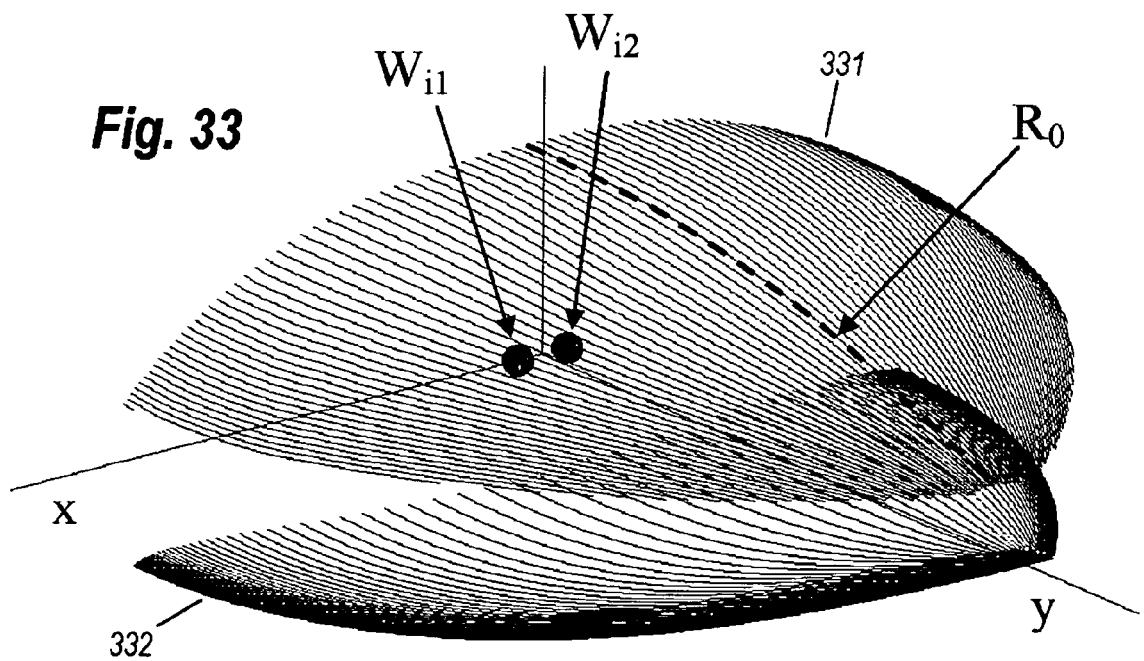
FIG. 33 shows the free-form RXI lens.

In step 5630, the difference or distinctness of the surfaces $S_i'$ and $S_i$ is determined. In step 5632, it is determined whether the differences between surfaces $S_i'$ and $S_i$ are within a threshold. The process 5610 then returns to step 5622 with $S_i'$ equal to $S_i$, when the surfaces $S_i'$ and $S_i$ are still distinct and/or different by a predefined threshold. A measure of their distinction, in some embodiments, is determined by taking the mean distance between the two defined surfaces, as defined by the averaged value of the minimum distance between each point of surface $S_i$ to the surface $S_i'$. If the surfaces are sufficiently close (i.e., within machining tolerances and/or microscopic surface error prescription) then convergence is declared. FIG. 33 shows an example of the result, with upper reflective surface 331 and lower surface 332 having achieved the requisite action on spherical source wavefronts $W_1$ and $W_2$.

When convergence is declared in step 5632, the process continues to step 5634 to calculate the points of $S_i$ where total internal reflection is not achieved for the rays of any of the two congruences. In step 5636, the region of $S_i$ that is to be metalized is determined by the particular application of the device. In many instances, not all the points of $S_i'$ provide total internal reflection for the designing rays.

The normal congruences $W_1$ and $W_2$ (which include both input and output wavefront-pairs) are called control congruencies. Each particular design has its own control congruences. In abovementioned examples, these congruences were given directly, in order to show how to derive a design from them. In real-world problems, it is generally illumination distributions, typically not wavefronts, that are the design goals. Thus in prescribed-irradiance problems, such wavefront information is typically derived from the prescription in such a way that the SMS-3D lens causes a given source to produce the desired distribution. This can be referred to as inverse problems, a branch of mathematics where solutions are usually numerical and approximate. Often it is a major accomplishment to prove even that a solution exists. This could happen with overly complex irradiance prescriptions and overly inhomogeneous sources.

Figure 34:
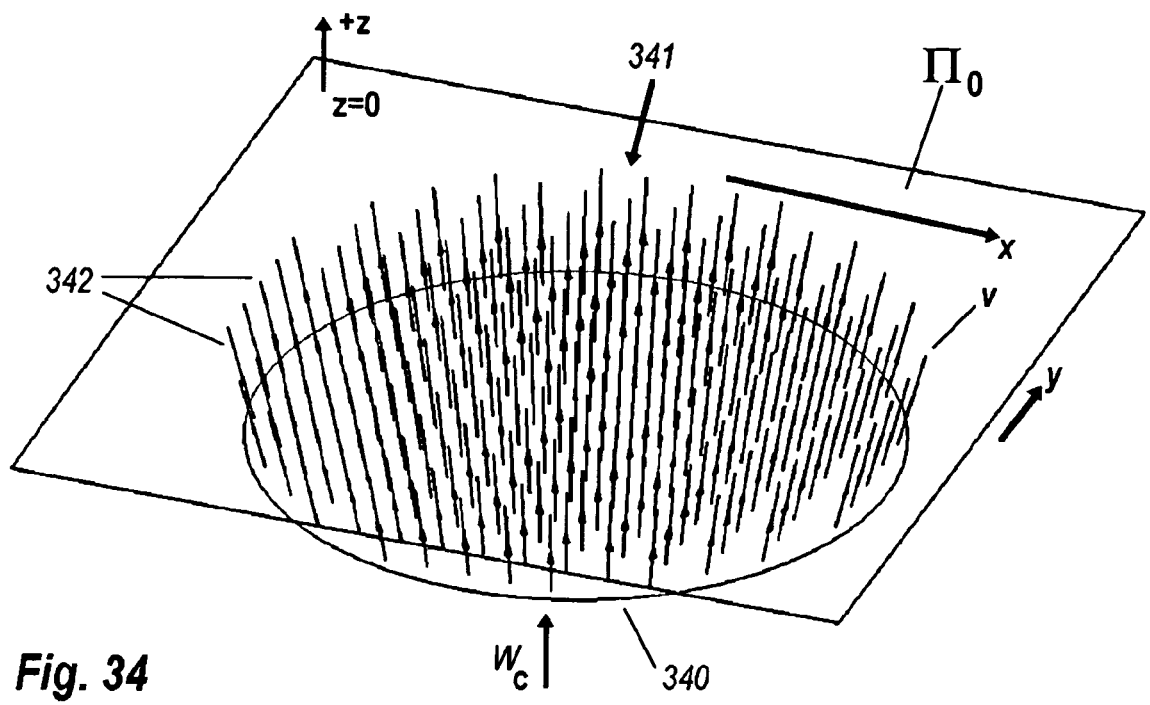
FIG. 34 shows rays at an exit plane.

The inverse problem according to some embodiments is that of finding a set of output control-wavefronts $W_{o1}$ and $W_{o2}$ that could produce a desired irradiance distribution from a known source. FIG. 34 shows a fixed reference plane $\pi_o$, defined by $z=0$, used in some embodiments to define control wavefronts out of exit aperture 340, shown as circular. One of the wavefronts, $W_c$, is shown as array 341, of diverging rays 342. Such a mathematical exit plane is typically placed close to the exit aperture of the system (which in general, will not be exactly defined by a plane curve, as shown for aperture 340). For every point (x,y) on the reference plane, only a single ray of the normal congruence encounters it, with directional unit vector, shown in FIG. 34 as $$v=(p, q, +\sqrt{(1-p^2-q)}).$$ Eq. (24)

Emphasis on the positive branch of the square roots means that the rays of the control congruence travel towards positive z values, as shown in FIG. 34. The information in Eq. (24) is contained in the planar vector $$v_\perp = (p,q),\qquad \text{Eq. (25)}$$

defining the p-q plane of direction sines, frequently used in non-imaging optics.

Figure 35:
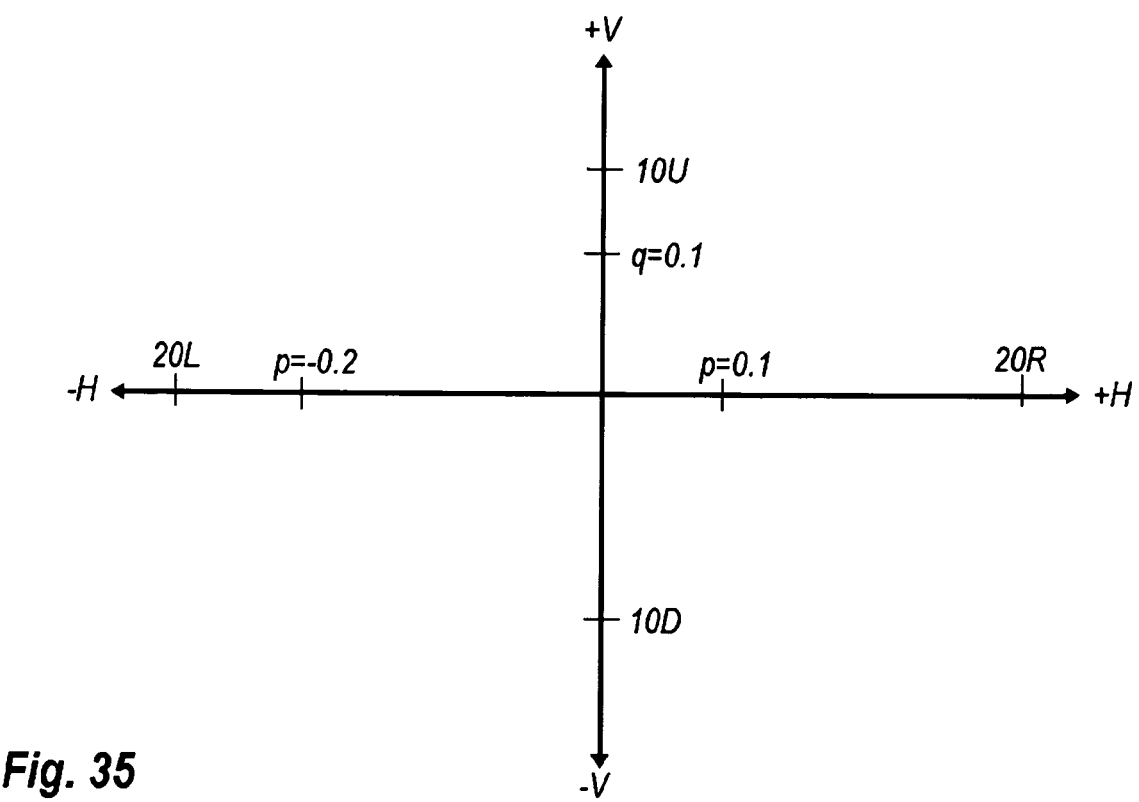
FIG. 35 depicts the p, q plane of vectors.

In automotive applications, however, the plane of directions is usually represented as shown in FIG. 35, with angular axes H-V through the change of variables whereby +x is degrees right (+H), −x is degrees left (−H), +y is degrees up (+V), −y is degrees down (−V), +z is vehicle-front, and −z is rearward, so that $$H=\sin^{-1}(p)\ V=\sin^{-1}(q).\qquad \text{Eq. (26)}$$

Because the ray set is a normal congruence, taking x and y as parameters of this bi-dimensional bundle means that the Malus-Dupin theorem (as described in, J. C. Miñano, "Application of the conservation of the etendue theorem for 2D-subdomains of the phase space in nonimaging optics". Appl. Opt. 23, pp. 2021-2025, (1984), and M. Herzberger. "Modern Geometrical Optics", Interscience, New York, 1958, pp 152, both incorporated herein by reference) gives for v:

$$r_x \cdot v_y - r_y \cdot v_x = p_y - q_x = 0,\qquad \text{Eq. (27)}$$

where r=(x,y,0). Since $p_y=q_x$, there exists a potential function $l_o(x,y)$ such that:

$$l_{o,x}=p\ l_{o,y}=q.\qquad \text{Eq. (28)}$$

This function is specifically the optical path length function from the reference plane, i.e. $l_o(x,y)=L_o(x,y,z=0)$.

Thus, the normal congruence $W_o$ at the reference plane can be defined by specifying the function $l_o(x,y)$. In some implementations the condition for $l_o(x,y)$ to be well defined is given by $(l_{o,x})^2+(l_{o,y})^2\leq 1$.

This separation of variables obtains for a distribution that is the product of two orthogonal one-dimensional distributions:

$$l_o(x,y)=P(x)+Q(y),\qquad \text{Eq. (29)}$$

giving $(l_{o,x})^2+(l_{o,y})^2\leq 1$. According to Eq. 28, p and q are functions of x and y, respectively, and the ray direction is given by:

$$p(x)=P'(x)\ q(y)=Q'(y).\qquad \text{Eq. (30)}$$

Figure 36:
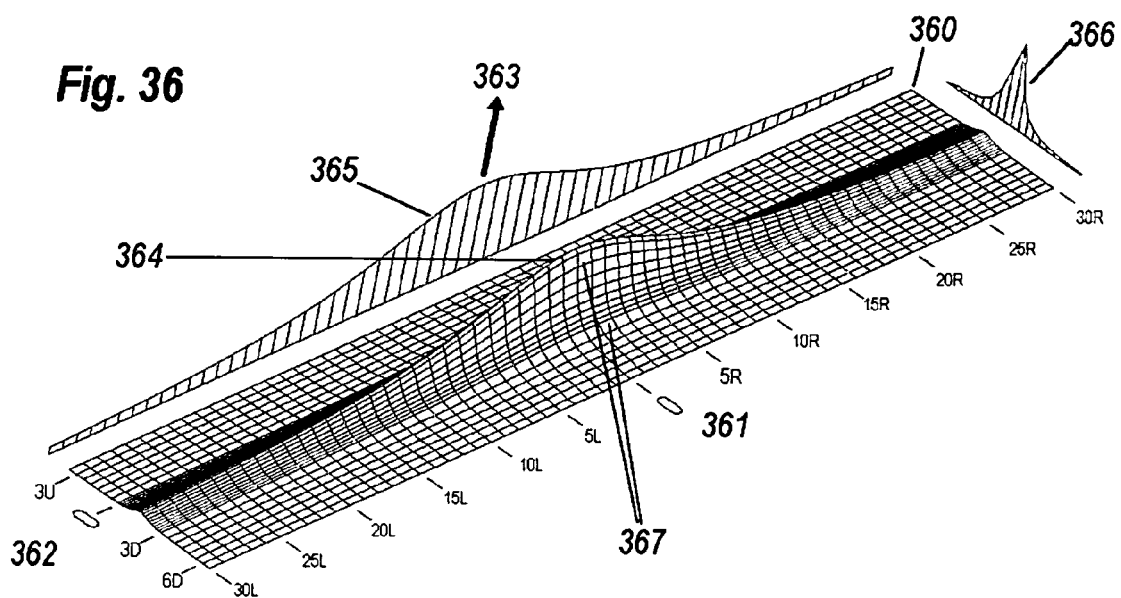
FIG. 36 shows a separable illumination prescription.

Using these special wavefronts enables the selection of the 3D control congruences to be reduced to the selection of two 2D wavefronts. The intensity distribution, however, is typically thereby controlled fully only along two lines of the p-q plane, for instance, $p=p_0$ and $q=q_0$, though this may be sufficient for applications where the planar prescription is the product of two perpendicular line prescriptions. Such a case is shown in FIG. 36, a perspective view of 3D graphical distribution 360, with horizontal degree-axis 361 and vertical degree-axis 362. The separability of intensity is expressed as $$I(H,V)=J(V)\ K(H)$$

with vertical prescription J and horizontal prescription K. Relative intensity is shown along orthogonal axis 363, scaled for unity at peak 364, which is located at 1.5° down. Profile 365 is horizontal relative intensity and profile 366 is vertical relative intensity. Contours 367 are examples of profile 365 after being multiplied by particular points on profile 366.

For example, the most difficult part of the automotive low-beam headlamp prescription is the cut-off line between the maximum on-road intensity and the quite close minimum in the direction of oncoming drivers. This output congruence is to be matched with an input congruence coming from the edge of the filament.

Figure 37A:
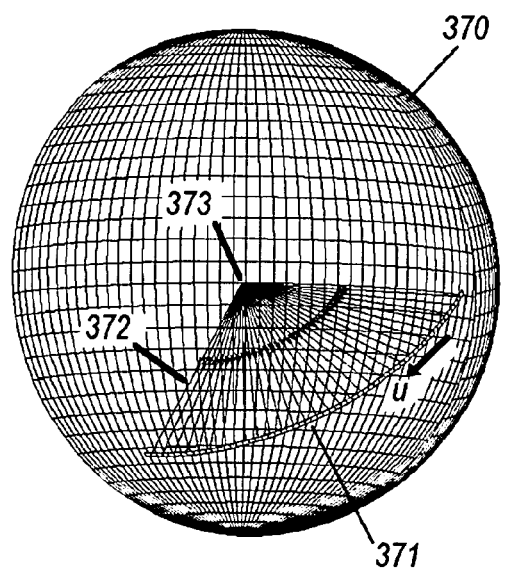
FIG. 37a shows the interior of a unit sphere with an arc of direction vectors from its center.

FIG. 37A is a view of the interior of cutaway unit sphere 370 and on its surface is arc 371, described by the vector-function $v_0(u)$ across fan 372 of ray-direction unit-vectors issuing from sphere center 373. This vector-function is given by:

$$v_0(u)=(p_0(u),q_0(u),+\sqrt{1-p_0^2(u)-q_0^2(u)}\qquad \text{Eq. (31)}$$

where u is shown as the line's arc-length parameter.

Figure 37B:
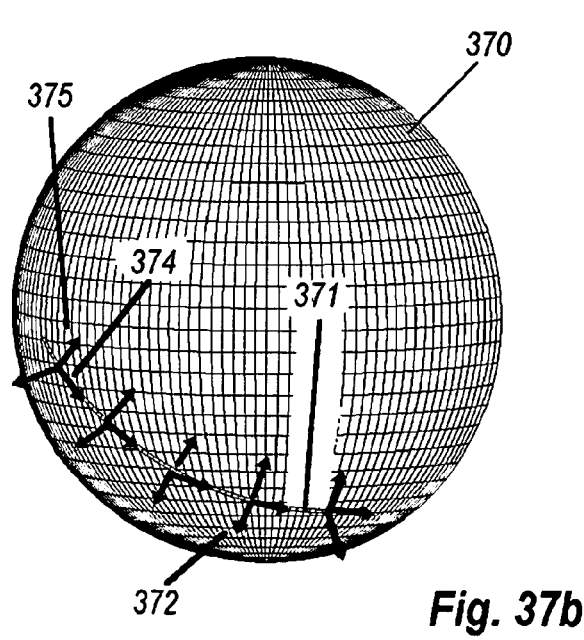
FIG. 37b is an exterior view of same, with unit-vector triads.

FIG. 37B is an exterior view of unit sphere 370 with arc 371. Rays 372 are shown protruding from sphere 370 with less than their unit length. Also shown at less than their actual unit length are tangent vectors 374, given as $v_0'(u)$, and binormal vectors 375, given as right-hand vector product as $v_0(u) \times v_0'(u)$.

Figure 37C:
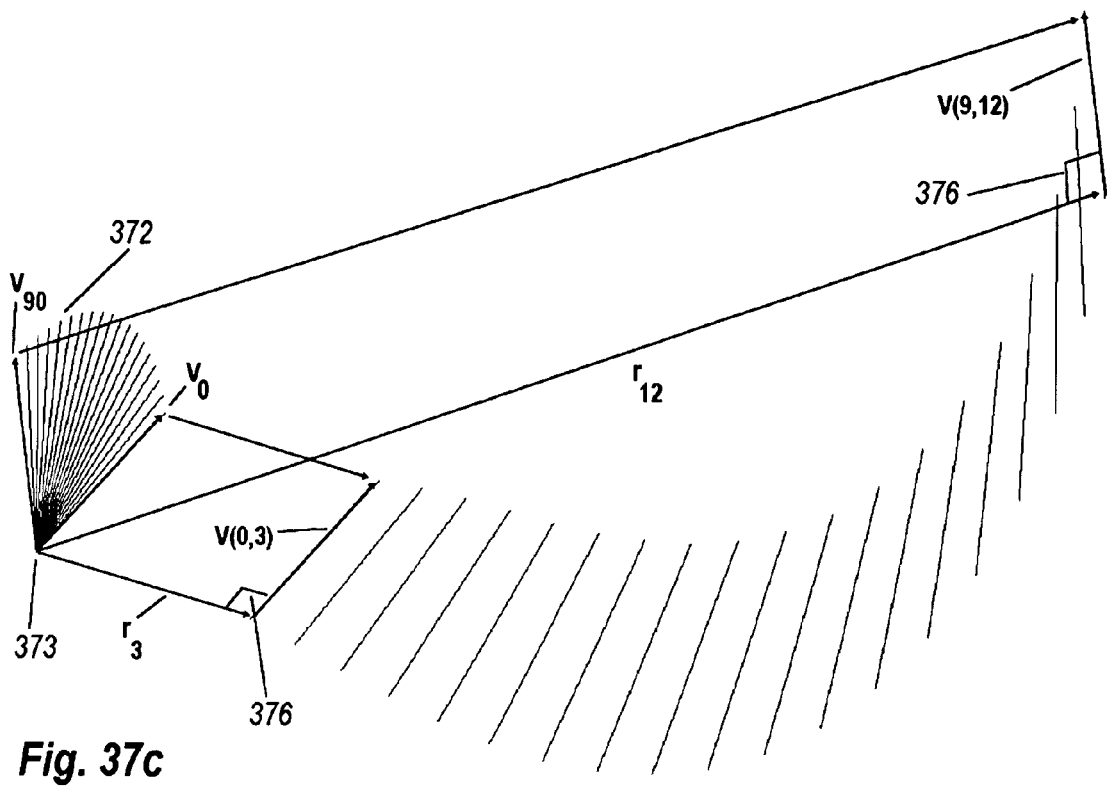
FIG. 37c shows orthogonal ray-translation.

When these unit vectors 372 are moved individually away from the center of the unit sphere in a direction perpendicular to their own, while retaining their original direction, the process is called orthogonal transport. Different rays are transported varying directions according to a second parameter v. FIG. 37c shows ray fan 372 with individual direction-vectors $v_0(u)$ labeled $v_0$ to $v_{90}$.

This defines a bi-parametric set of rays with vectors directionally coincident with $v_0(u)$ for the same u. This set is described not at the reference plane, but univocally by the pairs (r(u,v), v(u,v)). FIG. 37C also shows rays $r_3$ to $r_{12}$ as examples of r(u,v), which is the vector position for the closest point of a ray trajectory to the coordinate origin, thereby being its orthogonal-transport vector. Since r(u,v) and v(u,v) are mutually perpendicular, as shown by right angles 376 of FIG. 37C, the proper choice of parameters makes v(u,v) dependent on one parameter, i.e., $v(u,v)=v_0(u)$. Then, without loss of generality:

$$r(u,v) \cdot v_0(u)=0\qquad \text{Eq. (32)}$$

Figure 37D:
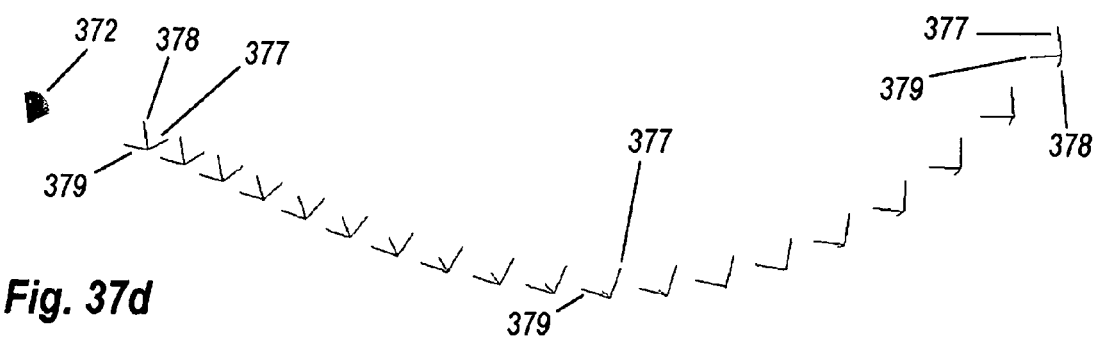
FIG. 37d shows orthogonal triad-translation.

Since u is the arc length parameter of the prescribed line $v_0(u)$ on the unit sphere, there is a perpendicular unit vector $v_0'(u)$, which FIG. 37D shows as vectors 378, as well as a third unit vector perpendicular to both: $v_0(u) \times v_0'(u)$, which FIG. 37D shows as vectors 379. FIG. 37D also shows ray fan 372 as in FIG. 37C, but with the unit vectors transported as vectors 377 by greater distances, for clarity.

Then, Eq. (32) implies that:

$$r(u,v)=\lambda(u,v)v_0'(u)+\mu(u,v)(v_0(u) \times v_0'(u))\qquad \text{Eq. (33)}$$

The bundles shown in FIG. 37C and 37D were arbitrary ones drawn only as conceptual examples. In order that such a bi-parametric bundle actually be a normal congruence, the Malus-Dupin theorem, as introduced above, states it is sufficient that:

$$r_u \cdot v_v - r_v \cdot v_u = 0 \Leftrightarrow \lambda_v = 0 \Leftrightarrow \lambda = \lambda(u).\qquad \text{Eq. (34)}$$

Therefore the curves described by r(u,v) when v varies (and u is fixed) are straight lines, because their tangent vector is parallel to $v_0(u) \times v_0'(u)$:

$$r_v(u,v)=\mu_v(u,v)(v_0(u) \times v_0'(u))\qquad \text{Eq. (35)}$$

and thus constant with v. Without loss of generality, the parameter v is selected to be the arc length of those u-constant straight lines. This is substantially equivalent to:

$$\mu_v(u,v)=1 \Leftrightarrow \mu_v(u,v)=v+\sigma(u)\qquad \text{Eq. (36)}$$

giving $$r(u,v) = r_0(u) + (v_0(u) \times v_0(u))v \qquad \text{Eq. (37)}$$

where $$r_0(u) = r(u,0) = \lambda(u)v_0(u) + \sigma(u)(v_0(u) \times v_0(u)) \qquad \text{Eq. (38)}$$

Eq. (37) is thus the general solution to the stated problem, and the contour conditions are the two functions $\lambda(u)$ and $\sigma(u)$. The selection of $\lambda(u)$ and $\sigma(u)$ is not fully arbitrary, because to better assure that the bundle is bi-parametric, $r_u(u,v) \times r_v(u,v)$ should not be identically null for all $(u,v)$, which implies that the selection $\lambda(u)$ 0 is excluded.

This problem could have also been stated in terms of the optical path length function $l_o(x,y)$ at the reference plane. The direction vector function given by Eq. (32) also describes a line in the p-q plane:

$$v_{\perp 0}(u) = (p_0(u), q_0(u)) \qquad \text{Eq. (39)}$$

Rather than this parametric form in the p-q plane, an implicit form eliminates the parameter u:

$$F(p,q) = 0 \; F(p,q) = 0 \qquad \text{Eq. (40)}$$

From Eq. (28) $l_{o,x} = p$ and $l_{o,y} = q$, so that the following first-order partial differential equation is obtained:

$$F(l_{o,x}, l_{o,y}) = 0 \qquad \text{Eq. (41)}$$

According to the previous derivation, the solution of Eq. (41) is:

$$l_o(x,y) = \int_0^x p_0(u(x,y))dx + \int_0^y q_0(u(x,y))dy + l_o(0,0) \qquad \text{Eq. (42)}$$

where $p_0$ and $q_0$ are the prescribed functions in Eq. (39), and $u(x,y)$ is obtained by inverting the mapping produced between the parameter plane u-v and the intersection point $r_\perp = (x,y,0)$, on the reference plane z=0 (see FIG. 34), of the rays $(r(u,v), v_0(u)), r(u,v))$ given by Eq. (37). This mapping is given by:

$$r_\perp(x,y) = r(u,v) - \frac{u_z \cdot r(u,v)}{u_z \cdot v_0(u)} v_0(u) \qquad \text{Eq. (43)}$$

Eq. (42) assumes that a ray of the bundle passes though the origin of the reference plane, and that $l_o(0,0)$ is an integration constant.

Figure 38:
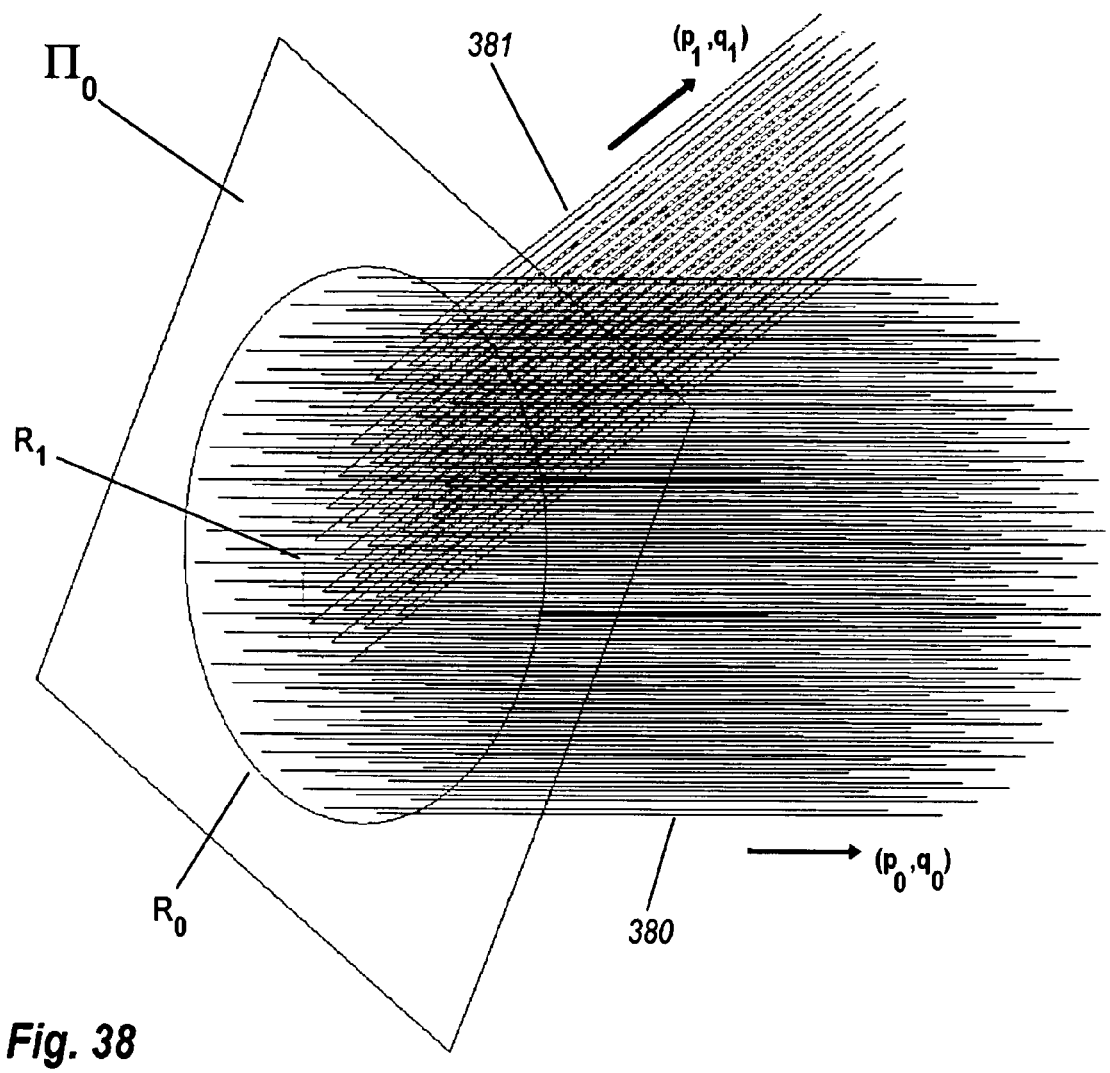
FIG. 38 shows exit-plane flashing.

When the light source has approximately constant luminance L then the value of a prescribed intensity distribution $I(p,q)$ for substantially any direction $(p,q)$ is the integral over the reference plane of the rays with that direction:

$$I(p,q) = L \iint_{R(p,q)} dx\, dy \qquad \text{Eq. (44)}$$

where $R(p,q)$ is the region of the reference plane formed by points $(x,y)$ through which a ray with direction $(p,q)$ exits the optical system. This region is known as the flashed portion of the exit aperture. To illustrate flashing, FIG. 38 shows reference plane $\pi_o$ with ray bundle 380 passing out region $R_0$ with direction vector $(p_0,q_0)$ and ray bundle 381 passing out region $R_1$ with direction vector $(p_1,q_1)$.

Figure 39:
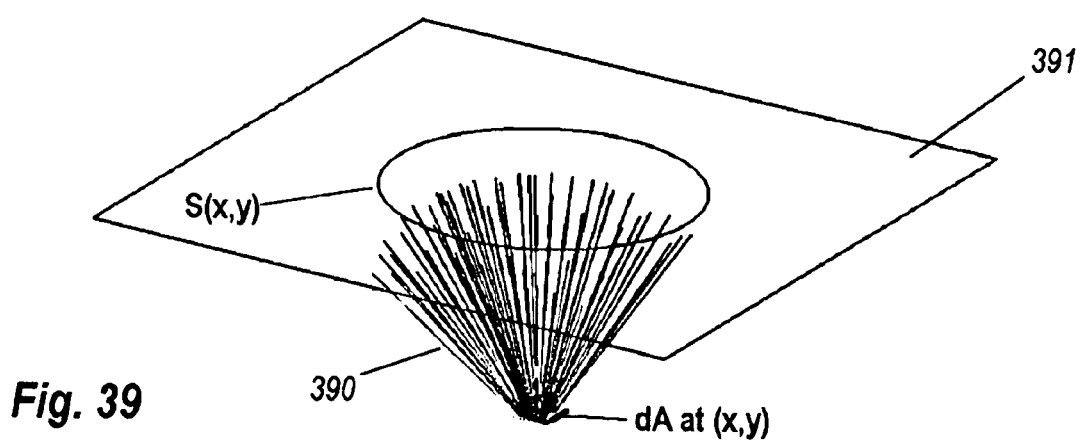
FIG. 39 shows the emission pattern of a differential of exit-plane area.

Correspondingly, FIG. 39 shows exiting rays 390 passing through a differential area dA at the point $(x,y)$ of the reference plane describe a solid angle $S(x,y)$ on p-q plane 391. This solid angle is the above-mentioned source-image, with its associated paintbrush analogy for posing the inverse problem of deriving control congruences from a prescription. Some embodiments employ the useful idea for the inverse problem of the small-source approximation, usually posed in first-order optics.

First-order optics approximate as a quadric every surface encountered by a ray of spherical wavefront $W_c$ (shown in FIG. 34) emitted from a point C on the source (see for example, R. K. Luneburg. Mathematical Theory of Optics (University of California, Berkeley and Los Angeles 1964), incorporated herein by reference). At every exit-aperture point $(x,y)$ the ray of wavefront $W_c$ has direction functions $[p_c(x,y), q_c(x,y)]$, assumed to be invertible as $[x(p_c,q_c), y(p_c,q_c)]$. This leads to a change of variables in the integral of Eq.(44):

$$I(p,q) = L \int_{S_C(p,q)} |J(p_C, q_C)| dp_C dq_C \qquad \text{Eq. (45)}$$

where $S_c(p,q)$ is the region of the $p_c$-$q_c$ plane defined by $$S_c(p,q) = \{(p_c, q_c) \text{ fulfilling that } (p,q) \in S(x(p_c, q_c), y(p_c, q_c))\} \qquad \text{Eq. (46)}$$

and the Jacobian is given by:

$$J(p_c,q_c) = x_{p_C}(p_c,q_c) y_{q_C}(p_c,q_c) - x_{q_C}(p_c,q_c) y_{p_C}(p_c,q_c) \qquad \text{Eq. (47)}$$

Since $W_c$ is a normal congruence, Eq. 27 is fulfilled for $p_c$ and $q_c$, and by inversion, it is also obtained that $x_q = y_p$ in Eq. (47).

There is an especially simple case when, for any $(p,q)$, $J(p_c,q_c)$ is almost constant inside the direction-space region $S_c(p,q)$. Then, $J(p_c,q_c)$ can be removed from the integral in Eq. 45, leading to a good approximation for the resultant intensity pattern:

$$I(p,q) \approx L|J(p,q)| \int_{S_C(p,q)} dp_C dq_C \qquad \text{Eq. (48)}$$

Moreover, if for the region of p-q plane $$S(x(p_c,q_c), y(p_c,q_c)) \approx f(p-p_c, q-q_c) \qquad \text{Eq. (49)}$$

for any $(p_c,q_c) \in S_c(p,q)$, then:

$$S_c(p,q) \approx S(x(p,q), y(p,q)) \qquad \text{Eq. (50)}$$

Thus, Eq. (48) can be rewritten as:

$$I(p,q) \approx |J(p,q)| \left( L \int_{S(x(p,q),y(p,q))} dp_C dq_C \right) \qquad \text{Eq. (51)}$$

This bracket is the illuminance IL produced by the source at the reference plane at the point $(x(p,q), y(p,q))$. Thus:

$$I(p,q) \approx |x_p(p,q) y_q(p,q) - x_q(p,q) y_p(p,q)| IL(x(p,q), y(p,q)) \qquad \text{Eq. (52)}$$

This equation can be rewritten in the x-y variables using the functions $p_c$ and $q_c$, leading to:

$$I(p_C(x,y), q_C(x,y)) \approx \frac{IL(x,y)}{|p_{C,x}(x,y)q_{C,y}(x,y) - p_{C,y}(x,y)q_{C,x}(x,y)|} \quad \text{Eq. (53)}$$

Using the function $l_c(x,y)$ associated with the congruence $W_c$ gives:

$$I(l_{C,x}, l_{C,y}) \approx \frac{IL(x,y)}{|l_{C,xx}l_{C,yy} - l_{C,xy}^2|} \quad \text{Eq. (54)}$$

The absolute value in Eq. (54) leads to two families of solutions:

$$l_{C,xx}l_{C,yy} - l_{C,xy}^2 \approx \pm \frac{IL(x,y)}{I(l_{C,x}, l_{C,y})} \quad \text{Eq. (55)}$$

This is the small-source approximation level for the exit radiation, and the necessary conditions are given by the two approximations carried out in Eq. (48) and Eq. (49).

There is a local invariance of the region $S(x,y)$ stated in approximation Eq. (49) in terms of the optical path length function. According to the approximation in Eq. (49), the rays' spherical wavefront $W_i$ generated at point (x',y') of the source reference plane, after propagation through the optical system to become the exit wavefront $W_o$, so that for any (x,y) in R(p,q):

$$p(x',y',x,y) - p_c(x,y) \approx m(x',y')$$

$$q(x',y',x,y) - q_c(x,y) \approx n(x',y') \quad \text{Eq. (56)}$$

independent of x and y. Equation Eq. (56) can be integrated to obtain the optical path length functions $l_o(x,y,x',y')$ and $l_{oc}(x,y)$ at the reference plane:

$$l_o(x',y',x,y) \approx l_{oc}(x,y) + m(x',y')(x-x_c) + n(x',y')(y-y_c) \quad \text{Eq. (57)}$$

where $x_c = x(p_c, q_c)$ and $y_c = y(p_c, q_c)$. This approximation between $l_o(x',y',x,y)$ and $l_{oc}(x,y)$ typically holds for every (x,y) in the flashed-aperture region R(p,q), i.e., the higher-order terms in this polynomial series expansion are negligible in R(p,q).

Therefore, Eq. Eq. (55) is accurate when Eq.Eq. (48) and Eq. (56) (or equivalently Eq. (57)) are fulfilled. For the small-source approximation, however, the accuracy is forced not only for the exit-ray bundle, but also for the bundle when it is inside the optical system at substantially any optical surfaces considered as a reference surface. This implies that not only the difference function $l_o(x',y',x,y) - l_{oc}(x,y)$ is approximately linear in x and y, but also in x' and y'.

Therefore, the small-source approximation is a particular case of the source projection linear approximation described fully below, where, apart from the approximation of the constancy of the Jacobian in Eq. Eq. (48), this linearity was forced for the variables x' and y'.

The SMS-3D design of two surfaces totally controls two normal congruences of the output rays, and, by means of the seed-rib, at least partially controls a third congruence. These three congruences could be those from three emitting points of the light source. While it may seem that full control of the rays from only three points of a 3D source is a poor control, in many practical designs there is an approximately linear dependence of the direction of the rays at a point of the exit reference plane (as seen in FIG. 34) with the spatial coordinates of the emission point of that ray on the source. If so, then the rays generated at the source can be accurately controlled by the three design wavefronts.

Figure 40:
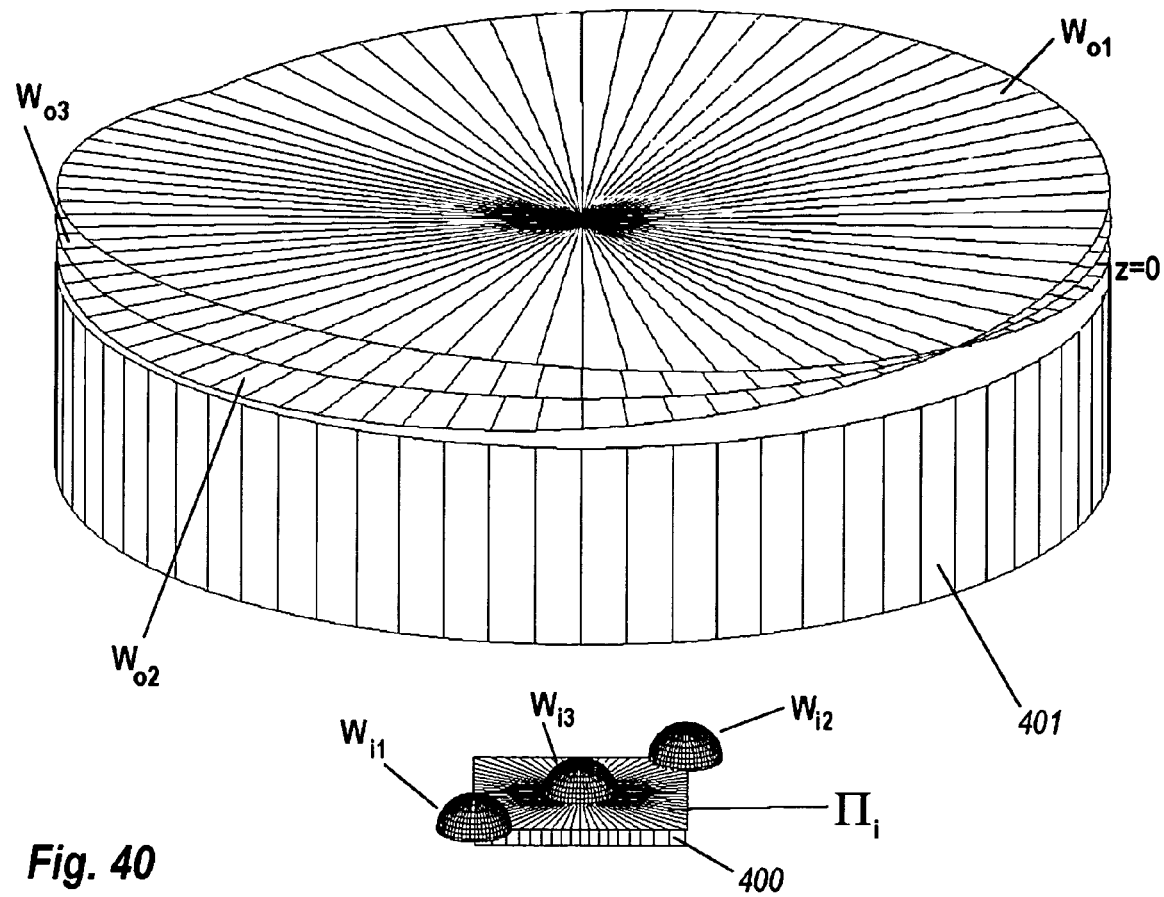
FIG. 40 shows input and output wavefronts.

Three points $r_1$, $r_2$ and $r_3$ are considered on the emission region of the light source, defining a reference plane $\pi_i$ for the input wavefronts. The coordinates $(x_k', y_k')$ on the plane $\pi_i$ define a given point $r_k$. FIG. 40 shows three spherical wavefronts $W_{i1}$, $W_{i2}$ and $W_{i3}$ centered at points $r_1$, $r_2$ and $r_3$, respectively (hidden beneath the wavefronts). These three wavefronts from source 400 are to be transformed by schematic optical system 401 into three exiting wavefronts $W_{o1}$, $W_{o2}$ and $W_{o3}$, with respective associated optical path length functions $l_{o1}(x,y)$, $l_{o2}(x,y)$ and $l_{o3}(x,y)$ at the exit reference plane z=0.

An arbitrary input wavefront $W_i$ is also considered defined at the reference plane $\pi_i$. The aforementioned linear approximation consists in stating that propagation of $W_i$ through the optical system is such that, for each point (x,y) of the exit reference plane, the function $l_o(x,y)$ associated with the exit wavefront $W_o$ depends linearly on the position r=(x',y') on the input reference plane of the associated ray $(p,q)=(l_{o,x}, l_{o,y})$ (propagated backwards), that is:

$$\begin{vmatrix} x' & y' & l_o(x,y) & 1 \\ x_1' & y_1' & l_{o1}(x,y) & 1 \\ x_2' & y_2' & l_{o2}(x,y) & 1 \\ x_3' & y_3' & l_{o3}(x,y) & 1 \end{vmatrix} = 0 \quad \text{Eq. (57)}$$

This equation can also be written as:

$$l_o(x,y) = \frac{-1}{|M^l|}(|M^x|x' + |M^y|y' + |M|) \quad \text{Eq. (58)}$$

where:

$$M = \begin{bmatrix} x_1' & y_1' & l_{o1}(x,y) \\ x_2' & y_2' & l_{o2}(x,y) \\ x_3' & y_3' & l_{o3}(x,y) \end{bmatrix} \quad \text{Eq. (59)}$$

and $M^k$ is the resulting matrix obtained by substituting the $k^{th}$ column in M by a column with 1's (note that $M^1$ does not depend on x and y).

Moreover, Eq. (57) can also be written as:

$$l_o(x,y) = a_1(x',y')l_{o1}(x,y) + a_2(x',y')l_{o2}(x,y) + a_3(x',y')l_{o3}(x,y) \quad \text{Eq. (60)}$$

where $a_k(x',y') = \lambda_k/\lambda$, being $$\lambda = [(r_2 - r_1) \times (r_3 - r_1)]c \quad \text{Eq. (61)}$$

and $\lambda_k$ results from eliminating index k in $\lambda$. Vector c is normal to the plane $\pi_i$, and thus is given by:

$$c = \frac{(r_2 - r_1) \times (r_3 - r_1)}{|(r_2 - r_1) \times (r_3 - r_1)|} \quad \text{Eq. (62)}$$

It is noted that the functions $a^k(x',y')$ depend linearly on $x'$ and $y'$.

By deriving Eq. (60), the direction of the rays of $W_o$ at the exit are obtained as:

$$v_\perp(x,y) = a_1(x',y')v_{\perp 1}(x,y) + a_2(x',y')v_{\perp 2}(x,y) + a_3(x',y')v_{\perp 3}(x,y) \quad \text{Eq. (63)}$$

where $v_{\perp k} = (p_k, q_k)$.

Figure 41:
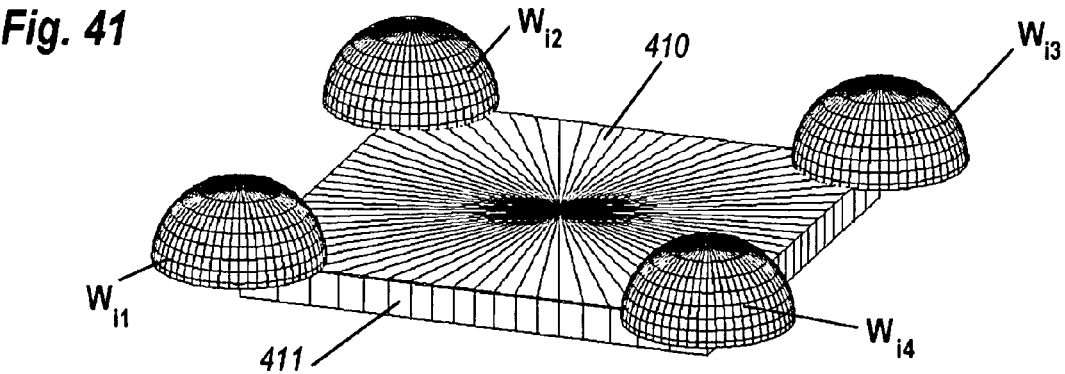
FIG. 41 shows four wavefronts from an LED chip.

In order to illustrate this source-projection linear approximation, FIG. 41 shows schematically the case in which the light source is a rectangle 410 of homogeneous luminance and Lambertian emission, such as the high-flux flip-chip Luxeon LEDs by Lumileds, indicated by source 411. Also shown are the four normal congruences $W_{i1}$, $W_{i2}$, $W_{i3}$, and $W_{i4}$ defined by the rays emitted from the four chip corners, $r_1$, $r_2$, $r_3$ and $r_4$ (not shown). At the exit of the optical system these become $W_{o1}$, $W_{o2}$, $W_{o3}$, and $W_{o4}$. Due to the assumed linearity with the x'-y' variables, $W_{o4}$ can be calculated from wavefronts $W_{o1}$, $W_{o2}$, $W_{o3}$ by Eq. (60). Within the rectangle $r_4 = r_2 + r_3 - r_1$, so that:

$$l_{o4}(x,y) = l_{o2}(x,y) + l_{o3}(x,y) - l_{o1}(x,y) \quad \text{Eq. (64)}$$

$$v_{\perp 4}(x,y) = v_{\perp 2}(x,y) + v_{\perp 3}(x,y) - v_{\perp 1}(x,y)$$

This interdependence among $W_{o1}$, $W_{o2}$, $W_{o3}$ and $W_{o4}$ implies that with the source-projection linear approximation, the source-image ray-bundle exiting from a point (x,y) on the reference plane form on p-q plane a parallelogram (not a general quadrangle), rather than the schematic circle S(x,y) shown in FIG. 39.

For the more general inverse problem, there are three unknown functions to be controlled by the design, the two optical path-length functions $l_{o1}(x,y)$ and $l_{o2}(x,y)$, and $l_{o3}(x,y)$ of the design wavefronts. Equivalently, the functions $l_{o1}(x,y)$, $d_{21}(x,y) = l_{o2}(x,y) - l_{o1}(x,y)$, and $d_{31}(x,y) = l_{o3}(x,y) - l_{o1}(x,y)$ are considered as unknowns. Using the paintbrush analogy, these three functions $l_{o1}$, $d_{21}$ and $d_{31}$ provide the following information about the painting process: $l_{o1}$ indicates the paintbrush edge position, while $d_{21}$ and $d_{31}$ indicate orientation, magnification and squeezing of the paintbrush.

A possible solution for the inverse problem is, in some instances, set forth when $d_{21}$ and $d_{31}$ are prescribed (although not with respect the x-y variables, as seen below), and the only unknown function is $l_{o1}$. Then the paintbrush will be prescribed and its motions calculated. This is of interest because the paintbrush size and orientation controls the shape of the optics, in particular, the optics contour and minimizing the tolerances to source displacement.

Regarding the contour of the optics, consider a design for a monofacial rectangular source that emits isotropically, with corners $r_1$, $r_2$, $r_3$, with corresponding exit wavefronts $W_{o1}$, $W_{o2}$ and $W_{o3}$ that have the above-described separation of variables. Assume that the plane of the source defines an input reference plane, with the origin at the center of source center, the x' axis parallel to the line from $r_1$ to $r_2$, and the y' axis to that from $r_1$ to $r_3$. The input data and the SMS design are to be symmetric with respect to the x and y axes (in particular, $r_1 = (-L_Y/2, -L_X/2)$, $r_2 = (-L_Y/2, L_X/2)$ and $r_3 = (L_Y/2, -L_X/2)$).

Consider also the 2-parameter bundle defined by the rays emitted by the segment $r_1$-$r_2$ of the source and passing through the line $y=y_0$ of the exit reference plane. In general, the 2D étendue of a 2-parameter bundle $M_{2D}$ is calculated at a reference surface as:

$$E_{2D} = \iint_{M_{2D}} dx\,dp + dy\,dq + dz\,dr \quad \text{Eq. (65)}$$

Since the two segments are parallel to the x and x' axis, y (y') and z (z') are constant. Thus, in the calculation of the 2D étendue of this bundle either at the input or at the output reference planes, the terms dydq and dzdr will be null, leading to:

$$\int_{t=0}^{t=x} (p_2(t) - p_1(t))\,dt = \quad \text{Eq. (66)}$$

$$\int_{t'=-L_X/2}^{t'=L_X/2} p'(x', x, y_0)\,dt' = L_X \langle p'(x', x, y_0) \rangle_{x'}$$

where $p'(x', x, y_0)$ is the p-coordinate of the ray emitted from the points of abscissa x' on the segment $r_1$-$r_2$ and passing through the point $(x, y_0)$ of the exit reference plane. Equivalently, for the bundle emitted by the segment $r_1$-$r_3$ of the source and exiting the aperture from the line $x = x_0$, the integral is obtained:

$$\int_{t=0}^{t=y} (q_3(t) - q_1(t))\,dt = \quad \text{Eq. (67)}$$

$$\int_{t'=-L_Y/2}^{t'=L_Y/2} q'(y', x_0, y)\,dt' = L_Y \langle q'(y', x_0, y) \rangle_{y'}$$

Particularizing both Eq. (66) and Eq. (67) for a given point of the exit aperture, i.e. making $x = x_0$ and $y = y_0$, gives:

$$\int_{t=0}^{t=x_0} (p_2(t) - p_1(t))\,dt = L_X \langle p'(x', x_0, y_0) \rangle_{x'} \quad \text{Eq. (68)}$$

$$\int_{t=0}^{t=y_0} (q_3(t) - q_1(t))\,dt = L_Y \langle q'(y', x_0, y_0) \rangle_{y'}$$

If $p'(x', x_0, y_0)$ and $q'(y', x_0, y_0)$ are approximately constant along the segments $r_1$-$r_3$ and $r_1$-$r_3$, then:

$$\langle p'(x', x_0, y_0) \rangle_x \approx p'(-L_X/2, x_0, y_0) \equiv p_1'(x_0, y_0)$$

$$\langle q'(y', x_0, y_0) \rangle_y \approx q'(-L_Y/2, x_0, y_0) \equiv q_1'(x_0, y_0) \quad \text{Eq. (69)}$$

For maximum collection efficiency, the contour of the exit aperture is defined when the design rays at the input become tangent to the rectangular source, i.e., r'=0, or equivalently, $p'^2 + q'^2 = n^2$ for the source immersed in a medium of refractive index n, such as n=1.54 of the epoxy of LED packages. Taking this tangency into account, along with Eq. (68) and Eq. (69), the contour is given by:

$$\left[ \frac{1}{L_X} \int_{t=0}^{t=x_0} (p_2(t) - p_1(t))\,dt \right]^2 + \quad \text{Eq. (70)}$$

$$\left[ \frac{1}{L_Y} \int_{t=0}^{t=y_0} (q_3(t) - q_1(t))\,dt \right]^2 = n^2$$

Equivalently, using the functions $P_1$, $Q_1$, $P_2$ and $Q_3$ defined in Eq. (97) below, Eq. (70) can be rewritten more simply as:

$$\left[\frac{P_2(x_0) - P_1(x_0) + P_2(0) - P_1(0)}{L_X}\right]^2 + \quad \text{Eq. (71)}$$

$$\left[\frac{Q_3(y_0) - Q_1(y_0) + Q_3(0) - Q_1(0)}{L_Y}\right]^2 = n^2$$

As an example, consider that the contour is intended to be nearly rectangular in $-x_{max} \leq x \leq x_{max}$ and $-y_{max} \leq y \leq y_{max}$. Then the desirable outcome is:

$$\left.\frac{dy_0}{dx_0}\right|_{-y_{max}<y_0<y_{max}} \approx \infty \quad \left.\frac{dy_0}{dx_0}\right|_{-x_{max}<x_0<x_{max}} \approx 0 \quad \text{Eq. (72)}$$

Differentiating Eq. (71) gives:

$$\frac{dy_0}{dx_0} = -\frac{L_Y^2}{L_X^2} \frac{P_2(x_0) - P_1(x_0) + P_2(0) - P_1(0)}{Q_3(y_0) - Q_1(y_0) + Q_3(0) - Q_1(0)} \frac{p_{chip}(x_0)}{q_{chip}(y_0)} \quad \text{Eq. (73)}$$

where $p_{chip}(x) = p_2(x) - p_1(x)$ and $q_{chip}(y) = p_2(y) - p_1(y)$ are the projected horizontal and vertical chip angular sizes. A strategy to obtain Eq. (72) is to select generally:

$p_{chip}(x_0)$ as big as possible when $|x_0| \approx x_{max}$ $q_{chip}(y_0)$ as big as possible when $|y_0| \approx y_{max}$ \quad Eq. (1)

It is noted that the average luminance values are bounded by Eq. (68) and Eq. (69) at the points of the contour where $p_1' = n$ and $q_1' = n$, for which $x = x_{max}$ and $y = y_{max}$, respectively:

$$\int_{t=0}^{t=x_{max}} p_{chip}(t)dt = nL_X \quad \text{Eq. (75)}$$

$$\int_{t=0}^{t=y_{max}} q_{chip}(t)dt = nL_Y$$

Thus, in order to fulfill Eq. (1), one preferred option is that the chip sizes are non-uniform, smaller at the center than at the edge of the exit aperture. This rule may conflict with other criteria, either the specifics of a given design or in general, such as the selection of $q_{chip}(y)$ to obtain a prescribed intensity gradient in automotive applications.

Tolerance to misalignment of the source is, in some embodiments and/or implementations, a significant practical issue for high-performance optics, particularly affecting the vertical intensity distribution for a prescribed intensity gradient at a cutoff, for example, between the roadway pattern and the drivers of oncoming vehicles for an automotive headlight prescription application. This calculation is assumed in some embodiments, to be two dimensional, with axis y (UP) and z (FRONT). It can be applied to 3D problems in which the exit wavefronts have the abovementioned separation of variables.

Some implementations assume that the source projected vertical size distribution has already been selected along the y-axis. The objective is to calculate the y-axis distribution of the two edge rays that minimizes the sensitivity of the output-intensity gradient to source misalignments. These are the edge rays to be used for the above-mentioned calculation of the seed rib. The edge of the chip is modeled as a 2D line source of length L, generating rays that form the edge of the output intensity distribution.

Figure 42:
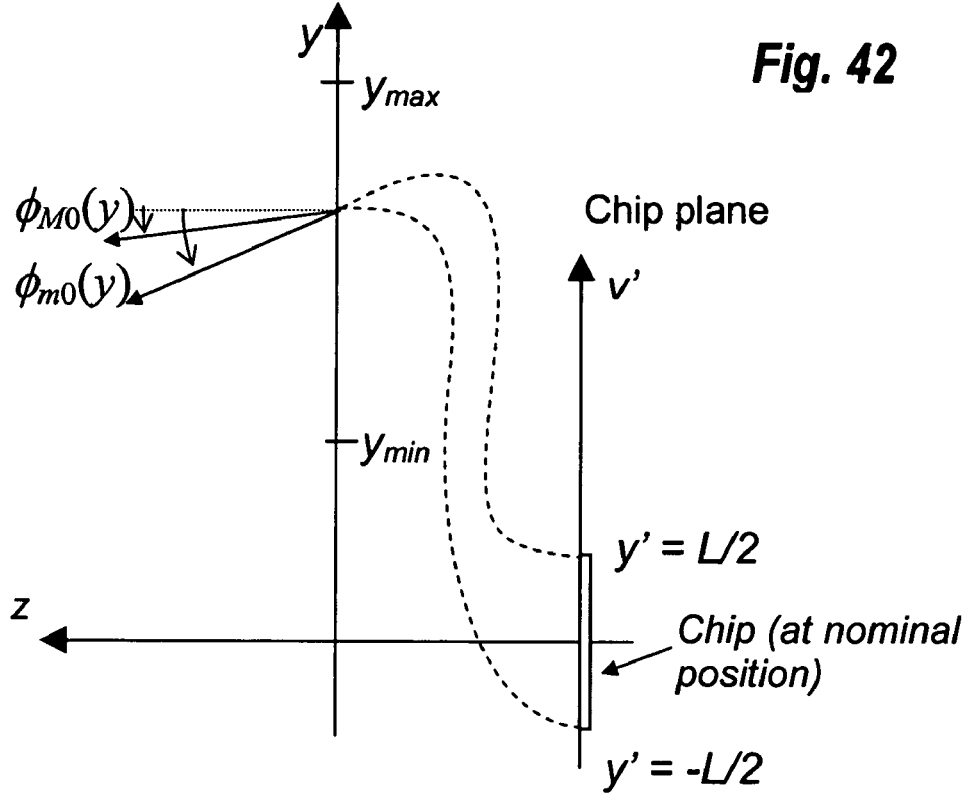
FIG. 42 shows the y-z plane of the separated-variable design process.

The vertical angle $\phi$ is defined by $q = -\sin \phi$. It is assumed that the above-mentioned source projection linear approximation for the variables q and y', giving the approximation:

$$q(y, y') = \frac{q_{m0}(y) - q_{M0}(y)}{L} y' + \frac{q_{m0}(y) - q_{M0}(y)}{2} \quad \text{Eq. (76)}$$

where $q_{m0} = -\sin \phi_{m0}$ and $q_{M0} = -\sin \phi_{M0}$ are shown in FIG. 42, which assumes that $\phi_{m0} > \phi_{M0}$. Another optical system may produce an inversion of the ray designation, i.e., such that $\phi_{m0} < \phi_{M0}$.

Figure 43:
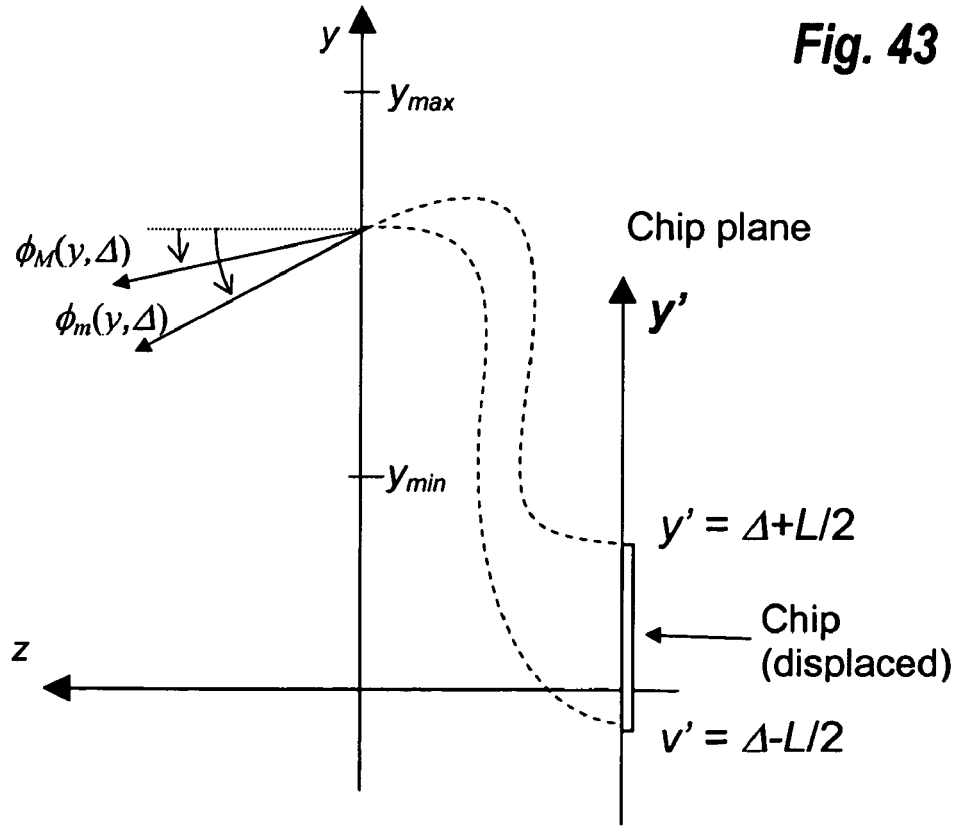
FIG. 43 shows the effects of chip placement error.

The chip is displaced from the nominal position a distance $\Delta$, so that it extends from $y' = \Delta - L/2$ to $y' = \Delta + L/2$. FIG. 43 shows the new exit angles, given by Eq. (76) as:

$$q_m(y, \Delta) = q\left(y, y' = \Delta + \frac{L}{2}\right) = \frac{q_{m0}(y) - q_{M0}(y)}{L} \Delta + q_{m0}(y) \quad \text{Eq. (77)}$$

$$q_M(y, \Delta) = q\left(y, y' = \Delta - \frac{L}{2}\right) = \frac{q_{m0}(y) - q_{M0}(y)}{L} \Delta + q_{M0}(y)$$

where $q_m(y, \Delta) = -\sin \phi_m(y, \Delta)$ and $q_m = -\sin \phi_M(y, \Delta)$.

With the assumption of linearity in Eq. (76), the projected chip image size $q_{chip}(y)$ is independent of $\Delta$ (i.e., changing the chip position moves its far-field images, with size unchanged), as can be easily checked from Eq. (77):

$$q_{chip}(y, \Delta) = q_m(y, \Delta) - q_M(y, \Delta) = q_{m0}(y) - q_{M0}(y) \quad \text{Eq. (78)}$$

Using the function $q_{chip}(y)$, Eq. (77) can be rewritten:

$$q_m(y, \Delta) = q_{chip}(y) \frac{\Delta}{L} + q_{m0}(y) \quad \text{Eq. (79)}$$

$$q_M(y, \Delta) = q_{chip}(y) \frac{\Delta}{L} + q_{M0}(y)$$

Note that the chip angular size $\alpha_v(y, \Delta)$ does, in some implementations, depend on $\Delta$, due to the fact that Eq. (76) sets the linearity in q but not in $\theta$. The function $\alpha_v(y, \Delta)$ can be expressed as:

$$\alpha_v(y, \Delta) = a\sin\left[\frac{q_{chip}(y)}{2\cos\left(\frac{\phi_m(y, \Delta) + \phi_M(y, \Delta)}{2}\right)}\right] \quad \text{Eq. (80)}$$

Since $\phi_m > \phi_M$, the rays associated with $\phi_M(y, \Delta)$ defines the gradient, and thus when the chip luminance is non-uniform, a smaller projected chip-image $q_{chip}(y)$ gives a steeper bright-dark transition. However, these projected images typically cannot be made small all along the y-axis, because by étendue conservation causes an isotropically emitting chip to have the function $q_{chip}(y)$ given by:

$$\int_{y_{min}}^{y_{max}} q_{chip}(y) dy = 2nL \Rightarrow <q_{chip}> = \frac{2nL}{y_{max} - y_{min}} \quad \text{Eq. (81)}$$

This implies that fixing the chip and optics height $y_{max} - y_{min}$ fixes the average value of $q_{chip}(y)$.

Figure 44:
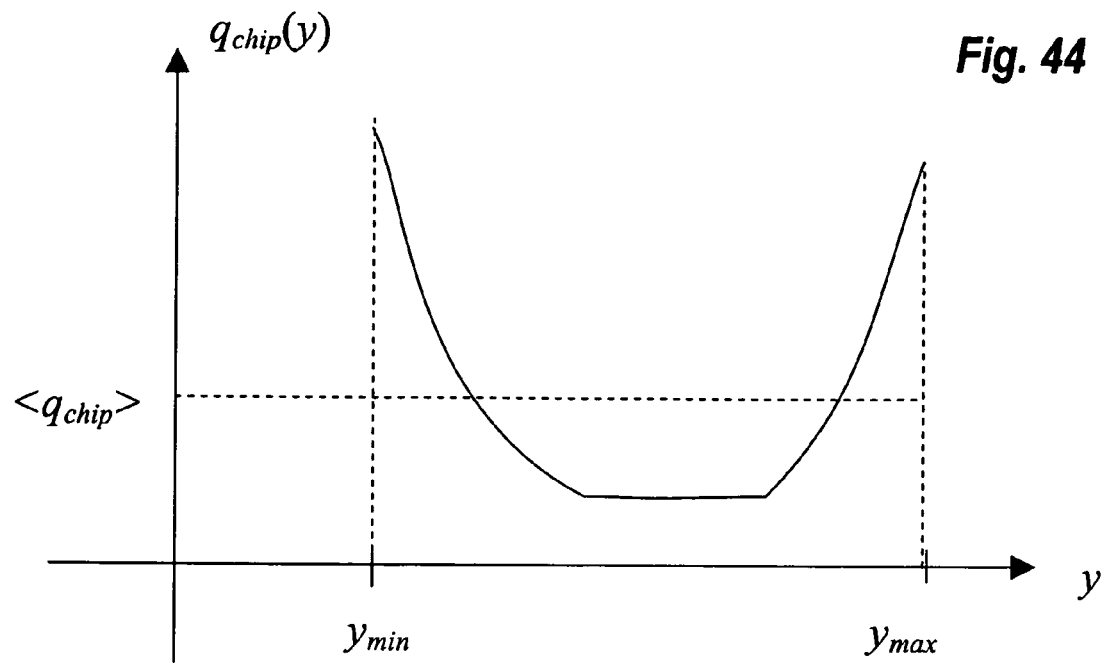
FIG. 44 shows the placement of the image of the edge of the LED chip.

FIG. 44 shows a graphical representation of how a good intensity gradient, in some implementations, provide that a portion of the aperture emits with a constant source-image size $q_{min}$ ($\approx\sin 2°$), with the remaining aperture's source-image size gradually increasing toward a maximum value $q_{max}$ ($\approx\sin 10°$). This larger image is directed well off from the vehicle centerline, where the intensity gradient is not prescribed because overall intensity is low.

Images of the chip's edge are kept distinct from the larger images of the rectangular chip top, by displacing the latter lower in the pattern, thereby letting the small images create the cutoff-gradient generally alone. This lowering of the big images in some embodiments happens not only for the nominal chip-position, but also for a vertical displacement $\Delta$, within a maximum specified range $|\Delta|<\Delta_{max}$. Accordingly, when the chip is displaced the maximum negative value $\Delta=-\Delta_{max}$, the top of chip images are superimposed at a certain (angular) position $q_0$. Then, from Eq. (77):

$$q_M(y, -\Delta_{max}) = q_{chip}(y)\frac{(-\Delta)}{L} + q_{M0}(y) = q_0 \quad \text{Eq. (82)}$$

So that $$q_{M0}(y) = q_0 + q_{chip}(y)\frac{\Delta}{L} \quad \text{Eq. (83)}$$

$$q_{m0}(y) = q_0 + q_{chip}(y)\left(1 + \frac{\Delta}{L}\right)$$

This is used to determine the shape of the side edges of the optical system, such as a headlamp, where light from the edge of the chip is handled.

Consider the mapping between the exit reference plane $\pi_o$, with its x-y coordinates and the p-q directional plane created by the rays of $W_o$. The mapping functions are:

$$p_1 = p_1(x,y) \quad q_1 = q_1(x,y) \quad \text{Eq. (84)}$$

Assume as with Eq. (45) that the functions Eq. (84) can be inverted as:

$$x = x(p_1,q_1) \quad y = y(p_1,q_1) \quad \text{Eq. (85)}$$

Thus, this mapping defines a change of variables for the integral of Eq. Eq. (44). Then the function I(p,q) is:

$$I(p,q) = L\iint_{S_1(p,q)} |J(p_1,q_1)| dp_1 dq_1 \quad \text{Eq. (86)}$$

where $S_1(p,q)$ is the region of the $p_1$-$q_1$ plane defined by:

$$S_1(p,q) = \{(p_1,q_1)/(p,q) \in S(x(p_1,q_1),y(p_1,q_1))\} \quad \text{Eq. (87)}$$

and the Jacobian is:

$$J(p_1, q_1) = x_{p1}(p_1,q_1)y_{q1}(p_1,q_1) - x_{q1}(p_1,q_1)y_{p1}(p_1,q_1) \quad \text{Eq. (88)}$$

It is noted that since $W_{o1}$ is a normal congruence, Eq. Eq. (27) is fulfilled for $p_1$ and $q_1$, and by the inversion, it is also true that $x_q = y_p$ in Eq. (88). It is also noted that because of the assumption that the mapping is invertible, the Jacobian $J(p_1, q_1)$ is non-zero, so that its absolute value leads to two families of solutions.

Then, when a function K is defined as:

$$K(p,q,p_1,q_1) = \begin{cases} 1 & \text{if}(p_1,q_1) \in S_1(p,q) \\ 0 & \text{if}(p_1,q_1) \notin S_1(p,q) \end{cases} \quad \text{Eq. (89)}$$

Eq. (86) can be rewritten as:

$$\pm I(p,q) = L\iint_{p_1^2+q_1^2 \leq 1} K(p,q,p_1,q_1)J(p_1,q_1)dp_1 dq_1 \quad \text{Eq. (90)}$$

Using the paintbrush analogy, the function K in Eq. (90) is the paintbrush shape and size, while the Jacobian $J(p_1,q_1)$ expresses the paintbrush's movement on the aperture.

In order to solve Eq. (90), prescribe the function K. According to Eq. (89) and Eq. (87), this is substantially equivalent to prescribing the region $S(x(p_1,q_1),y(p_1,q_1))$ as a function of $p_1$ and $q_1$. Since the mapping $x(p_1,q_1),y(p_1,q_1)$ is still unknown, this prescription implies that the size and orientation of the paintbrush are specified as a function of its edge position $(p_1,q_1)$, and not as a function of the associated (x,y) coordinate of the exit reference plane from which the ray $(p_1,q_1)$ is emitted.

In the abovementioned example of the Lambertian rectangular source, the region $S(x(p_1,q_1),y(p_1,q_1))$ are given by a parallelogram defined by the position of one corner at $(p_1,q_1)$ and by the two adjacent corner positions $(p_2,q_2)$ and $(p_3,q_3)$ relative to $(p_1,q_1)$. Since $(p_2,q_2)$ and $(p_3,q_3)$ also define a normal congruence (i.e., $p_{k,y}=q_{k,x}$), these corners are:

$$(p_2,q_2) = (p_1,q_1) + (a_2 p_1 + b_2, a_2 q_1 + c_2) \quad \text{Eq. (91)}$$

$$(p_3,q_3) = (p_1,q_1) + (a_3 p_1 + b_3, a_3 q_1 + c_3)$$

where $a_k$, $b_k$ and $c_k$ are the constants to select.

Since K is known, Eq. (90) can thus be identified as a two-dimensional Fredholm integral equation of the first kind, with Kernel K and unknown function $J(p_1,q_1)$. If the solution $J(p_1,q_1) = \pm H(p_1,q_1)$ to this integral equation exists, it can be found by proper numerical techniques. A particular case of this solution is obtained when $a_2 = a_3 = 0$, i.e., when the region S(x,y) is a parallelogram that remains invariant across the exit-aperture. In this case, the kernel will be an invariant function $(K(p,q,p_1,q_1) = K(p-p_1,q-q_1))$ and the solution to this Fredholm integral equation is the deconvolution:

$$H(p,q) = F^{-1}\left(\frac{F(I(p,q))}{F(K(p,q))}\right) \quad \text{Eq. (92)}$$

where F denotes the Fourier transform operator. The solution is valid if H(p,q) is real and is entirely non-negative or non-positive. Otherwise, there is no invariant solution to this inverse problem. This gives:

$$x_{p1}(p_1,q_1)y_{q1}(p_1,q_1) - x_{q1}(p_1,q_1)y_{p1}(p_1,q_1) = \pm H(p_1,q_1) \quad \text{Eq. (93)}$$

Dually, this equation can be again written in the independent variables (x,y), using $l_{o1}(x,y)$ associated with the congruence $W_{o1}$:

$$l_{o1,xx}l_{o1,yy} - l_{o1,xy}^2 = \pm \frac{1}{H(l_{o1,x}, l_{o1,y})} \quad \text{Eq. (94)}$$

This differential equation is a standard Monge-Ampere equation, which can be solved by numerical discretization via a succession of polyhedra.

Once $l_{o1}(x,y)$ is known, $l_{o2}(x,y)$ and $l_{o3}(x,y)$ can be obtained by integrating Eq. (91). Then the SMS design with these normal congruences can be completed and, if the source projection linear approximation is accurate and the seed-rib control is effective, it will produce the prescribed pattern.

Returning to a source of luminance L and a far-field prescription I(p,q) with a separation of variables, consider $$I(p,q) = LX(p)Y(q) \qquad \text{Eq. (94)}$$

where the functions X and Y have dimensions of length. This type of intensity distribution is generally fully determined when two sections of the distribution are prescribed, i.e., when written as:

$$I(p,q) = \frac{I(p,0)I(0,q)}{I(0,0)} \qquad \text{Eq. (96)}$$

With the source-projection linear approximation, this pattern is obtained by selecting the three design normal congruences with this separation of variables:

$$l_{o1}(x,y) = P_1(x) + Q_1(y)$$

$$l_{o2}(x,y) = P_2(x) + Q_1(y) \qquad \text{Eq. (97)}$$

$$l_{o3}(x,y) = P_1(x) + Q_3(y)$$

This selection implies that the source is projected onto the p-q plane as a rectangle with sides parallel to the p and q axis. This approach reduces the two-dimensional problem of Eq. (94) to a pair of one-dimensional ones on the separated variables.

Calling $p_k = P'_k$ and $q_k = Q'_k$, and assuming $p_2(x) \geq p_1(x)$ and $q_3(y) \geq q_1(y)$, Eq. Eq. (44) can be written as:

$$I(p,q) = \qquad \text{Eq. (98)}$$

$$L \iint_{\substack{p_1(x) \leq p \leq p_2(x) \\ q_1(y) \leq q \leq q_3(y)}} dx\, dy = L\left(\int_{p_1(x) \leq p \leq p_2(x)} dx\right)\left(\int_{q_1(y) \leq q \leq q_3(y)} dy\right)$$

Eq. (94) and Eq. (98) give:

$$X(p) = k\left(\int_{p_1(x) \leq p \leq p_2(x)} dx\right) \qquad \text{Eq. (99)}$$

$$Y(q) = \frac{1}{k}\left(\int_{q_1(y) \leq q \leq q_3(y)} dy\right)$$

where k is a constant to be chosen. Eq. (99) are the two one-dimensional problems to which the inverse problem has been reduced. In general, solutions to the one-dimensional problems are not unique. But restricting $p_k(x)$ and $q_k(y)$ to monotonic functions makes them invertible, reducing Eq. (99) to:

$$\pm X(p) = k\int_{x=p_1^{-1}(p)}^{x=p_2^{-1}(p)} dx = k(p_2^{-1}(p) - p_1^{-1}(p)) \qquad \text{Eq. (100)}$$

$$\mp Y(q) = \frac{1}{k}\left(\int_{y=q_1^{-1}(q)}^{y=q_3^{-1}(q)} dy\right) = k(q_3^{-1}(q) - q_1^{-1}(q))$$

Then, the functions $p_1(x)$ and $q_1(y)$ are selected, and $p_2(x)$ and $q_3(y)$ are calculated by inversion of:

$$p_2^{-1}(p) = \pm \frac{X(p)}{k} + p_1^{-1}(p) \qquad \text{Eq. (101)}$$

$$q_3^{-1}(p) = \mp kY(q) + q_1^{-1}(q)$$

Once the functions $p_k(x)$ and $q_k(y)$ have been calculated, the normal congruences are obtained by integration. The selection of the constant k generally is not totally free, if the aperture size is also specified. This is due, at least in part, to the restriction imposed by the étendue conservation of two-dimensional ray bundles Previously, neither the exit-aperture contour δA(x,y) nor intensity-prescription contour δI(p,q) (i.e., I(p,q)=0 outside the region δI(p,q)) were considered. In general, these contours are unrelated, but in the above discussions that assumed bijective mappings, these contours indeed are linked: the pattern contour is illuminated by the exit-aperture contour. In many applications, none of the contours are sharply specified, while in others they are, which is fully considered below.

For the general prescription problem in the invariant case, the deconvolution that solves the integral equation delineates another contour, $\delta I_{in}(p,q)$, obtained as the envelope of the paintbrush when its outer edge lays on δI(p,q). From the condition that H(p,q) is either non-negative or non-positive, along with I(p,q)=0 outside the region δI(p,q), it can be deduced that the intensity cannot be prescribed in the region between the contours δI(p,q) and $\delta I_{in}(p,q)$. The contour $\delta H(p_1,q_1)$ of the solution $H(p_1,q_1)$ are obtained by deconvolution, and are placed between the contours δI(p,q) and $\delta I_{in}$(p,q). The solution of the Monge-Ampere equation Eq. (94) provides the exit aperture contour δA(x,y) that matches $\delta H(p_1,q_1)$.

Moreover, if not only a sharp contour but also a steep intensity-gradient is specified, at least along part of the contour δI(p,q), the above-described general-prescription method may not provide a solution. To meet a steep-gradient prescription in some implementations, when the edge $(p_1,q_1)$ of the paintbrush defines the contour δI(p,q), the function $H(p_1,q_1)$ presents a Dirac-delta along δH(p,q) (which coincides with δI(p,q) though it is defined by $(p_1,q_1)$). But in order to avoid a step at $\delta I_{in}(p,q)$, the adjacent edges $(p_2,q_2)$ and $(p_3,q_3)$ cannot remain invariant for the x-y values for which $(p_1,q_1)$ stays at the Dirac delta, and thus $(p_2,q_2)$ and $(p_3,q_3)$ typically cannot be functions only of $(p_1,q_1)$.

This variability of $(p_2,q_2)$ and $(p_3,q_3)$ is obtained in some embodiments through the separated-variable approach, which is suitable for steep output-intensity gradients in which the cut-off boundary is a straight line, such as the horizontal cutoff of an automotive fog-lamp prescription. A good approach for this is two fully controlled normal congruences at the exit, both aiming at the cut-off line. When the source is a rectangle, a good selection for the input side is to choose two corners of the rectangle, and two cylindrical wavefronts are emitted issuing therefrom.

Figure 45:
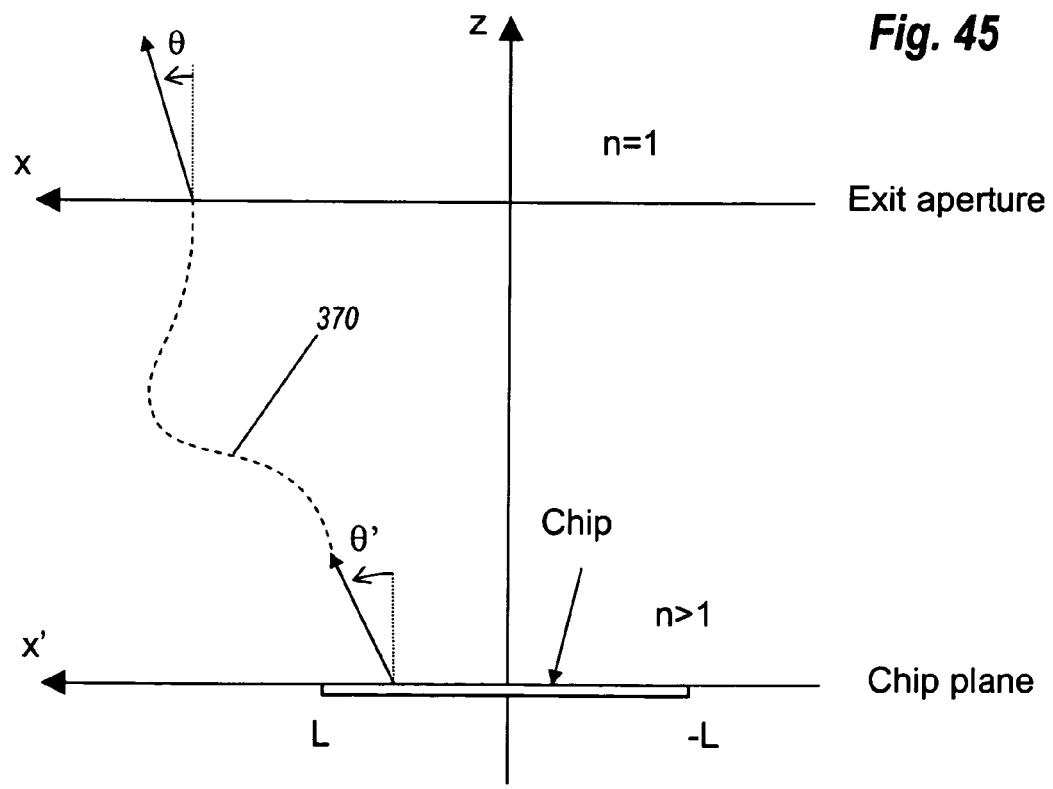
FIG. 45 shows the xz plane of the separated-variable design process.

Another design situation according to some embodiments utilizing the separation of variables lies in the horizontal plane, analogous to the vertical-plane considerations of FIG. 42 and FIG. 43. A far-field intensity prescription is expressed as a specific output wavefront $W'_{o2}$, for example a plane wave aimed at an intensity-gradient test point. With separated variables, this wavefront is depicted in FIG. 45 as the ray-angle θ that varies across the exit aperture, and the input wavefront as the corresponding ray-angle θ'. The light source is described as a line of length 2L, the width of the LED chip. Dotted line 370 is symbolic of a ray's path through the optical system to be designed. With p=sin θ, and p'=n sin θ', assume that the above-described source-projection linear approximation is valid for the p-x' pair, giving the approximation:

$$p(x, x') = \frac{p_m(x) - p_M(x)}{2L} x' + \frac{p_m(x) - p_M(x)}{2} \quad \text{Eq. (102)}$$

where $p_m = \sin\theta_m$ and $p_M = \sin\theta_M$, as well as the approximation:

$$p'(x, x') = \frac{p'_m(x) - p'_M(x)}{2L} x' + \frac{p'_m(x) - p'_M(x)}{2} \quad \text{Eq. (103)}$$

where $p_m' = n \sin\theta_m'$ and $p_m' = n \sin\theta_M'$. For the rays passing through point x of the exit aperture, this means that the sine of the chip emission angle θ' varies approximately linearly along the chip line-edge.

Taking x and x' as the parameters of the 2-parameter bundle, etendue conservation gives:

$$dxdp = dx'dp' \Leftrightarrow \begin{vmatrix} \frac{\partial x}{\partial x} & \frac{\partial p}{\partial x} \\ \frac{\partial x}{\partial x'} & \frac{\partial p}{\partial x'} \end{vmatrix} dxdx' = \quad \text{Eq. (103)}$$

$$\begin{vmatrix} \frac{\partial x'}{\partial x} & \frac{\partial p'}{\partial x} \\ \frac{\partial x'}{\partial x'} & \frac{\partial p'}{\partial x'} \end{vmatrix} dxdx' \Leftrightarrow \begin{vmatrix} 1 & \frac{\partial p}{\partial x} \\ 0 & \frac{\partial p}{\partial x'} \end{vmatrix} =$$

$$\begin{vmatrix} 0 & \frac{\partial p'}{\partial x} \\ 1 & \frac{\partial p'}{\partial x'} \end{vmatrix} \Leftrightarrow \frac{\partial p}{\partial x'} = -\frac{\partial p'}{\partial x}$$

And, from Eq. (102) and Eq. (103):

$$\frac{p_m(x) - p_M(x)}{2L} = \quad \text{Eq. (104)}$$

$$-\frac{1}{2L}\left(\frac{dp'_m(x)}{dx} - \frac{dp'_M(x)}{dx}\right)x' - \frac{1}{2}\left(\frac{dp'_m(x)}{dx} - \frac{dp'_M(x)}{dx}\right)$$

Since Eq. (104) is true for all x', it follows that:

$$\left.\begin{array}{l} \frac{dp'_m(x)}{dx} - \frac{dp'_M(x)}{dx} = 0 \\ \frac{dp'_m(x)}{dx} - \frac{dp'_M(x)}{dx} = \frac{p_M(x) - p_m(x)}{L} \end{array}\right\} \Rightarrow \quad \text{Eq. (105)}$$

$$\begin{cases} \frac{dp'_m(x)}{dx} = \frac{dp'_M(x)}{dx} \\ \frac{dp'_m(x)}{dx} = \frac{p_m(x) - p_M(x)}{2L} \end{cases}$$

Defining:

$$I(x) = \frac{1}{2L} \int_{t=0}^{t=x} [p_M(t) - p_m(t)] dt \quad \text{Eq. (106)}$$

From Eq. 105:

$$p'_m(x) = I(x) + p'_m(0)$$

$$p'_M(x) = I(x) + p'_M(0) \quad \text{Eq. (107)}$$

where $p_m'(0)$ and $p_M'(0)$ are as yet unknown, but will be calculated by the above-mentioned contour conditions. Eq. (103) can be rewritten as:

$$p'(x, x') = \frac{p'_m(0) - p'_M(0)}{2L} x' + \frac{p'_m(0) - p'_M(0)}{2} + I(x) \quad \text{Eq. (108)}$$

Figure 46:
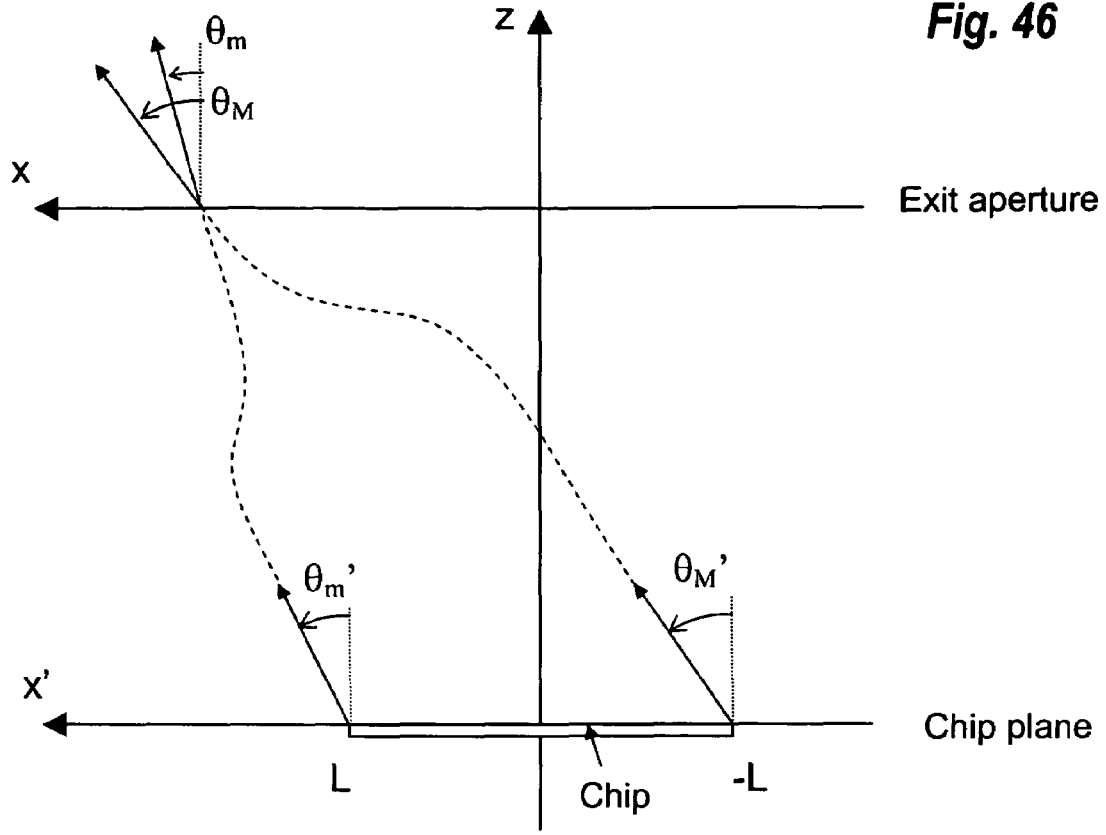
FIG. 46 shows the edge rays in the xz plane.
Figure 47:
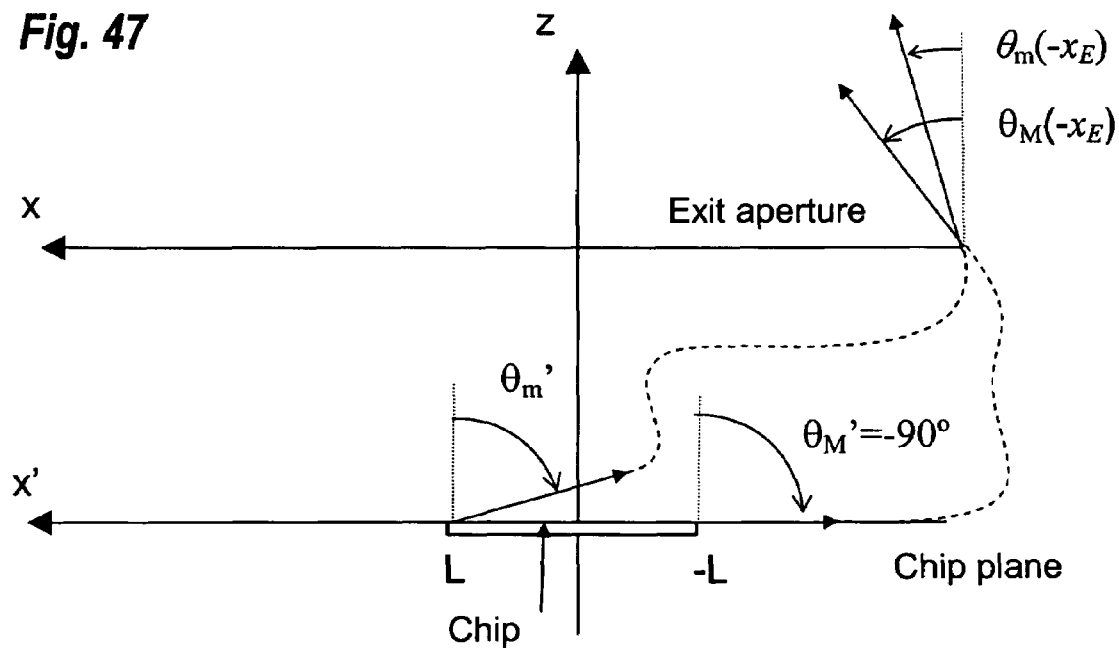
FIG. 47 shows further edge rays in the xz plane.

Taking the contour conditions as shown in FIG. 45 and FIGS. 46 and 47 gives:

$$p'(x=x_E, x'=L) = n \quad \text{Eq. (109)}$$

$$p'(x=-x_E, x'=-L) = -n$$

where $\pm x_E$ are the edges of the exit aperture, Eq. (108) gives:

$$p'_m(0) = n - I(x_E) \quad \text{Eq. (110)}$$

$$p'_M(0) = -n - I(-x_E)$$

Substituting this in Eq. (108) gives:

$$p'(x, x') = \frac{nx'}{L} + I(x) - \frac{I(x_E)}{2}\left(\frac{x'}{L} + 1\right) + \frac{I(-x_E)}{2}\left(\frac{x'}{L} - 1\right) \quad \text{Eq. (111)}$$

Assume that the two functions $p_m(x)$ and $p_M(x)$ are known. Define $p_{EDGE} = \sin\theta_{EDGE}$, and assume $p_{EDGE}(x)$ is also given. In the LB design, for example, $p_{EDGE}(x) = \sin(2.5°)$, constant across the aperture, providing a good definition of the gradient.

Solving for x' in Eq. (102):

$$x'_{EDGE} = L\left(1 - 2\frac{p_{EDGE}(x) - p_m(x)}{p_M(x) - p_m(x)}\right) \quad \text{Eq. (112)}$$

Which forms with Eq. (111):

$$p'_{EDGE} = \quad \text{Eq. (113)}$$

$$\frac{nx'_{EDGE}}{L} + I(x) - \frac{I(x_E)}{2}\left(\frac{x'_{EDGE}}{L} + 1\right) + \frac{I(-x_E)}{2}\left(\frac{x'_{EDGE}}{L} - 1\right)$$

This is an implicit expression for the curve in the plane ($x'_{EDGE}$, $p'_{EDGE}$) that defines the chip line-edge wavefront according to some embodiments. This determines x, then $x'_{EDGE}$ from Eq. (112) and $p'_{EDGE}$ from Eq. (113).

Figure 48:
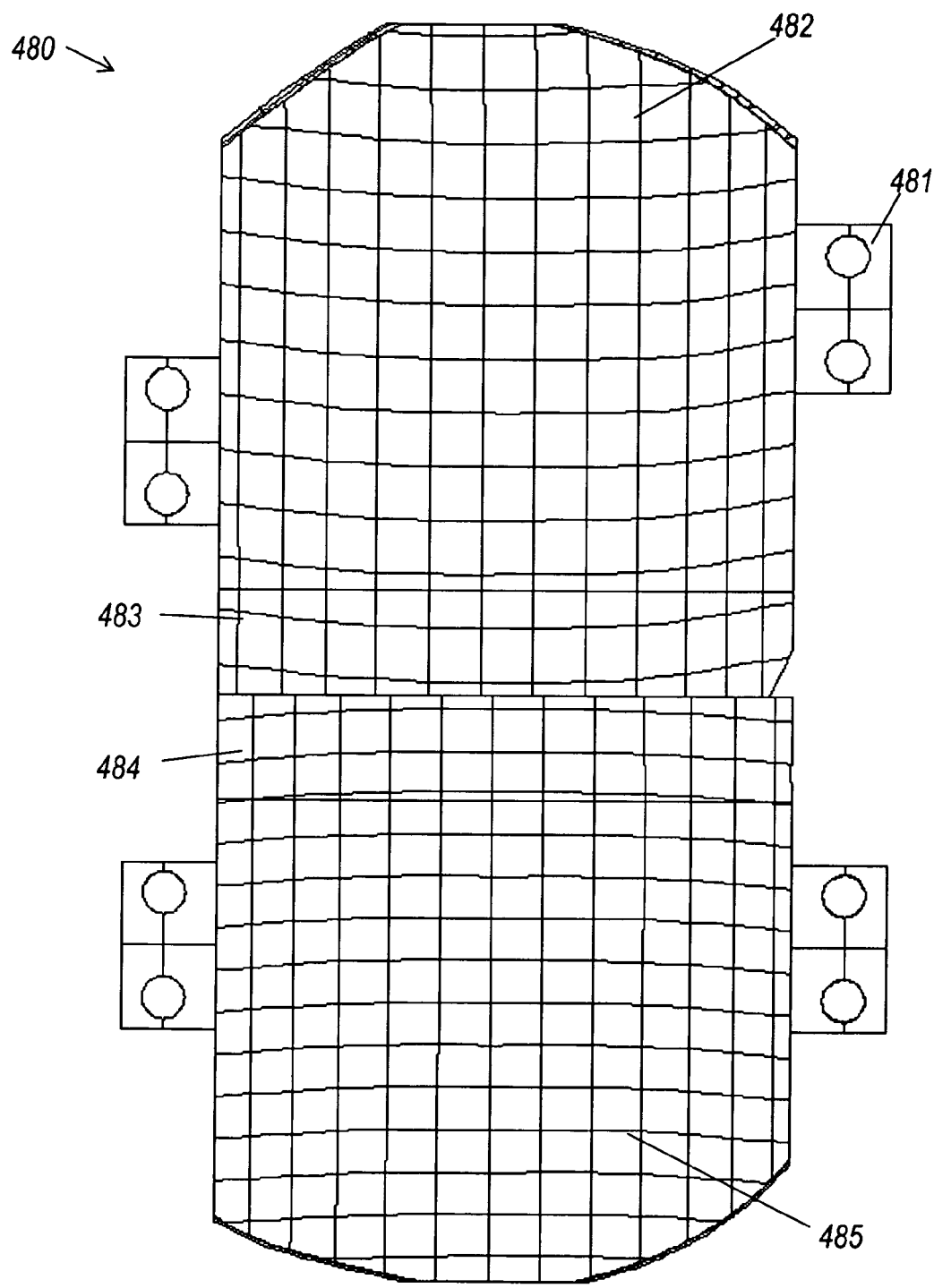
FIG. 48 is a front view of a free-form RXI lens for an LED automotive headlamp.

Regarding the output pattern shown in FIG. 4, the SMS-design that produced it is shown in FIG. 48. Free-form RXI low-beam headlamp lens 480 has mounting brackets 481, upper front surface 482, upper top reflector 483, lower top reflector 484, and lower upper surface 485.

Figure 49A:
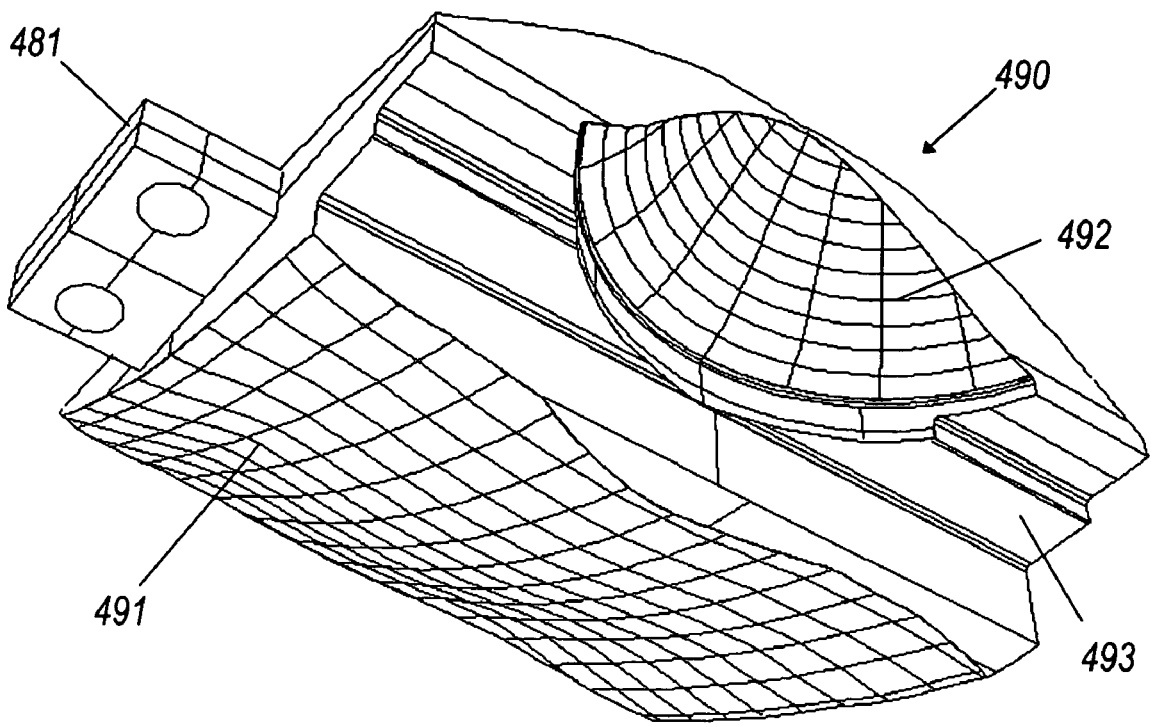
FIG. 49A is a rear view of the half of the free-form RXI lens.

Showing only a portion of the lens of FIGS. 48, FIG. 49A is a view from below and from an end of lens-half 490 respectively, with bracket 481, rear surface 491, entrance cavity 492 for enclosing an LED package (not shown), and inactive grooved optical surfaces 493.

Figure 49B:
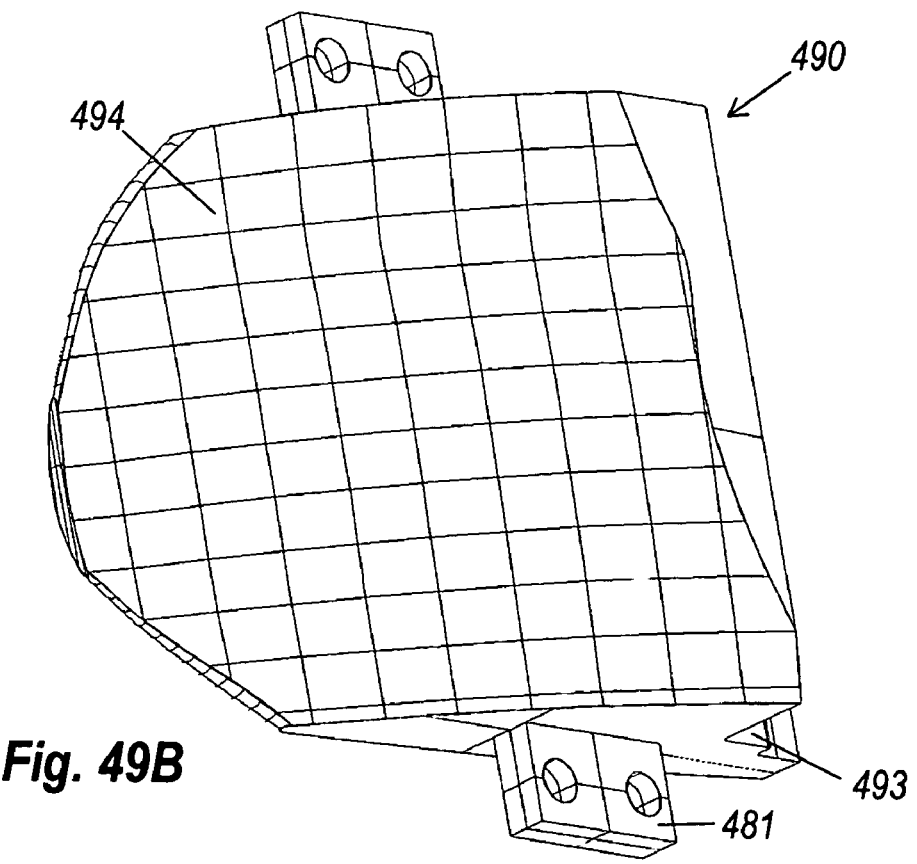
FIG. 49B is an top view of same.

FIG. 49B is a view from above of lens-half 490, showing top surface 494 of subtly complex shape, as well as groove 493 and bracket 481.

Figure 50A:
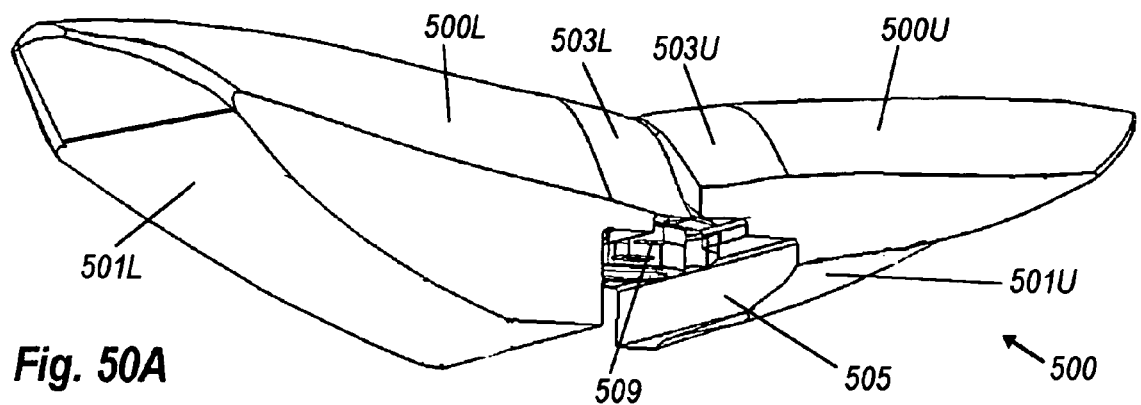
FIG. 50A shows a similar free-form RXI lens.

FIG. 50A shows similar illumination system 500, comprising slightly differing halves, lower half 500L on the left and upper half 500U on the right. Bottom surfaces 501L and 501U is metalized to be reflecting, as are top reflectors 503L and 503U. Slot 502 holds LED package 506.

Figure 50B:
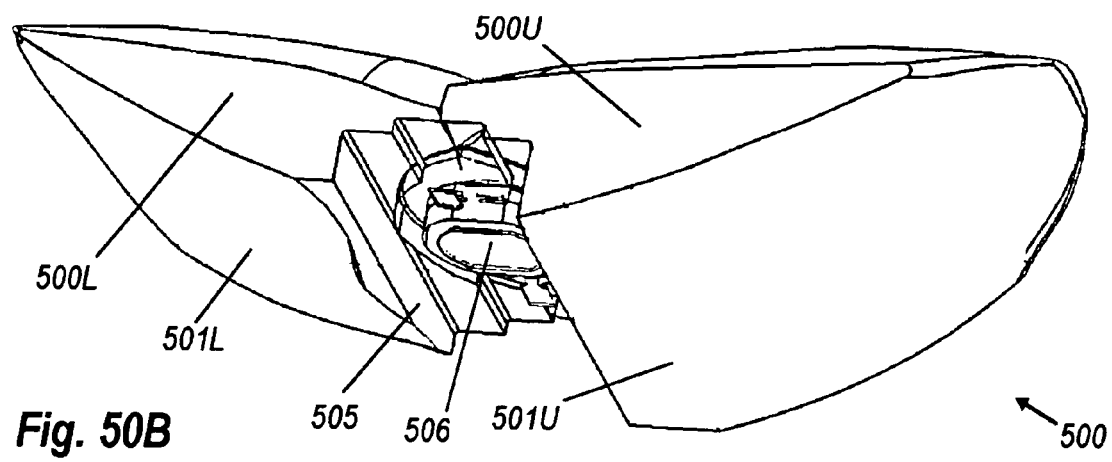
FIG. 50B is another view of same.

FIG. 50B is another view of illumination system 500, also showing upper half 500U and lower half 500L, lower bottom-mirror 501L and upper bottom-mirror 501U, slot 505, and LED package 506.

Figure 51A:
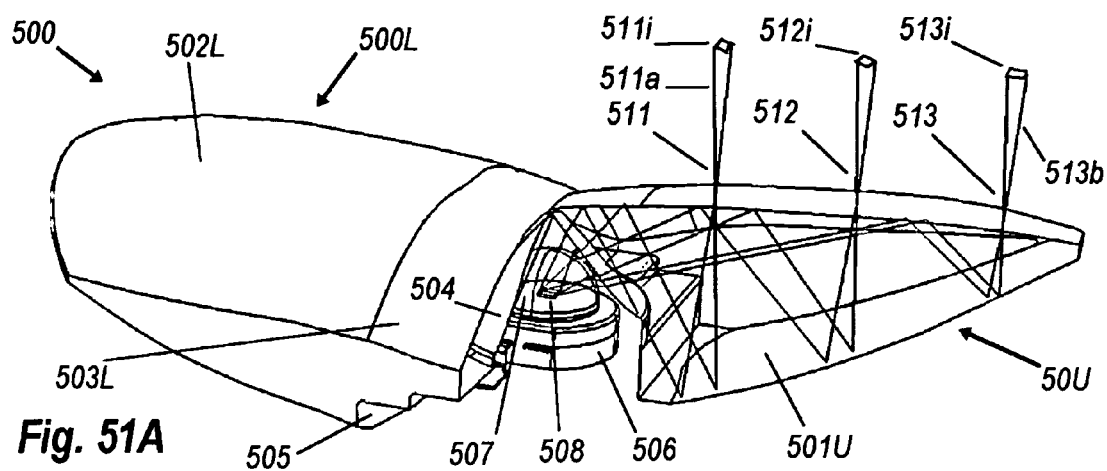
FIG. 51A is a cutaway view of same.

FIG. 51A is a perspective view of illumination system 500, including top metalized surface 503L, entry-cavity surface 504, and slot 505. Lower half-lens 500L is shown including top surface 502L. Also shown are upper half-lens 500U cut away to reveal the system's optical operation. Shown as well are LED package 506 with transparent dome 507 and emitting chip 508. Emerging from 500R are beamlets 511, 512, and 513, similar in nature to beam 390 of FIG. 39. These beamlets comprise respective source images 511i, 512i, and 513i. The opposite corners of the ray image are shown as a pair of rays a and b, the first and last explicitly labeled as 511a and 513b, with the remaining understood as indicating either source-image corner.

Figure 51B:
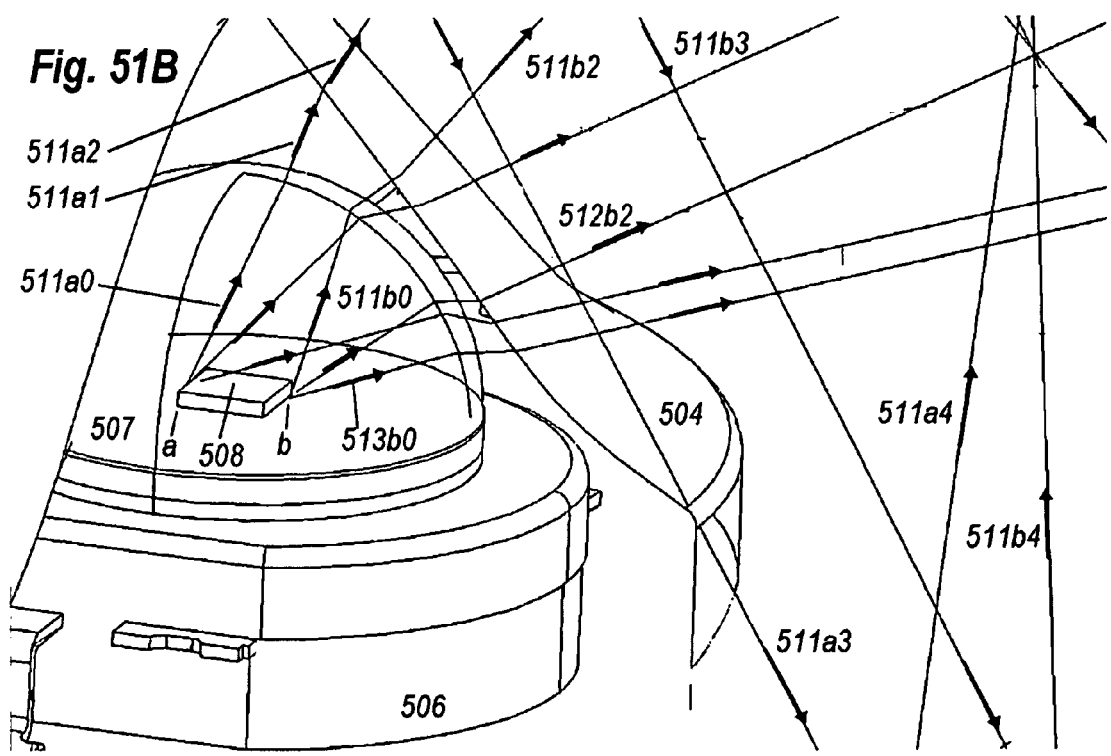
FIG. 51B is a close up of FIG. 51A.

FIG. 51B magnifies the center of FIG. 51A, showing entry surface 504, LED package 506 with transparent dome 507, and emitting chip 508 with opposite corners a and b. Individual rays are appended with '0' within the dome (as rays 511a0, 511b0, and 513b0), '1' in air (as with ray 511a1), '2' within the lens (as with rays 511b2 and 512b2), '3' having been reflected back downwards (as with rays 511a3 and 511b3, and '4' having been reflected back upwards by bottom surface 501U (as with rays 511a4 and 511b4).

Figure 52A:
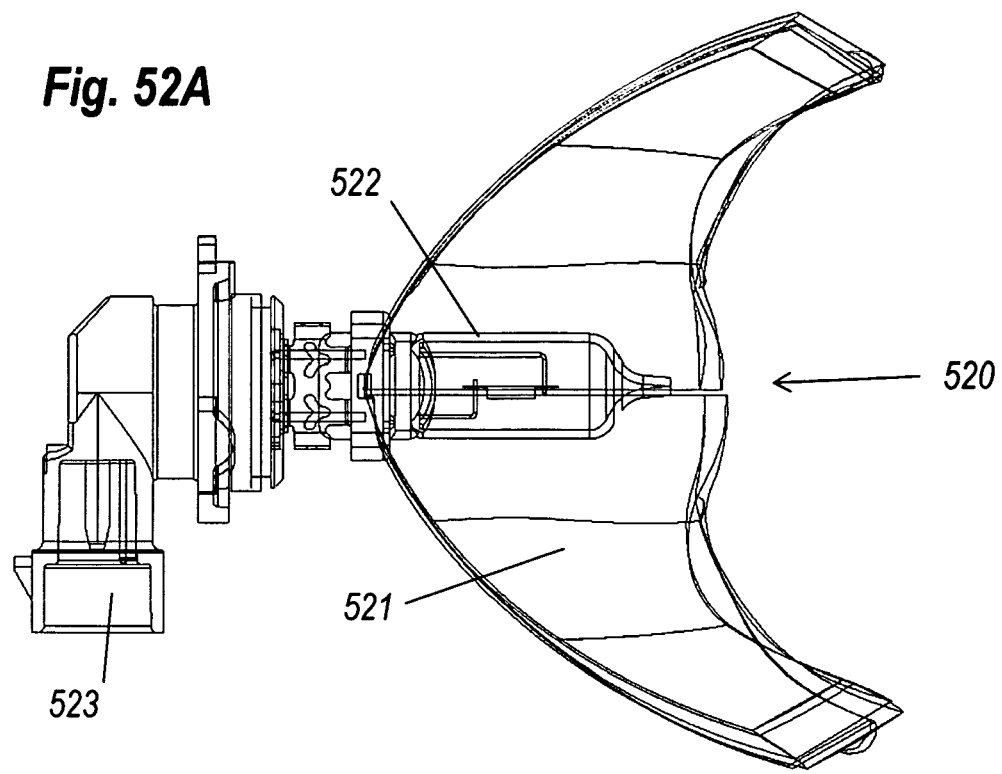
FIG. 52A is a side view of a free-form glass RXI lens for an incandescent automotive headlamp.

Another free-form SMS-designed automotive headlamp is made of glass and powered by an incandescent lamp with much higher efficiency than conventional parabolic reflectors. FIG. 52A is a side view of headlamp assembly 520, including glass lens 521, tubular incandescent lamp 522, and socket assembly 523.

Figure 52B:
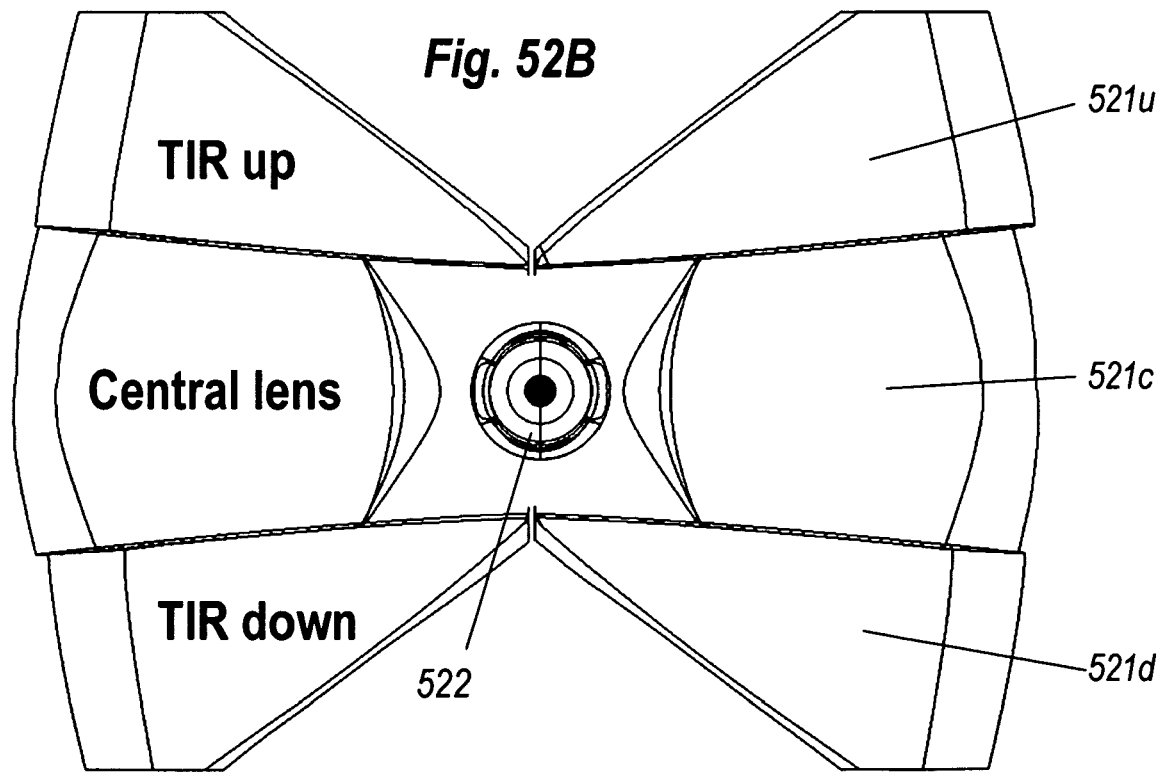
FIG. 52B is a front view of the glass RXI lens.

FIG. 52B is a front view of headlamp 520, also showing upper lens section 521u, central section 521c, and lower section 521d.

Figure 52C:
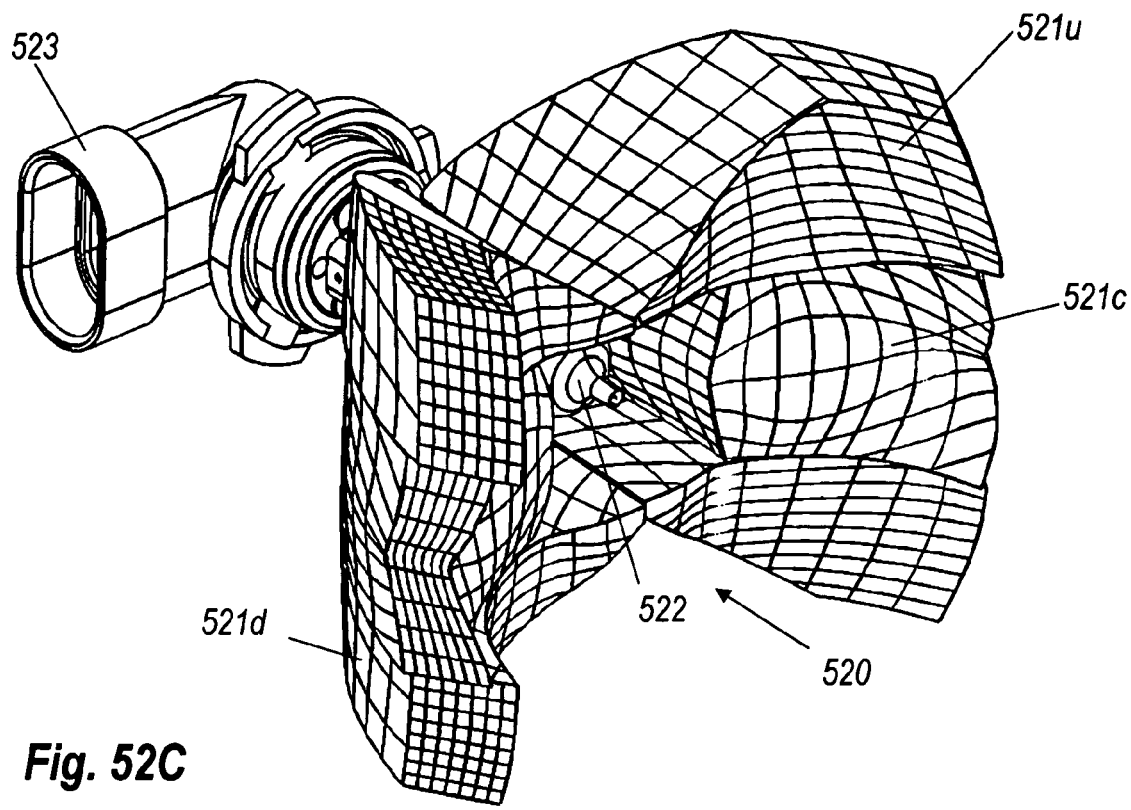
FIG. 52C is a perspective view of the glass RXI lens.

FIG. 52C is a cutaway perspective view of headlamp 520, showing upper lens section 521u, central lens section 521c, and lower lens section 521d, with incandescent lamp 522 and socket assembly 523.

Figure 53A:
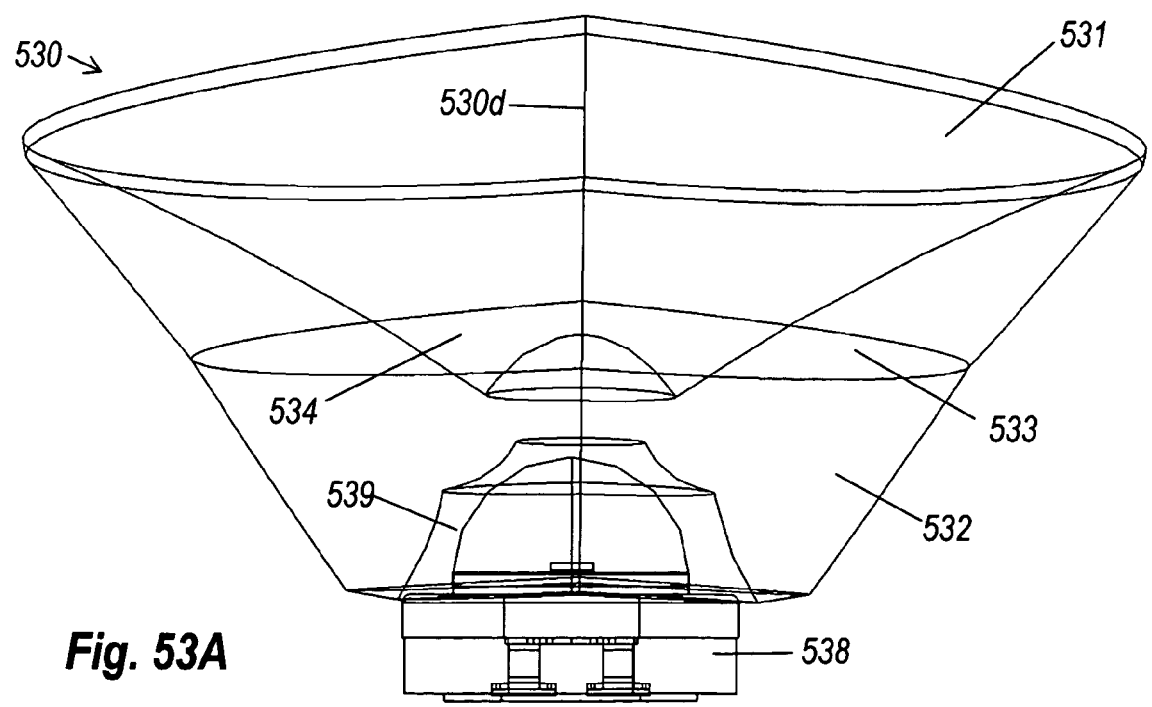
FIG. 53A is a end view of another free-form lens.

FIG. 53A is an end view of free-form lens 530 with symmetry plane 530d, comprising open upper reflecting conicoid 531 and solid dielectric lower section 532 with upper surface comprising outer cone 533 and inner cone 534.

Figure 53B:
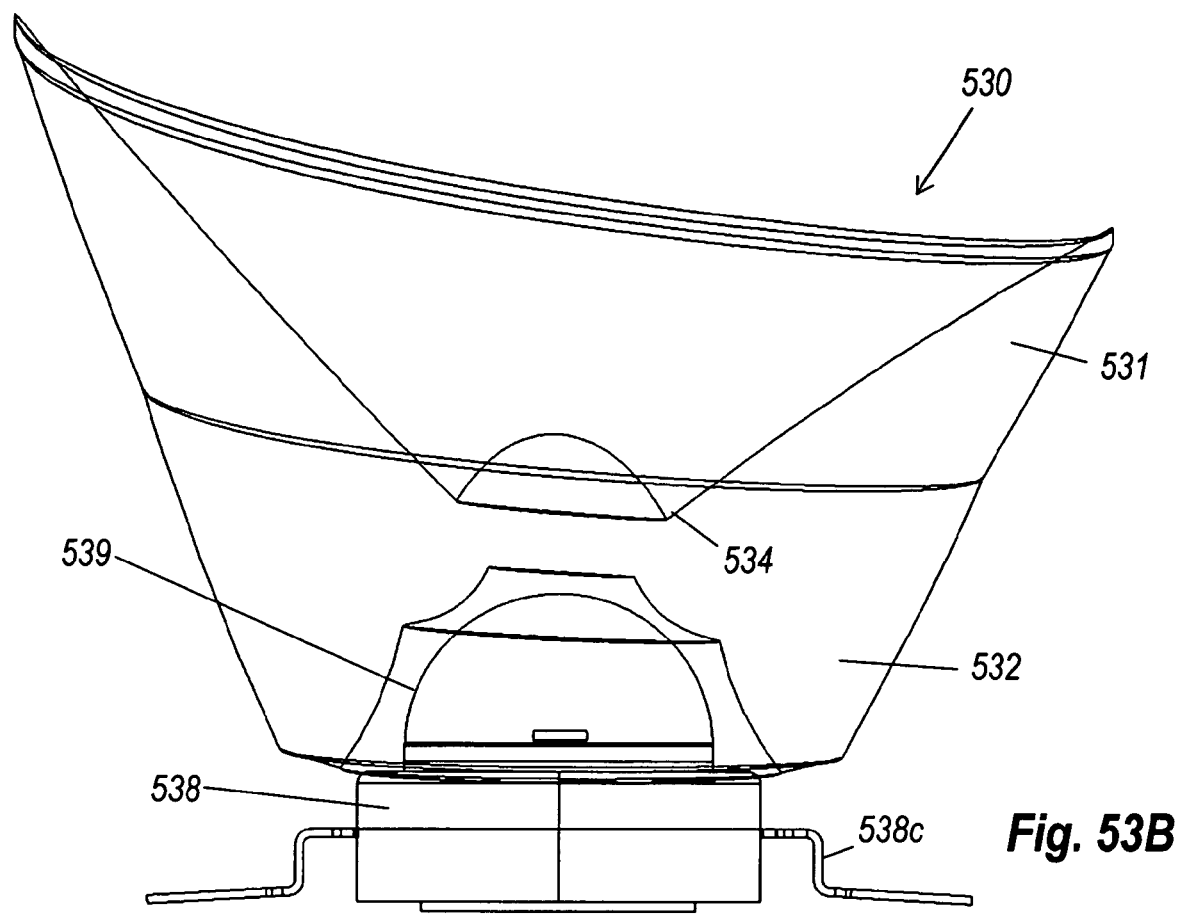
FIG. 53B is an side view of same.

FIG. 53B is a side view of free-form lens 530 showing upper reflector 531, solid dielectric 532 with upper surface 534, and LED package 538 with clip 538c and transparent dome 539.

Figure 53C:
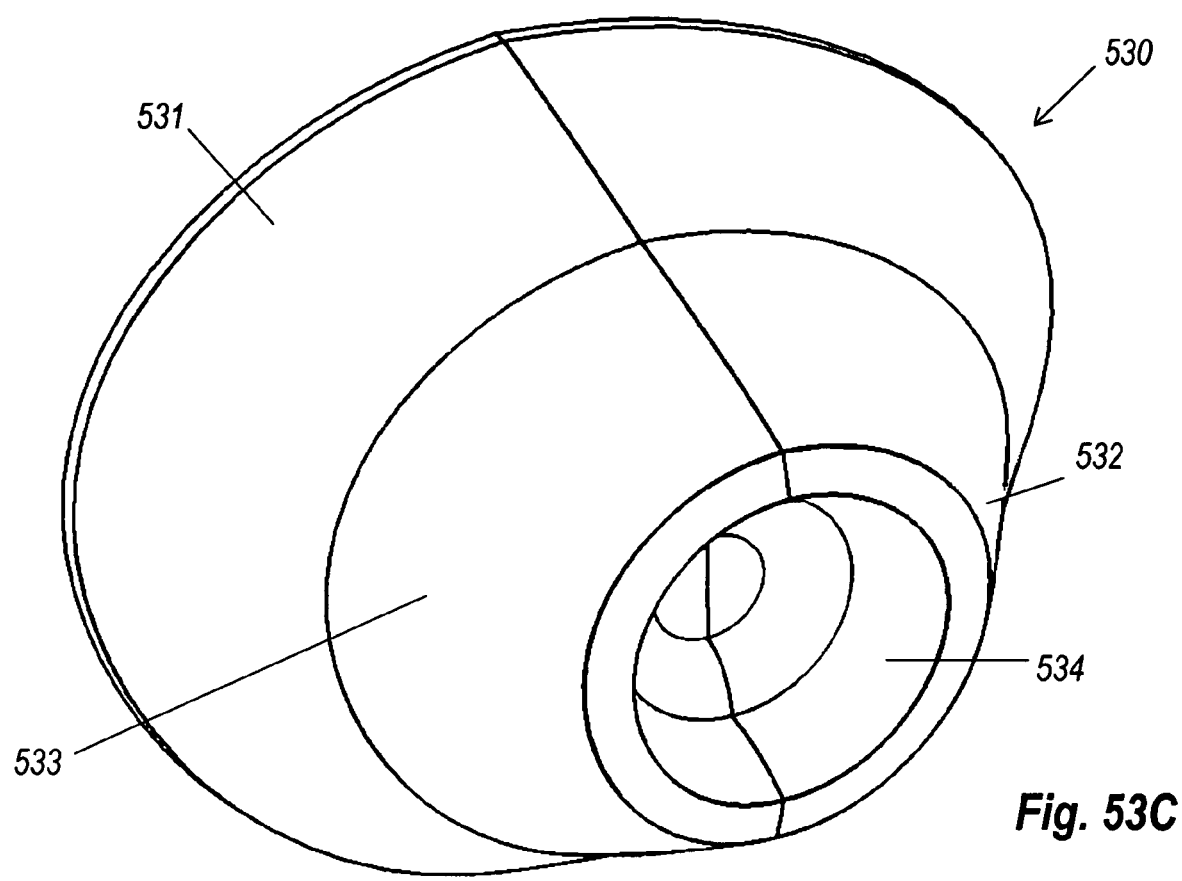
FIG. 53C is a perspective rear view of same.

FIG. 53C is a rear perspective view of lens 530 showing upper reflector 531 and transparent dielectric 532, cutaway to reveal upper surface 533. Also shown is rear cavity 534 for enclosing the LED.

While the invention herein disclosed has been described by means of specific embodiments and applications thereof, numerous modifications and variations could be made thereto by those skilled in the art without departing from the scope of the invention set forth in the claims.

What is claimed is:

1. A method of defining and manufacturing a free-form optical system, comprising:
   simultaneously generating a first set and a second set of span points, where each point has an associated normal vector, such that the first and second sets of span points form interdependent first and second chains of corresponding points, respectively;
   curve-fitting through the first set of span points defining an initial first spine;
   curve-fitting through the second set of span points defining an initial second spine;
   generating first and second sets of ribs extending from said first and second spines, respectively, such that tangent vectors of said ribs are perpendicular to said normal vectors of said spines;
   defining patches of a first surface that is bounded by said first set of ribs of said first spine, and defining patches of a second surfaces that is bounded by said second set of ribs of said second spine, where said first and second spines are bounded by respective ones of the patches such that a portion of the spine is not coincident with boundaries of the respective patches; and
   manufacturing a free-form optical system having at least two active free-form optical surfaces comprising a body further comprising surfaces corresponding to the first and second surfaces where the optical system receives an input light and emits an output light according to a light prescription.

2. The method of claim 1, wherein said defining the initial first spine comprises defining the first initial spine with first tangent vectors perpendicular to said normal vectors;
   said defining the initial second spine comprises defining the second initial spine with second tangent vectors perpendicular to said normal vectors; and
   said generating the sets of ribs comprises generating the first and second sets of ribs such that the tangent vectors of said ribs are perpendicular to both said normal vectors and to said first and second tangent vectors, with said first and second sets of ribs of said first and second spines being in the same interdependence as said first and second sets of span points.

3. The method of claim 1, further comprising:
   evaluating discontinuities between said patches of said first surface;
   adjusting the curve fitting defining an adjusted first spine and re-generating said first set of ribs according to adjusted first spine.

4. The method of claim 1, further comprising:
   defining lofted surfaces that unite said patches of said first surface and patches of said second surface.

5. The method of claim 1, further comprising:
   defining a first span point of said first surface and said associated surface-normal vector;
   defining a first input wavefront and a first ray of said first input wavefront at said first span point;
   defining a first output wavefront corresponding to said first input wavefront;
   defining a first optical path-length between said first input wavefront and said first output wavefront;
   wherein said simultaneous generation of said first set and said second set of span points comprises defining a first span point of said second surface as a point where said first ray of said first input wavefront traverses said first optical path-length; and defining said associated surface-normal vector at said first span point of said second surface as a vector that deflects said first ray into said first output wavefront.

6. The method of claim 5, further comprising:
defining a second input wavefront;
defining a corresponding second output wavefront;
defining an optical path-length between said second input and output wavefronts;
defining a first ray of said second output wavefront at said first point of said second surface;
defining a second span point of said first surface as a point where said first ray of said second output wavefront is traced backwards to intercept said second input wavefront; and
defining the associated normal vector at said second span point of said first surface as that which deflects said second input wavefront into said backwards traced ray of said second output wavefront.

7. The method of claim 6, further comprising:
propagating from said second span point of said first surface a deflected ray of said first input wavefront until said deflected ray intercepts said first output wavefront, thereby determining a second span point of said second surface, and the associated normal vector of said second span point;
determining from said second span point of said second surface a third span point of said first surface.

8. The method of claim 7, further comprising:
propagating further the first and second sets of span points to form the interdependent first and second chains extending plus-wise from said first span points of said first and second surfaces.

9. The method of claim 7, further comprising:
propagating from said first span point of said first surface a ray of said second input wavefront until it intercepts said second output wavefront, thereby establishing a minus-first span point of said second surface and its associated surface-normal vector;
propagating backwards from said minus-first span point of said second surface a ray of said first output wavefront until it intercepts said first input wavefront, thereby establishing a minus-first span point of said first surface; and
propagating further span points to form two interdependent chains extending minus-wise from said minus-first span points of said surfaces.

10. The method of claim 5, wherein said defining of said first and second output wavefronts comprises defining said first and second output wavefronts as normal congruences according to an output illumination prescription.

11. The method of claim 10, wherein said defining of said first and second input wavefronts comprises defining said first and second input wavefronts according to edge rays of a light source.

12. The method of claim 1, wherein said simultaneous generation of said first and second sets of span points comprises alternatively determining points of said first and second sets of points according to the positions and associated normal vectors of previously determined points of said second and first sets of span points.

13. The method of claim 1, wherein said first and second surfaces define a transparent body between said first and second surfaces.

14. The method of claim 13, wherein said first surface is reflective and said second surface is refractive.

15. The method of claim 14, wherein a third surface is prescribed prior to defining input wavefronts before the input wavefronts encounter said first surface.

16. The method of claim 13, wherein said first and second surfaces are both refractive.

17. A method designing a free-form optical system to be used in manufacturing the free-form optical system, comprising:
defining first input and output wavefronts and a first optical path length between said first input and output wavefronts;
defining second input and output wavefronts and a second optical path length between said second input and output wavefronts;
defining a deflection type of a first free-form surface and a deflection type of a second free-form surface;
defining a first spine of the first surface and defining a second spine of the second surface;
calculating a first and second seed rib of each of the first and second surfaces, respectively, comprising simultaneously calculating dependent first and second sets of span points, respectively, defining, in part, the first and second surfaces;
defining a first patch of the first surface that is defined by said first seed rib, where said first spine is bounded by said first patch of the first surface such that a portion of the first spine is not coincident with boundaries of the first patch;
defining a second patch of the second surface that is defined by said second seed rib, where said second spine is bounded by said second patch of the second surface such that a portion of the second spine is not coincident with boundaries of the second patch; and
defining the first surface comprising the first patch in accordance with the first seed rib;
defining the second surface comprising the second patch in accordance with the second seed rib; and
storing the defined first and second surfaces and the deflection type of the first and second surfaces to be accessed by a computer, where the defined first and second surfaces and the deflection type of the first and second surfaces are used to manufacture a free-form optical system comprising free-form surfaces as defined by the defined first and second surfaces.

18. The method of claim 17, further comprising:
defining refractive indices of dielectric media on each side of said first surface; and
defining refractive indices of dielectric media on each side of said second surface.

19. The method of claim 17, wherein said first and second surfaces are reflective.

20. The method of claim 17, further comprising:
determining deflective congruences of said first and second input wavefronts by said first surface, providing first and second deflective congruences;
utilizing said deflective congruences as input wavefronts for said second surface; and
defining a third surface relative to said second surface utilizing said output wavefronts.

21. The method of claim 20, further comprising:
determining when a difference between the first surface and the third surface exceeds a tolerance;
equating the first surface to the third surface providing a revised first surface when the difference between the first and third surfaces exceeds the tolerance;

repeating the determining the refraction congruence of the first and second input wavefronts through the revised first surface, providing revised first and second refracted congruence; and repeating the defining the second surface and the third surfaces relative to the revised first and second refracted congruence.

22. The method of claim 20, wherein the defining the second and third surfaces comprise:

simultaneously generating a first set and a second set of span points defining the second surface and the third surface, respectively, according to the first and second refracted congruence and the first and second output wavefronts, such that the first and second set of span points are interdependent.

23. The method of claim 22, wherein the defining the second and third surfaces further comprise:

curve fitting through the first set of span points defining an initial first spine;

curve fitting through the second set of span points defining an initial second spine; and defining patches of the first and second surfaces relative to the first and second spines.

24. The method of claim 17, further comprising:

defining the first and second output wavefronts as normal congruence relative to an illumination prescription through a source projection linear approximate.

25. The method of claim 17, wherein the defining the first and second input wavefronts comprise defining the first and second input wavefronts from edge rays of a light source.

26. The method of claim 17, further comprising:

defining a third output wavefront;

defining a third input wavefront, wherein the defining the first, second and third input wavefronts comprise defining the first, second and third wavefronts relative to the first, second and third output wavefronts, respectively, according to a linear approximation; and determining a direction of each of the three output wavefronts according to planar vectors.

27. The method of claim 26, further comprising:

defining first, second and third optical path lengths for the respective transition of the first, second and third input wavefronts to the first, second and third output wavefronts.

28. The method of claim 17, wherein the first and second output waveforms define in part an intensity gradient such that a portion of the intensity gradient emits with a constant source-image size with the remaining the remaining intensity gradient having source-image size that gradually increases.

29. The method of claim 28, wherein the portion of the intensity gradient comprising constant source-image size defines a cut-off gradient.

30. A free-form optical system, comprising:

a body comprising:

a transparent medium;

a first free-form surface receiving at least a first optical input wavefront and a second optical input wavefront; and a second free-form surface separated from the first surface and emitting at least a first optical output wavefront and a second optical output wavefront;

the first and second surfaces are respectively defined at least in part according to interdependent first and second sets of span points, and the first and second surfaces are further defined according to patches dictated by the first and second sets of span points, respectively;

the first and second surfaces are further defined by first and second set of spines that are dependent on the first and second sets of span points, respectively, and ribs extending from the first and second sets of span points associated with said first and second sets of spines, respectively, where the ribs are simultaneously generated and at least in part bound the patches and said first and second spines are bounded by first and second patches, respectively, such that a portion of the first spine is not coincident with boundaries of the first patch and a portion of the second spine is not coincident with boundaries of the second patch.

31. The system of claim 30, wherein the ribs are defined along a vector product of a normal and tangent vectors.

32. The system of claim 30, wherein the first surface comprises a first and second point of the first set of span points and the second surface comprises a first point of the second set of span points, where the first point of the first surface is an intercept point of a first ray of the first input wavefront such that the first ray is refracted at the first point of the first surface to produce a first transformed ray that intercepts the second surface and the first point of the second surface, and a first ray of the first output wavefront is emitted from the first point of the second surface according to a refraction of a second transformed ray entering the first surface at the second point where a first ray of the second input intercepts the second point of the first surface.

33. The system of claim 30, wherein the second surface emits the first and second output wavefronts as normal congruence relative to an illumination prescription according to a source projection linear approximate relative to the first and second input wavefronts.

34. The system of claim 30, wherein the first and second surfaces enclose a transparent dielectric and are refractive.

* * * * *

UNITED STATES PATENT AND TRADEMARK OFFICE
CERTIFICATE OF CORRECTION

PATENT NO. : 7,460,985 B2
APPLICATION NO. : 10/901919
DATED : December 2, 2008
INVENTOR(S) : Benitez et al.

It is certified that error appears in the above-identified patent and that said Letters Patent is hereby corrected as shown below:

In the CLAIMS:
  Claim 17, column 46, line 6, after "method" insert --of--.
  Claim 28, column 47, line 48, delete "the remaining" (second occurrence).

Signed and Sealed this

Fifth Day of May, 2009

JOHN DOLL
*Acting Director of the United States Patent and Trademark Office*